US012682004B2

(12) United States Patent
Pedersen et al.

(10) Patent No.: US 12,682,004 B2
(45) Date of Patent: Jul. 14, 2026

(54) WEB BROWSER WITH INTEGRATED VECTOR DATABASE

(71) Applicant: Google LLC, Mountain View, CA (US)

(72) Inventors: Zebedee Pedersen, Hove (GB);
Yasmine Rubinovitz, Tel Aviv (IL)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/982,645

(22) Filed: Dec. 16, 2024

(65) Prior Publication Data

US 2025/0217428 A1     Jul. 3, 2025

Related U.S. Application Data

(60) Provisional application No. 63/616,468, filed on Dec. 29, 2023.

(51) Int. Cl.
| | |
|---|---|
| *G06F 16/00* | (2019.01) |
| *G06F 16/22* | (2019.01) |
| *G06F 16/9535* | (2019.01) |
| *G06F 16/9538* | (2019.01) |

(52) U.S. Cl.
CPC ...... *G06F 16/9538* (2019.01); *G06F 16/2237* (2019.01); *G06F 16/9535* (2019.01)

(58) Field of Classification Search
CPC ......... G06F 3/011; G06F 3/017; G06F 1/163; G06F 16/906; G06F 16/954; G06F 21/552; G06F 21/554; G06F 2221/034; G06F 3/014; G06F 3/165; G06F 16/2237; G06F 16/9535; G06F 16/9538; G06F 9/451; G06F 9/541; G06F 16/248; G06F 16/437; G06F 16/284; G06F 16/337; G06F 16/31; G06F 16/94; G06F 40/10; G06F 40/166; G06F 16/90; G06F 16/335; G06F 16/2457; A61B 5/1126; A61B 5/6804; A61B 5/11;

(Continued)

(56) References Cited

U.S. PATENT DOCUMENTS

| | | | |
|---|---|---|---|
| 11,275,597 B1 | 3/2022 | Flores et al. | |
| 2006/0022833 A1* | 2/2006 | Ferguson | A63F 13/212 |
| | | | 340/539.13 |
| 2020/0285737 A1* | 9/2020 | Kraus | G06F 21/552 |

(Continued)

OTHER PUBLICATIONS

International Search Report and Written Opinion for Application No. PCT/IB2024/000731, mailed May 23, 2025, 22 pages.

(Continued)

*Primary Examiner* — Shyue Jiunn Hwa
(74) *Attorney, Agent, or Firm* — DORITY & MANNING P.A.

(57) ABSTRACT

A web browsing application can implement a vector database to store session data. A web browsing application can automatically embed loaded web content into an embedded data store that maintains session data for a number of web sessions. A user can query the web browser using simple instructions. The web browser can interpret the instructions and use the embedded data store to quickly search across multiple modalities of embedded data to retrieve relevant results. The web browser can use machine-learned models to answer queries or perform other tasks by performing vector-based queries over the content of visited web data.

20 Claims, 26 Drawing Sheets

(58) Field of Classification Search

CPC .......... G06N 20/00; G06N 3/044; G06N 3/08;
H04L 67/14

See application file for complete search history.

(56) References Cited

U.S. PATENT DOCUMENTS

| | | | |
|---|---|---|---|
| 2022/0108195 A1* | 4/2022 | Kehler ................... | G06N 3/047 |
| 2022/0382565 A1 | 12/2022 | Sunkara et al. | |
| 2024/0078269 A1* | 3/2024 | Schlerf ................. | G06F 16/906 |
| 2024/0214439 A1* | 6/2024 | Boht ..................... | H04L 65/613 |
| 2025/0004797 A1 | 1/2025 | Jakobovits et al. | |
| 2025/0200428 A1* | 6/2025 | Jang ....................... | G06N 20/00 |

OTHER PUBLICATIONS

Invitation To Pay Additional Fees for Application No. PCT/ IB2024/ 000731, mailed Apr. 1, 2025, 4 pages.

Zebedee Pedersen, U.S. Appl. No. 18/982,571, filed Dec. 16, 2024, Real-Time Input Conditioning for Sequence Processing Models.

Zebedee Pedersen, U.S. Appl. No. 18/982,609, filed Dec. 16, 2024, Hardware-Accelerated Interaction Assistance System.

\* cited by examiner

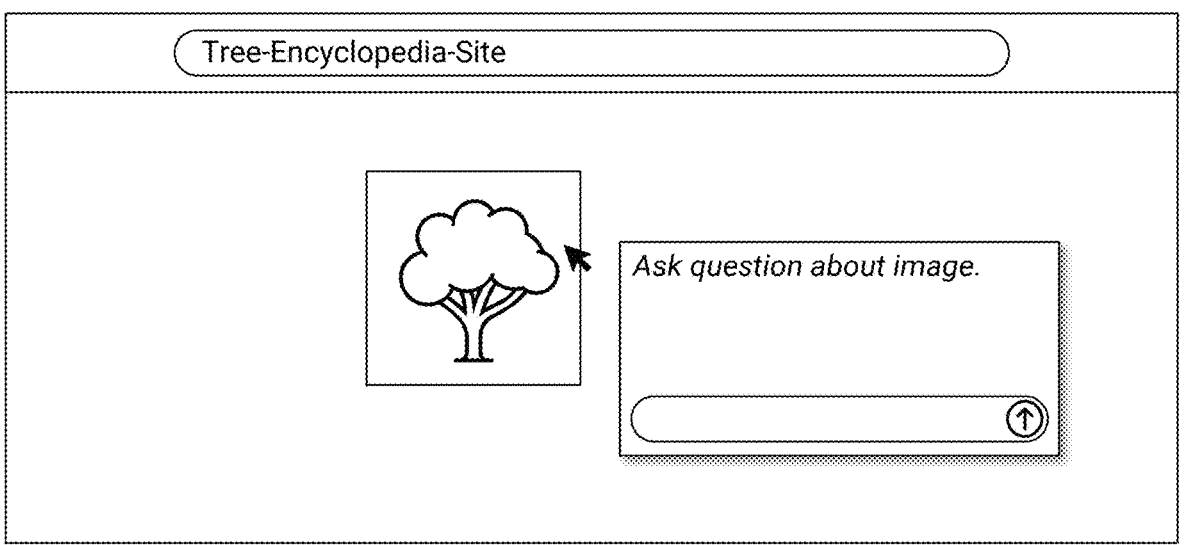

Fig. 8

Tree-Encyclopedia-Site

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

Ask question about selected text.

Fig. 9

*Ask question about open tab(s).*

*Ask question about selected tab(s).*

1200

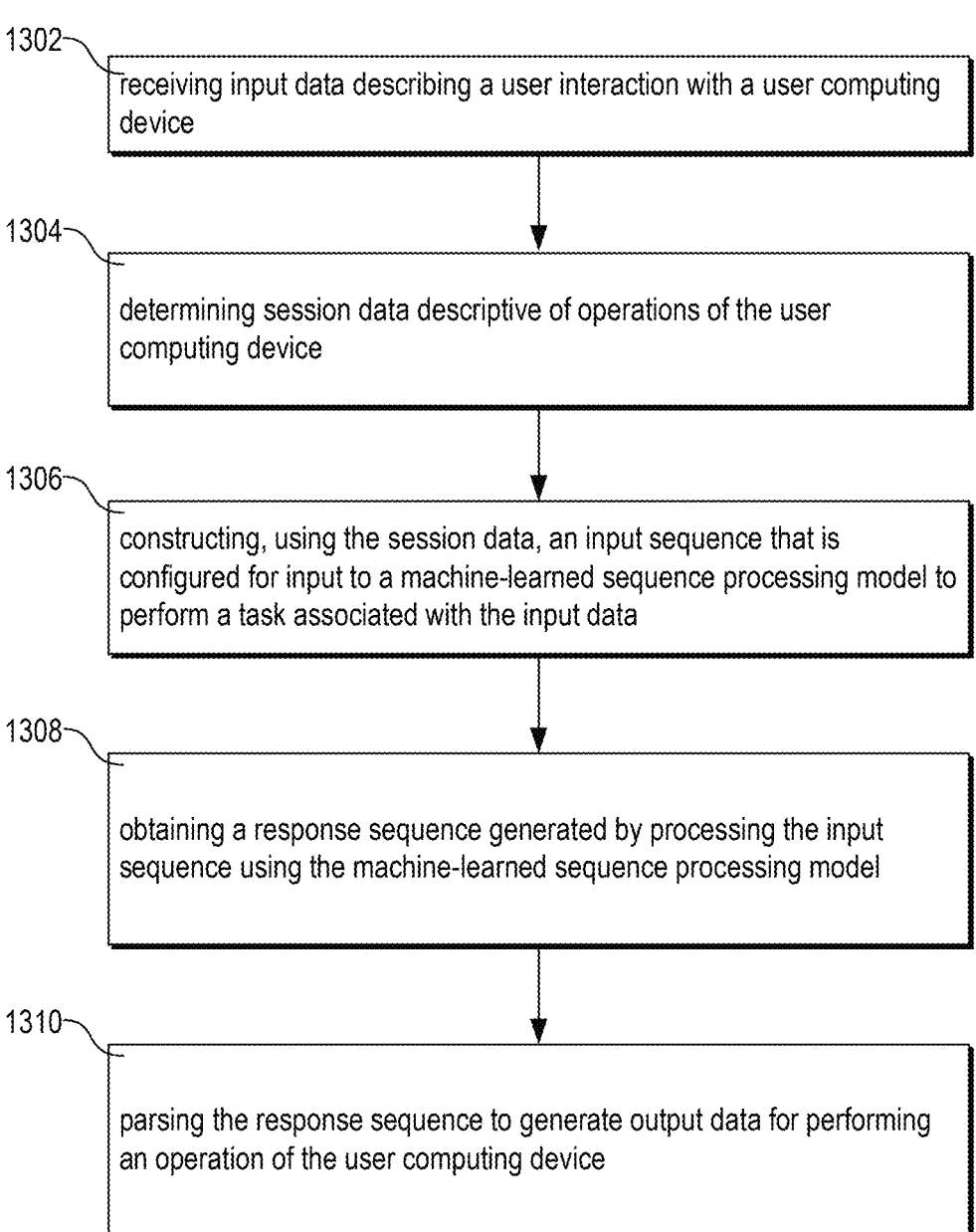

1300

1302 — receiving input data describing a user interaction with a user computing device 1304 — determining session data descriptive of operations of the user computing device 1306 — constructing, using the session data, an input sequence that is configured for input to a machine-learned sequence processing model to perform a task associated with the input data 1308 — obtaining a response sequence generated by processing the input sequence using the machine-learned sequence processing model 1310 — parsing the response sequence to generate output data for performing an operation of the user computing device

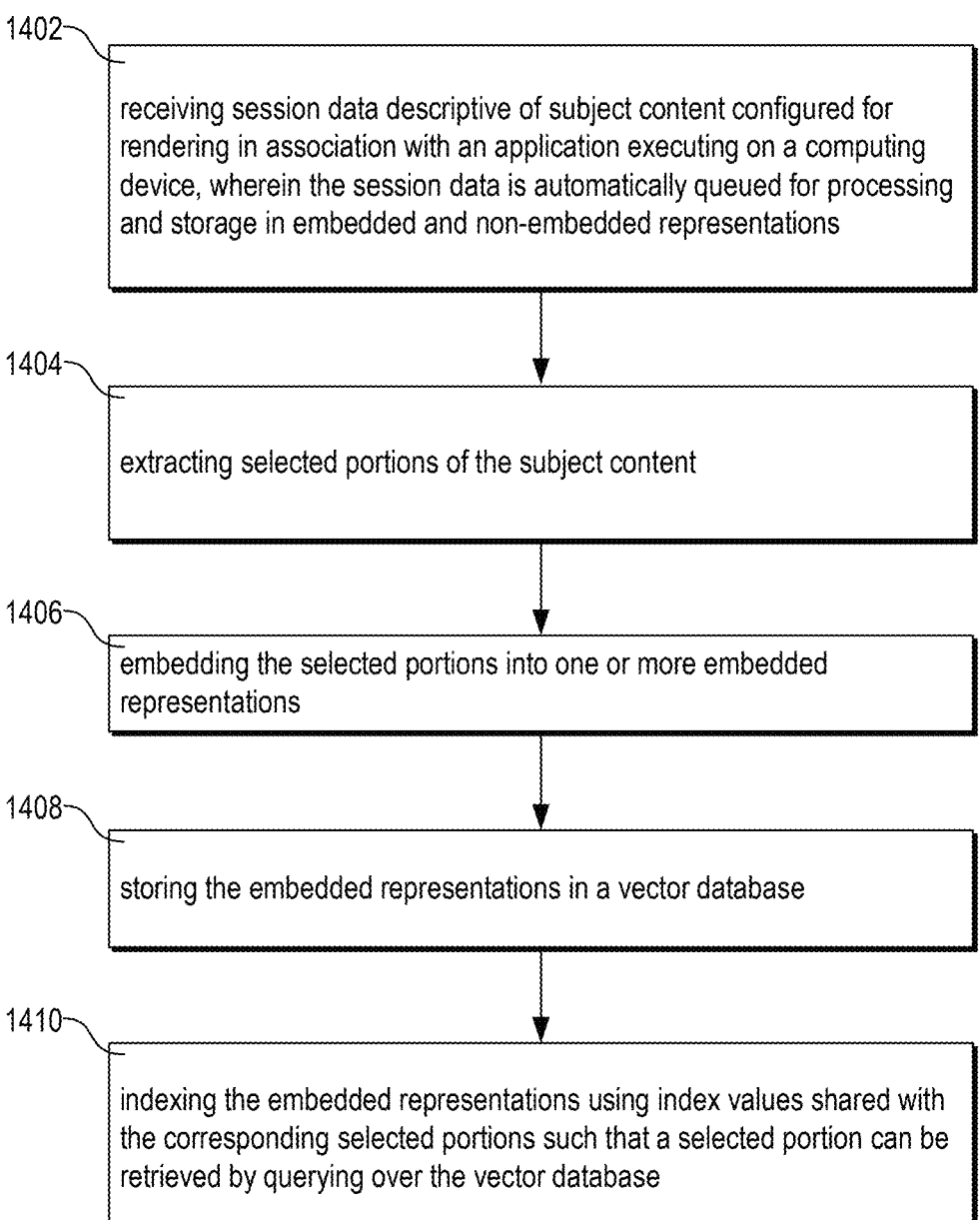

1402 receiving session data descriptive of subject content configured for rendering in association with an application executing on a computing device, wherein the session data is automatically queued for processing and storage in embedded and non-embedded representations

1404 extracting selected portions of the subject content

1406 embedding the selected portions into one or more embedded representations

1408 storing the embedded representations in a vector database

1410 indexing the embedded representations using index values shared with the corresponding selected portions such that a selected portion can be retrieved by querying over the vector database

Obtaining a training instance

1504

Processing, using one or more machine-learned models, the training instance to generate an output

1506

Receiving an evaluation signal associated with the output

1508

Updating the machine-learned model using the evaluation signal

WEB BROWSER WITH INTEGRATED VECTOR DATABASE

PRIORITY

This application claims priority to U.S. Provisional Patent Application No. 63/616,468 (filed Dec. 29, 2023), which is hereby incorporated by reference herein in its entirety.

FIELD

The present disclosure relates generally to machine learning processes and machine-learned devices and systems. More particularly, the present disclosure relates to efficient architectures and frameworks for implementing machine-learned components and systems.

BACKGROUND

A computer can receive input(s). The computer can execute instructions to process the input(s) to generate output(s) using a parameterized model. The computer can obtain feedback on its performance in generating the outputs with the model. The computer can generate feedback by evaluating its performance. The computer can receive feedback from an external source. The computer can update parameters of the model based on the feedback to improve its performance. In this manner, the computer can iteratively "learn" to generate the desired outputs. The resulting model is often referred to as a machine-learned model.

SUMMARY

Aspects and advantages of embodiments of the present disclosure will be set forth in part in the following description, or can be learned from the description, or can be learned through practice of the embodiments.

In an aspect, the present disclosure provides a first example computer-implemented method. The first example method includes receiving input data describing a user interaction with a user computing device. The first example method includes determining session data descriptive of operations of the user computing device. The first example method includes constructing, using the session data, an input sequence that is configured for input to a machine-learned sequence processing model to perform a task associated with the input data. The first example method includes obtaining a response sequence generated by processing the input sequence using the machine-learned sequence processing model. The first example method includes parsing the response sequence to generate output data for performing an operation of the user computing device.

In an aspect, the present disclosure provides a second example computer-implemented method. The second example method includes receiving session data descriptive of subject content configured for rendering in association with an application executing on a computing device, wherein the session data is automatically queued for processing and storage in embedded and non-embedded representations. The second example method includes extracting selected portions of the subject content. The second example method includes obtaining an embedded representation that was generated by embedding the selected portions using a machine-learned embedding model. The second example method includes storing the embedded representations in a vector database. The second example method includes indexing the embedded representations using index values shared with the corresponding selected portions such that a selected portion can be retrieved by querying over the vector database.

In an aspect, the present disclosure provides one or more non-transitory computer-readable media that store instructions that are executable by one or more processors to cause a computing system to execute the first example method, the second example method, or both the first example method and the second example method.

In an aspect, the present disclosure provides a computing system having one or more processors and one or more non-transitory computer-readable media that store instructions that are executable by the one or more processors to cause the computing system to execute the first example method, the second example method, or both the first example method and the second example method.

For example, an example computing system includes one or more processors and one or more non-transitory computer-readable media. In the example computing system, the one or more non-transitory computer-readable media store a vector database of embedded representations of session data, the vector database based on session data descriptive of subject content configured for rendering in association with an application, the embedded representations being embedded, using a machine-learned embedding model, based on selected portions of the session data. In the example computing system, the one or more non-transitory computer-readable media store instructions that are executable by the one or more processors to cause the computing system to execute one or more operations. In the example computing system, the one or more operations include retrieving, for a given query vector, a selected portion using a vector-based similarity search over the vector database. In the example computing system, the one or more operations include populating an input sequence using retrieved selected portions. In the example computing system, the one or more operations include providing the input sequence to be processed by a machine-learned sequence processing model.

Other example aspects of the present disclosure are directed to other systems, methods, apparatuses, tangible non-transitory computer-readable media, and devices for performing functions described herein. These and other features, aspects, and advantages of various implementations will become better understood with reference to the following description and appended claims. The accompanying drawings, which are incorporated in and constitute a part of this specification, illustrate implementations of the present disclosure and, together with the description, help explain the related principles.

BRIEF DESCRIPTION OF THE DRAWINGS

FIG. 8 is an illustration of an example user interface of an example system according to example implementations of aspects of the present disclosure.

FIG. 9 is an illustration of an example user interface of an example system according to example implementations of aspects of the present disclosure.

FIG. 13 is a flow chart diagram illustrating an example method for implementations according to example implementations of aspects of the present disclosure.

FIG. 14 is a flow chart diagram illustrating an example method for implementations according to example implementations of aspects of the present disclosure.

DETAILED DESCRIPTION

Figure 1:
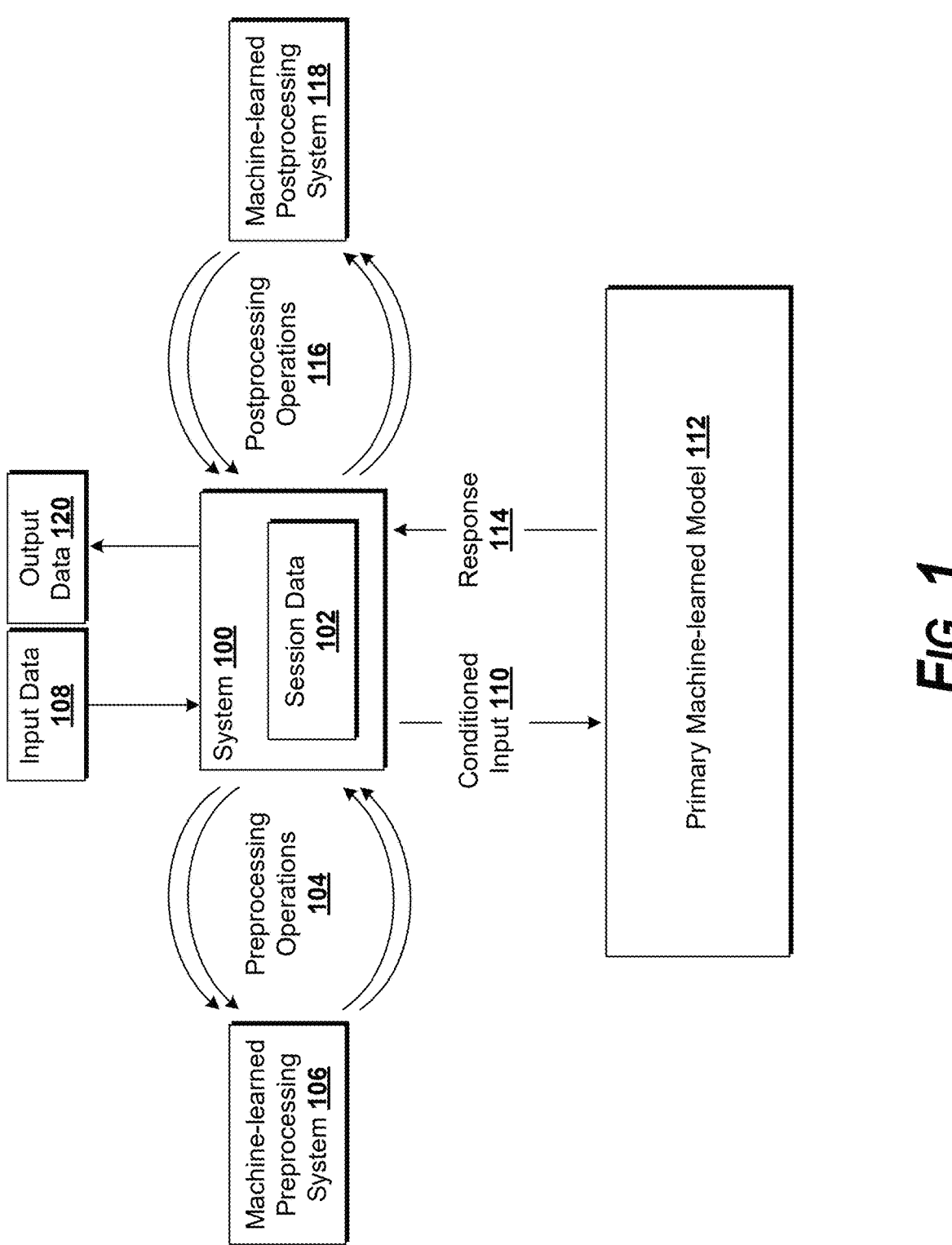
FIG. 1 is a block diagram of an example system according to example implementations of aspects of the present disclosure.

Generally, the present disclosure is directed to systems, devices, and techniques for implementing real-time input conditioning for processing queries with machine-learned systems and models. Input conditioning can include processing an initial or raw user action and intelligently curating context data and instructions for input to a machine-learned model to perform a task associated with the user action. Input conditioning can significantly improve the performance of a machine-learned model compared to simply passing raw user inputs.

Advantageously, example implementations of the present disclosure can enable real-time input conditioning by subdividing an inference task into discrete operations. At least some of these operations can be preprocessing operations that can be implemented in parallel. The operations can be implemented using specially adapted models or other system components. By breaking down a task into multiple smaller, possibly parallelizable components according to an explicit logic structure, the overall processing time can decrease while increasing consistency, interpretability, and performance.

Existing approaches to performing tasks with machine-learned models have trended toward using larger and larger models that can directly consume large amounts of context. This approach offers an attractive simplicity: provide the model with all the data and let it sort out what it needs to perform the task at hand. Sufficiently powerful models can provide suitable correctness in some instances. However, for real-time applications, the size of such models can present numerous challenges. High parameter counts can place extreme demands on memory capacity (for holding the weights in memory), memory bandwidth (for loading and unloading parameters to processor cores between executions), persistent storage, processor speed, and the like. For example, a model with 500 billion parameters in half precision translates to about one terabyte in memory footprint just for model parameters. Real-time inference at this scale generally requires multiple parallelized instances of high-power machines. Using top-of-the-line graphics cards with approximately 100 GB RAM would still lead to using ten such cards—some of which can have a power consumption at full utilization of up to 1 kW each—just to hold a single instance of the model in memory, without any consideration to caching or other memory demands.

Advantageously, example implementations of the present disclosure provide techniques that leverage structured preprocessing and postprocessing tasks to offload demand on a primary machine-learned model. Reducing a complexity of a task can lead to nonlinear improvements in processing time and efficiency. For example, task specific models can be multiple orders of magnitude more efficient at performing their specific task as compared to a general-purpose model applied to the same task, even if correctness or other accuracy metrics can be comparable.

Example implementations can use a lightweight tool manager model that can process an input and determine which tools (e.g., which can include task-specific models) to invoke to perform various functions. The tool manager model can select none, one, or multiple tools in sequence to fulfill an input request. One of the tools can operate an API to control the interface of the host application, such as by WebSockets or similar if operating remotely. As such, if the tool manager model determines to open a new window or popup in response to an input, it can initiate and control the performance using multiple tools.

Example implementations can use multiple different models to efficiently perform various steps of a task to generate an input for a primary model that is conditioned by results of the completed preprocessing. The conditioned input can be focused on providing the most salient signals to the primary model for the task at hand. With a lower amount of higher quality context to consume, the primary model can be implemented more efficiently. In some instances, a smaller primary machine-learned model can be used. In some instances, a large primary machine-learned model can be more efficiently queried using smaller, more carefully curated inputs.

The division of labor between preprocessing models, primary model(s), and postprocessing models can follow a predetermined instruction framework. The framework can further offload processing logic from learned components. For example, if a particular evaluation step is to be performed responsive to a particular trigger, this condition can be directly and deterministically encoded into a predetermined instruction framework: parameters of a model need not be trained to learn the condition, thereby freeing the parameters to better learn other decision boundaries.

Example preprocessing operations can include executing a machine-learned model to return a categorical indicator of a relevance of a particular type of data or tool to a given task. This operation can be much simpler to execute than a query over all available data. As such, a smaller, simpler model can be used as a type of gating function. If a particular type of data or tool is identified as relevant, then the system can proceed to evaluate what specific data of that type should be included as context or proceed to directly call the identified tool. Otherwise, the data type or tool can be categorically ignored, dramatically simplifying the processing flow.

Multiple categorical indicators can be generated. When appropriate, they can be generated in parallel. For instance, multiple smaller models can be executed in parallel to evaluate a relevance of different features to a given set of user action data. Multiple categorical indicators can be generated in parallel using batch processing through a common model or model backbone.

Example preprocessing operations can include maintaining a data store of embedded representations of session data describing an operational environment. For example, rich context for interpreting a user action with respect to a computing device can be drawn from a record of recent interactions with the user (e.g., inputs from the user, outputs rendered to the user, etc.). Storing this session data using representations in a latent embedding space can facilitate rapid reasoning over session data events using low-level computational operations (e.g., vector distance operations, clustering, etc.). In this manner, context signals relevant to a subsequent particular user action can be quickly and efficiently retrieved for constructing a compact input to a primary machine-learned model.

Further, preprocessing session data events into a latent embedding space can facilitate complex operations to be performed directly in the latent embedding space without even using a primary machine-learned model. For instance, retrieval tasks can be performed natively within the embedding space without requiring additional calls to a machine-learned model to evaluate the session data to return relevant results.

Example preprocessing operations can include maintaining a current predicted interaction trajectory for user actions. For instance, a machine-learned model can process prior states of a system to characterize what tasks the user was performing and predict what tasks the user aims to perform. This trajectory can then form part of a conditioned input to contextualize any given query within a sliding window of tasks and goals. This can help focus model inferences on helping advance a current task and benefit from signals gleaned from prior tasks (e.g., not repeating operations that have been previously canceled or rejected by a user). This separately generated interaction trajectory can have a stronger effective signal to noise ratio as compared to raw session data. In this manner, for instance, these preprocessing operations can lead to richer, more compact inputs to downstream models.

An example real-time input conditioning system can provide an interaction assistance system for a user computing device. For example, an example interaction assistance system can operate as an intermediate layer in a human-machine interface to receive user action data that describes user actions with a user computing device, interpret the actions in context, and intelligently instruct or command the host system to perform tasks associated with the user action data.

An example interaction assistance system can enable faster and more efficient human-machine interfaces by simplifying a number or complexity of inputs to perform a given task. An example interaction assistance system can use real-time input conditioning according to the present disclosure to efficiently leverage a processing capacity of a computing device (or system of devices) when providing this expanded functionality.

An example interaction assistance system can enable a user's interactions with a computing device to be augmented in real time with rich context from past and current session data. This augmentation can enable relatively simple user inputs to initiate complex tasks.

For example, an example interaction assistance system can provide a natural-language based input field for providing natural language instructions for performing a task. A relatively simple instruction such as "back up the photos from my trip to Spain" on its face may ordinarily lack sufficient detail on its own for a computing system to properly execute it. For example, there are many technical details that are not explicitly recited in the instructions: where the photos are located, which photos are from Spain, where the photos are to be backed up, etc.

In an example, an interaction assistance system executing on a computing device can receive the input "back up the photos from my trip to Spain" in a natural language instruction field. The interaction assistance system can parse the input and embed it into a latent embedding space using one or more embeddings. The interaction assistance system can compare an embedding against embedded session data objects from prior sessions in which backups were performed. Based on a similarity, the interaction assistance system can retrieve a session data object that identifies that "back up" operations copy files to a prescribed network drive. The interaction assistance system can determine a similarity of an embedding with embedded session data objects from prior sessions in which photos were imported to the computing device. Based on a similarity, the interaction assistance system can retrieve a session data object that identifies a location of photos. The interaction assistance system can determine a similarity of an embedding with embedded session data objects representing an embedded representation of geolocation data in photo tags in the photo location. Based on a similarity, the interaction assistance system can retrieve a session data object that identifies photo filenames associated with a matching geolocation tag.

The interaction assistance system can leverage a preprocessing model to evaluate the relevance of one or more tools to the input. For example, the interaction assistance system can provide the input to a first preprocessing model to determine if a photo editing tool is relevant to the request. The first preprocessing model can process the input and return a negative indicator that indicates that a photo editing tool is categorically not relevant. The interaction assistance system can provide the input to a second preprocessing model to determine if a file copying tool is relevant to the request. The second preprocessing model (which can be the same or different from the first model) can return a positive indicator that indicates that a file copying tool is relevant to the request.

Based on the retrieved session data objects and the returned positive indicator that a file copying tool is relevant to the request, the interaction assistance system can generate an input to a primary machine-learned model. For instance, a primary machine-learned model can be a machine-learned sequence processing model configured to process natural language inputs and generate natural language outputs. The input sequence can include a request for an executable script to implement the original instruction "back up the photos from my trip to Spain" using the identified file copying tool. The input sequence can include an indication that relevant information can be found in the enclosed retrieved relevant data objects and the input schema associated with the file copying tool. The interaction assistance system can provide the input sequence to the primary machine-learned model and receive an output sequence containing the script. The interaction assistance system can output the script to be executed by an operating system of the computing device to perform the task.

In this manner, for example, the interaction assistance system can facilitate instructions to a computing device to perform technically complex tasks responsive to simple instructions from a user, enabling such tasks to be performed with significantly fewer interactions from a user. Further, the capabilities of this powerful human-machine interface can be achieved with low latency by using highly efficient preprocessing and retrieval to construct pointed and focused inputs to a primary machine-learned model, without which performing the requested task might be intractable or incur significant processing delays (e.g., providing a list of all files on device and all possible tools to the model, etc.).

An example interaction assistance system can advantageously provide improved accessibility of computing devices and systems for differently abled users without decreasing performance or excessively increasing processing overhead. For example, many traditional approaches to increasing accessibility operate on top of existing software on a device, creating additional processing overhead that penalizes accessible design with reduced performance. In contrast, example interaction assistance systems can provide native accessibility by building from an architecture that is constructed from the ground up to augment user inputs to perform tasks.

For instance, an example interaction assistance system can enable multiple interaction modalities that share a common set of contexts in the embedded session data. For example, user action data can be captured in various data modalities: audio recordings of spoken input, sensor data describing input gestures, image data depicting facial expressions, gestures, or other signals, and the like. These inputs can include requests for tasks to be performed, such as answering a question, retrieving data, controlling a device, etc. To help understand the requests or the task to be performed, session data can be retrieved from an embedded data store. The session data can be retrieved by embedding the user action data into the latent embedding space for comparison to embedded session data objects in the embedded data store. The session data can itself represent data from various different modalities. Comparison in the latent embedding space can natively enable such cross-modality retrieval using highly parallelizable, efficient computations. Instead of requiring additional processing overhead that layers on top of a given software application, accommodations for alternate input modalities can natively leverage the same computational accelerations as any other input modality.

An example implementation of an interaction assistance system can include a web browser. A web browsing application that implements an interaction assistance system according to the present disclosure can unlock new possibilities of human-computer interaction by significantly reducing the complexity of inputs used to access and use the vast amounts of information accessible via the browser.

For instance, web browsing often occurs in sessions during which multiple different web resources can be loaded, sometimes simultaneously. The web resources can cover wide ranges of information in numerous modalities. Browsing tasks can span long intervals: for instance, a research task can involve multiple search queries and numerous loaded web pages, some of which may be closed, bookmarked, or persisted in tabs over multiple days or weeks. Browsing tasks can occur in parallel. While a user completes a research task, the user might also perform a communication task, a shopping task, etc. also using the browser.

An interaction assistance system can simplify inputs used for engaging with web content. For example, a research task can involve accessing a wide spectrum of web content and then assimilating or comparing data across content sources. Some traditional systems place the burden on the user to open, consume, retain, and then apply the information from various sources. Other systems that do use learned models to respond to queries can be too general to offer utility when seeking to evaluate specific instances of web content, such as evaluating particular web pages loaded by a browser over one or more sessions.

In contrast, an example web browser according to the present disclosure can automatically embed web content into an embedded data store that maintains session data for a number of web sessions. A user can query the web browser using simple instructions: for instance, after loading a number of apartment lease listings in the browser, the user can initiate an audio input modality and ask, "which of these listings are within 15 minutes from work." This input can be translated into a natural language instruction or can be directly embedded into a latent representation.

To service this query, the browser can obtain one or more embeddings representing the query. According to a predetermined preprocessing framework, the browser can query a model to determine if one or more current tabs are relevant to the query. The model can return a categorical indicator that current tabs are relevant to the query. The browser can then retrieve portions of the session data associated with the current tabs. For instance, a similarity search between the embedded query that references location can indicate a relevance between the query and one or more portions of the respective pages that indicate a location. These chunks of the pages can be retrieved as relevant context. Alternatively, the browser can, for each session data object, query a machine-learned model to request information from each page that is relevant to the query. By querying in discrete chunks, all the pages can be efficiently parsed in parallel. The returned page chunks can be retrieved as relevant context and indexed as pertaining to separate tabs by their corresponding tab identifiers. The returned page chunks can include, for example, addresses of the apartments.

According to the predetermined preprocessing framework, the browser can query a model to determine if user account information is relevant to the query. The model can return a categorical indicator that user account information is relevant to the query. In some instances, the model can be configured to identify a type of data that is relevant to the query. For instance, the model can indicate that pinned location data is relevant to the query. The browser can then retrieve pinned location data as relevant context.

According to the predetermined preprocessing framework, the browser can query a model to determine if one or more tools are relevant to the query. The model can return a categorical indicator that a mapping tool is relevant to the query. The browser can then retrieve a schema for implementing the mapping tool as relevant context.

Advantageously, these example preprocessing steps can be implemented in parallel using a parallel processing accelerator.

Based on the retrieved session data objects, user account data, and the returned positive indicator that a mapping tool is relevant to the request, the browser can generate an input to a primary machine-learned model. For instance, a primary machine-learned model can be a machine-learned sequence processing model configured to process natural language inputs and generate natural language outputs. The input sequence can include a request for an executable script to implement the original query "which of these listings are within 15 minutes from work" using the identified mapping tool. The input sequence can include an indication that relevant information can be found in the enclosed retrieved relevant data objects and account data as well as the input schema associated with the mapping tool. The browser can provide the input sequence to the primary machine-learned model and receive an output sequence containing the script. The browser can output the script to be executed by an interpreter that is configured to implement such scripts. For instance, the script can include instructions to iterate through the addresses and query the mapping tool for a one-way drive time between each address and a pinned location for "work." The script can include an instruction to store an identifier associated with each address in a list if the drive time is less than 15 minutes. The script can include an instruction to return a tab identifier associated with the addresses in the list.

The browser can receive a returned value from the script. Based on a predetermined processing framework, the browser can query a postprocessing model to determine if one or more actions are to be performed based on the output. For instance, a postprocessing model can evaluate the output to determine if a window state of the browser is to be changed. A postprocessing model can evaluate the output to determine if a new web URL is to be loaded or a search query is to be performed. In the present example, these indicators can be returned as negative.

A postprocessing model can evaluate whether one or more tabs are to be highlighted. For example, it can be predetermined that a common query modality will include requests to identify tabbed web resources that meet certain criteria. Accordingly, a postprocessing model can quickly evaluate whether to invoke that modality of output action and determine that such an output action is relevant. This model can return a positive indicator. Based on the positive indicator, the browser can output action data that, when executed by the browser, causes the browser to iterate through the list of tab identifiers and highlight the corresponding tabs.

In this manner, for example, the browser can facilitate instructions to a computing device to perform technically complex tasks responsive to simple instructions from a user, enabling such tasks to be performed with significantly fewer interactions from a user. For instance, previously the user would need to manually open each tab, find an address, navigate to a mapping tool, compute the travel time, and manually prune listings that did not satisfy the criterion. As illustrated in the example above, an example web browser can leverage embedded session data and highly parallelizable preprocessing to construct rich, targeted queries for processing by a primary machine-learned model for executing complex tasks in real time based on straightforward, simple inputs.

Example implementations of the present disclosure can provide a number of technical effects and benefits. Example implementations can provide new mechanisms for inputting commands and instructions and receiving low-latency, real-time results that might not be possible without the efficient, parallelizable architecture taught herein.

For instance, maintaining a cache of preprocessed session data in a vector-based storage format can allow for rapid querying in real time to determine relevant session data for conditioning an input to a primary model. By processing such queries in a vector space, and by using lightweight machine-learned preprocessing models, example implementations can be specially adapted to user computing devices that include parallel processing accelerators. For example, user computing devices can include onboard parallel processing accelerators such as a graphics processing unit (GPU) or an application specific integrated circuit (ASIC) configured for machine-learned model execution. These processing units can be adapted for highly parallelizable tasks. Example implementations of the present disclosure can perform parallelizable task subcomponents using smaller models that can be practical to execute locally using onboard parallel processing accelerators. For instance, traditional data stores can rely on CPU-intensive search tasks. In contrast, by preprocessing session data into vector-based data representations, example systems can leverage the generally far higher core count of hardware parallel processing accelerators to increase a parallelization of the retrieval task to decrease a latency of computation at query time.

Such advantages can be obtained by preprocessing session data in the background in readiness for future queries, such that at query time the vector store can be queried with low latency. For instance, maintaining an interaction trajectory in the background can enable the trajectory to be recalled with low latency at query time without first having to generate a trajectory. By leveraging parallel processing cores to compute background operations, the computational bandwidth at query time can be freed to reduce a latency of computation of the query.

Vector-based session data storage and retrieval of example implementations of the present disclosure can improve a utilization of parallel processing capacity of user computing devices. For example, querying for relevant session data can be efficiently executed using highly parallelizable vector comparison operations using GPU or ASIC cores. This can facilitate low latency responses without unduly tasking a main system processor, leading to improved performance with more efficient compute utilization.

In this manner, for instance, inputs of various modalities can all be embedded into a common latent space. This can allow each input modality to leverage the same processing efficiencies, with only input and output encoders/decoders differing between alternate modalities. As such, example implementations can be built around improved accessibility from the ground up.

Breaking the task into preprocessing, primary processing, and postprocessing stages can enable smaller primary machine-learned models to be used such that overall compute usage can be decreased. Some tasks can be performed using on-device primary machine-learned models, such as models small enough to execute in real-time on the consumer hardware in user computing devices. This can reduce a dependence on server-side processing. This can advantageously avoid the corresponding network communications to send inputs and receive outputs, freeing network bandwidth and reducing a computational cost all along the network chain. This can also decrease security vulnerabilities by minimizing exposure of potentially sensitive transmissions on public infrastructure.

Further, using categorical preprocessing tasks can provide additional advantages of providing strong signals to include or omit data in a conditioned input. For instance, a categorical determination of relevance of a category can allow for low-latency, direct processing logic to stop further processing with respect to that category. This in turn can reduce a computational burden of both the preprocessing task and the resulting conditioned input by simplifying the preprocessing task and shortening the conditioned input sequence.

Further, using categorical preprocessing tasks can enable multiple categorical tasks to be performed in parallel (e.g., using separate parallel cores of a parallel processing accelerator). The preprocessing tasks can leverage machine-learned models (e.g., transformer based models), such that each parallel preprocessing task can itself be parallelized onto multiple parallel processing cores. In this manner, for instance, the architectures described herein can be specifically adapted to leverage the high core counts of parallel processing accelerators to achieve low latency operation.

Further, by decreasing the demand at server systems, an increase in local processing can distribute resource usage to minimize hot spots. Decreasing server-side processing demands can decrease highly concentrated energy consumption and corresponding emissions (e.g., thermal emissions, audio emissions, greenhouse gas emissions, etc.), thereby minimizing disturbance to the environment and increasing the feasibility of integrating into local environments using local energy sources.

Further, by leveraging more on-device processing (e.g., using smaller preprocessing/postprocessing models), example implementations can reduce a size of network transmissions. This can in turn decrease an impact of network latency on an overall system latency. In this manner, systems can operate in areas of lower network speeds, or use VPNs or other protocols that increase latency, without increasing a total latency beyond a desired amount.

In a similar manner, querying a large primary machine-learned model using smaller, more carefully curated inputs can likewise enable server-side efficiencies. More efficient hardware can be used to execute the inference passes within the desired latency targets. Systematic construction of input structures can provide for improved consistency of inputs that can be used for improved load balancing server-side: various banks of servers can be adapted to efficiently service particular types of requests that have consistent input characteristics. For instance, server hardware can be optimized based on an expected input size with appropriate parallelization and caching schemes adapted to inputs of that expected size.

In an example aspect, example implementations can use an embedded session data storage system that controls how computing devices perform search operations. For instance, computing devices can perform searches using vector-based search methods, such as similarity searches. This can optimize the compute resources used to perform the searches by enabling highly parallelizable computation of queries against the stored data.

Various example implementations are described herein with respect to the accompanying Figures.

FIG. 1 is a block diagram of an example system 100 according to example aspects of the present disclosure. Example system 100 can operate within an operational environment, such as an operating system of a computing device. Example system 100 can include session data 102. Session data 102 can include data describing past and present operations of system 100. Session data 102 can be collected, curated, or generated using one or more preprocessing operations 104 performed by a machine-learned preprocessing system 106.

System 100 can receive input data 108. Input data 108 can describe an instruction, request, or other query for performing a task using system 100. System 100 can preprocess input data 108 using one or more preprocessing operations 104 performed by a machine-learned preprocessing system 106. System 100 can use machine-learned preprocessing system 106 to generate a conditioned input 110 to a primary machine-learned model 112 to obtain a response 114.

System 100 can postprocess response 114 using one or more postprocessing operations 116 performed by machine-learned post processing system 118. System 100 can generate output data 120 based on postprocessed response 114. Output data 120 can include content or data for controlling the computing device, such as for updating a rendering output by the computing device, performing further operations using other software or programs installed on the computing device, etc.

System 100 can include a dedicated computing device or can be implemented using hardware, firmware, or software components installed in one or more computing devices to provide various functionality as part of a larger operational environment. For example, system 100 can be an operating system that interfaces between low level firmware that controls hardware components of a computing device and a constellation of installed applications and services that also operate on the computing device. System 100 can be an application or service that operates within an operating system. System 100 can be a defined function, package, or module that is called by and operates within or otherwise on behalf of an application or service that operates within an operating system.

System 100 can include an interaction assistance system. An interaction assistance system can receive user action data that describes user actions with a user computing device executing system 100. An interaction assistance system can interpret the actions in context by reference to session data 102. An interaction assistance system can directly or indirectly control a host computing device or another computing device to perform tasks associated with the user action data.

An example interaction assistance system can enable faster and more efficient human-machine interfaces by simplifying a number or complexity of inputs to perform a given task. An example interaction assistance system can use real-time input conditioning according to the present disclosure to efficiently leverage a processing capacity of a computing device (or system of devices) when providing this expanded functionality.

System 100 can include an application. System 100 can be or be implemented by a web browser application. System 100 can be or be implemented by a communication application (e.g., that provides for sending and receiving messages, such as SMS messages, emails, chat messages, etc.). System 100 can be or be implemented by a video streaming application, including a videoconferencing application.

System 100 can be implemented on a mobile computing device, a personal computing device, a wearable computing device, a server computing device, or any other device, physically embodied or virtualized.

Session data 102 can include data describing states of an operational environment of system 100, data received by system 100, data generated by system 100, etc. Session data 102 can include content data describing content configured for rendering by a computing device (e.g., web pages, images, video, audio, text, etc.). Session data 102 can include past inputs, such as user inputs, data received from other applications or systems, etc. Session data 102 can include state data for various device sensors or other subsystems associated with a device implementing system 100.

Session data 102 can include an interaction history between a user and system 100. For instance, an interaction history can include a chat history of a natural language conversation between a user and a natural language interface of system 100. An interaction history can be multimodal, as system 100 can ingest and deliver multimodal content within conversations.

Session data 102 can include extracted data and embedded data. Extracted data can include data drawn directly from a native data source. Extracted data can be curated, cleaned, trimmed, etc. using one or more parsing operations. Embedded data can include projections of extracted data into latent embedding space using a machine-learned embedding model. For instance, a one or more machine-learned embedding models can process input data of various modalities and generate vector representations thereof. The vector representations can describe meaningful attributes of the input data in a manner that facilitates direct quantitative comparison.

Session data 102 can be constrained to approved data sources. For instance, a user can provide explicit permission for various data sources to be used to provide session data 102 for improving the performance of system 100. System 100 can provide an interface that identifies data sources that feed inputs to session data 102 and renders an input element for each identified data source that enables updates to a permission status associated with the identified data source.

Session data 102 can be maintained within a secured perimeter associated with a user or user account. Session data 102 can be maintained on a single device (e.g., a user device associated with a user account). Session data 102 can be maintained on multiple devices associated with a user account, including cloud computing instances that provide secured storage associated with the user account (e.g., to allow utilization of cloud compute resources, synchronization between devices, etc.).

Access to session data 102 can be conditioned on presentation of a verified security token. For instance, various cryptographic protocols can be used to confirm an authorization of requests for access to session data 102. System 100 can maintain an active authentication status. Other applications that present an authenticated security token (e.g., obtained by a user granting permission to such other applications using the user's secured credentials) can be provided access to session data 102.

Preprocessing operations 104 can include one or more operations performed by system 100 to prepare for executing a primary query using a primary machine-learned model. Preprocessing operations can include, for instance, automatically embedding session data.

For instance, preprocessing operations 104 can include processing a queue of session data objects. For example, a session data object can include a web page or resources of a web page. A session data object can include a text string, an image, an audio clip, log file, etc. System 100 can obtain session data objects from various different sources and add them to a queue for parsing for storage. System 100 can process the queue to parse and store session data objects in multiple formats. System 100 can store extracted data from a session data object and embedded data from a session data object. Preprocessing operations 104 can include generated reduced precision representations of a session data object for storage along with original precision representations.

Preprocessing operations 104 can include parsing input data 108 to determine a relevance of various categories of session data. For instance, preprocessing operations 104 can include determining a relevance of the input data to categories of data or tools. Preprocessing operations 104 can include generating, using machine-learned preprocessing system 106, categorical indicators of a relevance of a particular data type or category to input data 108. Preprocessing operations 104 can include generating, using machine-learned preprocessing system 106, categorical indicators of a relevance of a particular data type or category to input data 108.

Preprocessing operations 104 can include parsing identified relevant session data objects for particular relevant portions. For instance, preprocessing operations 104 can include passing a retrieved session data object (e.g., retrieved based on an identified relevance) to a machine-learned model with an instruction to return one or more portion(s) relevant to a given input data 108. For example, a chat history, activity history, or other record can be processed by a machine learned model that returns a portion of the history or record most related to a given input data 108.

Machine-learned preprocessing system 106 can perform preprocessing operations 104. Machine-learned preprocessing system 106 can perform preprocessing operations 104 in parallel. For example, machine-learned preprocessing system 106 can parse and embed multiple session data objects in parallel. Machine-learned preprocessing system 106 can preprocess input data 108 using multiple different models or queries in parallel.

Machine-learned preprocessing system 106 can be implemented on the same device as system 100 or on a different device. Machine-learned preprocessing system 106 can use some models executed on the same device as system 100 and use some models executed on a different device.

Machine-learned preprocessing system 106 can include multiple machine-learned models. Machine-learned preprocessing system 106 can include a common model backbone with multiple output heads. Machine-learned preprocessing system 106 can include an encoder portion that ingests an input sequence and one or more decoder portions that output various categorical indicators that indicate a relevance of the input sequence to various data categories, tools, etc. As new data categories or tools are made available, one or more portions of machine-learned preprocessing system 106 can be updated (e.g., retrained, added). For instance, a new decoder head can be added to perform classification for a new data category or tool.

Machine-learned preprocessing system 106 can include various different types of machine-learned models. Machine-learned preprocessing system 106 can include classification models that classify an input as relevant to a particular data category. Machine-learned preprocessing system 106 can include binary classification models. Machine-learned preprocessing system 106 can include sequence processing models with a general-purpose natural language output vocabulary, which can be prompted (e.g., few-shot) or fine-tuned for performing categorical determinations.

Machine-learned preprocessing system 106 can include image processing models, audio processing models, video processing models, sensor data processing models, etc. Machine-learned preprocessing system 106 can use multi-modal models. Machine-learned preprocessing system 106 can detect a modality of input data (e.g., detecting pixel values represented in an input, detecting a file type associated with a modality, etc.) and select an appropriate model for that modality.

An example machine-learned model of machine-learned preprocessing system 106 can be or include a machine-learned sequence processing model. An example machine-learned model of machine-learned preprocessing system 106 can be or include a machine-learned sequence processing model configured to generate natural language content. An example machine-learned model of machine-learned preprocessing system 106 can be a lightweight model configured to operate on a same device as system 100. For instance, an example machine-learned model of machine-learned preprocessing system 106 can include less than about 10 B parameters, such as less than about 5 B parameters, such as less than about 2 B parameters, such as less than about 1 B parameters, such as less than about 500 M parameters, such as less than about 300 M parameters, such as less than about 150 M parameters.

An example machine-learned model of machine-learned preprocessing system 106 can be a sequence processing model with a context window of less than about 2048 tokens. An example machine-learned model of machine-learned preprocessing system 106 can be a sequence processing model with a context window of less than about 8000 tokens. An example machine-learned model of machine-learned preprocessing system 106 can be a sequence processing model with a context window of less than about 16000 tokens. An example machine-learned model of machine-learned preprocessing system 106 can be a sequence processing model with a context window of less than about 32000 tokens.

Machine-learned preprocessing system 106 can include multiple models fine-tuned for different tasks. Machine-learned preprocessing system 106 can include multiple models distilled from a larger model (primary machine-learned model 112) for performing different tasks. Machine-learned preprocessing system 106 can include multiple models configured to execute different preprocessing tasks in parallel. For instance, multiple different models can evaluate, independently and in parallel, relevance of different types of session data or different tools.

Input data 108 can include data representative of user actions or inputs associated with system 100. Input data 108 can include signals from one or more input sensors of a computing device associated with system 100. Input data 108 can include data passed through an application programming interface of system 100. Input data 108 can include text data, image data, audio data, sensor data (e.g., touchscreen activation locations, inertial measurement unit data, location sensors, etc.), metadata associated with system 100, and the like.

System 100 can be configured to cause a computing device to render an input interface. The input interface can include a text field, a tap-to-speak button, or another mechanism for initiating capture of a command for controlling system 100. System 100 can receive an input provided via the input interface as input data 108.

Input data 108 can be associated with performing a task. A task can include executing any functionality for which system 100 is adapted. A task can include controlling the computing device to store data, retrieve and render data, input data, delete data, adjust a display of elements on a screen, question answering, classification, problem solving, etc. The task can include interacting with other devices or systems, other applications, etc.

Conditioned input 110 can include an input data structure based on input data 108 and augmented using session data 102. Conditioned input 110 can include outputs of preprocessing operations 104. Conditioned input 110 can be effectively filtered to include the most relevant context data from session data 102. Conditioned input 110 can be characterized by a higher signal-to-noise ratio as compared to raw session data 102, where signal strength can correspond to an amount of relevant context for the particular task.

Conditioned input 110 can be constructed using a defined structure of preprocessing operations 104. A predetermined preprocessing framework can include a sequence of defined operations that categorically assess input data 108 and determine what additional context will be helpful to include in conditioned input 110.

Primary machine-learned model 112 can be or include a machine-learned sequence processing model. Primary machine-learned model 112 can be or include a machine-learned sequence processing model configured to generate natural language content. Primary machine-learned model 112 can be a lightweight model configured to operate on a same device as system 100. For instance, primary machine-learned model 112 can include less than about 10 B parameters, such as less than about 5 B parameters, such as less than about 2 B parameters.

Primary machine-learned model 112 can be a cloud hosted model. Primary machine-learned model 112 can be a lightweight cloud hosted model optimized for latency. Primary machine-learned model 112 can be a large cloud hosted model. For instance, primary machine-learned model 112 can include more than about 100 B parameters, such as more than about 250 B parameters, such as more than about 500 B parameters.

Primary machine-learned model 112 can be a sequence processing model with a context window of less than about 2048 tokens. Primary machine-learned model 112 can be a sequence processing model with a context window of less than about 8000 tokens. Primary machine-learned model 112 can be a sequence processing model with a context window of less than about 16000 tokens. Primary machine-learned model 112 can be a sequence processing model with a context window of less than about 32000 tokens.

Primary machine-learned model 112 can be implemented using one or more discrete parallel processing accelerators. For instance, example discrete parallel processing accelerators can include a graphics processing unit (GPU) or an application specific integrated circuit (ASIC) configured for machine-learned model execution.

Primary machine-learned model 112 can be a multimodal sequence processing model. Conditioned input 110 can include data of multiple different modalities. For instance, conditioned input 110 can include session data objects that include text content, image content, audio content, video content, etc. Primary machine-learned model 112 can process the inputs to project the input data to a common latent space for prediction. Primary machine-learned model 112 can determine predicted output values based on the latent embeddings of the conditioned input 110.

Response 114 can include a generated response sequence based on conditioned input 110. Response 114 can include data responsive to a requested task. Response 114 can follow instructions provided in conditioned input 110. Response 114 can include natural language data, image data, audio data, programming language data, etc.

Postprocessing operations 116 can include parsing response 114 to identify an indicator of further actions to be taken. For example, response 114 can indicate that performing the task includes using an external tool. Machine-learned postprocessing system 118 can parse response 114 to identify the indication and initiate operations with the identified tool.

Machine-learned postprocessing system 118 can perform postprocessing operations 116. Machine-learned postprocessing system 118 can perform postprocessing operations 116 in parallel. Machine-learned postprocessing system 118 can postprocess response 114 using multiple different models or queries in parallel.

Machine-learned postprocessing system 118 can be implemented on the same device as system 100 or on a different device. Machine-learned postprocessing system 118 can use some models executed on the same device as system 100 and use some models executed on a different device.

Machine-learned postprocessing system 118 can include multiple machine-learned models. Machine-learned postprocessing system 118 can include a common model backbone with multiple output heads. Machine-learned postprocessing system 118 can include an encoder portion that ingests an input sequence and one or more decoder portions that output various categorical indicators that indicate a relevance of the input sequence to various tools, etc. As new data categories or tools are made available, one or more portions of machine-learned postprocessing system 118 can be updated (e.g., retrained, added). For instance, a new decoder head can be added to perform classification for a new data category or tool.

Machine-learned postprocessing system 118 can include various different types of machine-learned models. Machine-learned postprocessing system 118 can include classification models that classify an input as relevant to a particular data category. Machine-learned postprocessing system 118 can include binary classification models. Machine-learned postprocessing system 118 can include sequence processing models with a general-purpose natural language output vocabulary, which can be prompted (e.g., few-shot) or fine-tuned for performing categorical determinations.

Machine-learned postprocessing system 118 can include image processing models, audio processing models, video processing models, sensor data processing models, etc. Machine-learned postprocessing system 118 can use multimodal models. Machine-learned postprocessing system 118 can detect a modality of input data (e.g., detecting pixel values represented in an input, detecting a file type associated with a modality, etc.) and select an appropriate model for that modality.

Output data 120 can include various different data types and structures. Output data 120 can include commands configured to control an operating environment or device on which system 100 operates (e.g., to open a window, start an operation, execute a script or other code, etc.). Output data 120 can include data for rendering on an output interface of a computing device. Output data 120 can include direct responses to an input query in input data 108. Output data 120 can include data resulting from following the instructions in input data 108.

System 100 can perform various different tasks and assist user interactions in various different aspects. Examples are provided herein by way of example.

In an example, system 100 can be implemented in a smart home environment. In this context, for example, a user can interact with system 100 through a smart speaker or other voice-controlled device. The user could issue a command such as "tell me about my energy usage this month." This command can be received as input data 108.

Preprocessing operations 104, performed by machine-learned preprocessing system 106, can include determining the relevance of the command to various types of session data 102, such as data related to the current and past usage rates of smart home devices, user preferences, appliance databases, user communications to or from an energy company, etc. Preprocessing operations 104 can include embedding the command into a latent space for comparison with embedded session data objects.

Based on these preprocessing operations 104, a conditioned input 110 can be generated that includes the command and retrieved relevant data. System 100 can provide the conditioned input 110 to primary machine-learned model 112. Primary machine-learned model 112 can process the conditioned input 110 and generate a response 114. Response 114 can include a description of the user's home energy use for the prior month.

Postprocessing operations 116, performed by the machine-learned postprocessing system 118, can then interpret this response 114, determining the appropriate actions to be taken. These actions could include initiating a voice-based rendering of the response to read the response to the user. The actions can include initiating display of an energy usage chart on a display device.

In an example, system 100 can be implemented in a wearable health monitoring device, such as a smartwatch. The user can interact with system 100 through voice commands or touchscreen inputs. For instance, the user can issue a command such as "What was my average heart rate during my workout this morning?" This command can be received as input data 108.

Machine-learned preprocessing system 106 can perform preprocessing operations 104, which can include determining a relevance of the command to various types of session data 102. This can include data related to the user's heart rate during the specified time, the user's exercise history, and any other relevant health or activity data.

Based on preprocessing operations 104, a conditioned input 110 can be generated and passed to primary machine-learned model 112. Primary machine-learned model 112 processes the conditioned input 110 and generates a response 114. The response can include a statement of the user's average heart rate during the workout, as well as a comparison of that heart rate compared to prior workouts.

Machine-learned postprocessing system 118 can perform postprocessing operations 116 to interpret this response 114 and determine the appropriate actions to be taken. These actions could include generating a display on the smartwatch screen that shows the user's average heart rate during the workout using a native heart tracking application of the smartwatch device.

In an example, system 100 can be implemented in a customer service chatbot environment. In this context, a user might interact with system 100 through a text-based chat interface on a website or an app. The user might type a query such as "What is the status of my order?" This query can be received as input data 108.

Preprocessing operations 104, performed by machine-learned preprocessing system 106, can include determining the relevance of the query to various types of session data 102. This could include data related to the user's past orders, user account information, or other relevant contextual information, such as support bulletins related to supply chain delays for the product, a manufacturer's recall notices, etc. Preprocessing operations 104 can include embedding the user's text query into a latent space for comparison with embedded session data objects.

Based on these preprocessing operations 104, a conditioned input 110 can be generated and passed to primary machine-learned model 112. Primary machine-learned model 112 processes the conditioned input 110 and generates a response 114. The response could include information about the status of the user's order.

Postprocessing operations 116, performed by machine-learned postprocessing system 118, can interpret response 114, determining the appropriate actions to be taken. These actions can include formatting the response for display in the chat interface.

In an example, system 100 can be implemented in a web browsing context. A user browsing various e-commerce websites can have multiple tabs open, each showing a different coat product page from various online stores. The user can issue a command, "Which of these coats is made with organic cotton?" This command can be received as input data 108.

Preprocessing operations 104, performed by machine-learned preprocessing system 106, can include determining the relevance of the command to various types of session data 102. Preprocessing operations 104 can include embedding the user's command into a latent space for comparison with embedded session data objects (e.g., descriptive of content on the open tabs, such as the text and images displayed on each product page).

Based on these preprocessing operations 104, a conditioned input 110 can be generated and passed to primary machine-learned model 112. Primary machine-learned model 112 processes the conditioned input 110 and generates a response 114. The response can include information about which of the coats displayed in the open tabs are made with organic cotton.

Postprocessing operations 116, performed by machine-learned postprocessing system 118, can interpret this response 114, determining the appropriate actions to be taken. The actions can include highlighting the tabs that display coats made with organic cotton or opening a new tab with a summary of the results.

Various other example applications include communications applications (e.g., system 100 can help sort and filter emails or other messages or perform actions like scheduling based on user commands), personal assistants (e.g., system 100 can enhance the ability of virtual assistants to understand and execute complex user commands), accessibility software (e.g., system 100 can interpret and execute commands from users in a manner more accessible to their physiological constraints), educational platforms (e.g., system 100 can help navigate large volumes of reference content based on fuzzy queries), healthcare applications (e.g., system 100 can help interpret layperson queries regarding highly technical subject matter, such as patient queries or instructions), navigation applications (e.g., system 100 can help process complex route queries or instructions), etc.

As an illustrative example of the technologies described herein, an example implementation of a personal assistant includes an assistant application that can receive input data or session data describing an operational environment (e.g., using one or more sensors that provide input(s)) and perform one or more tasks on behalf of or in coordination with a user. Input data or session data can include image data. Input data or session data can include audio data. Input data or session data can include text data. Input data or session data can include location data (e.g., position, orientation, proximity to other devices, etc.). The assistant application can process such inputs to understand a task to be performed (e.g., based on stored session data, based on a generated interaction trajectory, etc.). The assistant application can generate one or more outputs to assist the user in completing the task. For example, the assistant application can generate a response that invokes an application programming interface to control an operational environment of the assistant application. The operational environment can include software executing on a computing system. For instance, the assistant application can generate a response that controls an application to perform all or part of a task. For example, the assistant application can control a browser application or other application by generating control instructions (e.g., to control clicks, selections, hyperlinks, etc.) to be implemented in the browser application.

In some implementations, the application being controlled by the personal assistant can distinguish between a human user and an assistant. In some implementations, the application being controlled by the personal assistant cannot or need not distinguish between a human user and an assistant.

In an example, native input signals (e.g., from a human-machine interface) may be implemented in the application using one control interface (e.g., a software control interface) while synthesized input signals from the assistant may be implemented using a different control interface.

In an example, the assistant may generate control signals that engage a control interface external to the controlled application (e.g., a control interface exposed by an operating system or other lower-level software of a device) to synthesize input signals that may be indistinguishable from inputs signals derived from a human-machine interface. For example, user input signals from a user interface device may be routed to the application via an application programming interface that is the same as an input signal from the assistant system, such that the assistant system may be able to natively control any application that can be controlled via existing user interface functionality.

In this manner, for instance, an assistant may be able to interact with and control applications that may not be equipped with automated control APIs. For example, an operating system may expose an API that can be invoked to simulate a click, press, touch, tap, drag, or other input at a position in an area of a display (e.g., an area of a physical viewport of a display or an area of a rendered viewport that may be headlessly rendered). For example, an operating system may expose an API that can be invoked to simulate a speech input. For example, an operating system may expose an API that can be invoked to synthesize an input using one or more sensors of a device (e.g., position sensors, accelerometers, microphones, cameras, image sensors, etc.).

In an example, a personal assistant system can operate cooperatively with a user. For example, both a user and an assistant may interact with an application to perform a task. In a web browsing example, both a user and an assistant may interact with an application (e.g., a web browser application) to access a website or other content. In a communication example, both a user and an assistant may interact with an application (e.g., an SMS text application, an email application, etc.) to exchange messages or facilitate a communication session. In an educational environment example, both a student user and a teacher assistant system may interact with an application (e.g., an online learning platform application or other educational application) to facilitate a student educational task. In a navigation example, both a driver and an assistant may interact with an application (e.g., a GPS navigation application, a mapping application, etc.) to perform a navigation task.

For instance, in a web browsing example, a user may be performing a search task (e.g., searching for indexed data regarding a particular topic). The user may input an initial search query with initial parameters. The initial results returned in response to the initial query may be numerous. The user may need to filter the results to identify the desired results. The user may interact with the assistant system (e.g., by providing an input) to cause the assistant system to interact with the web browser application to perform further filtering of the returned search results. For example, the assistant system may use stored session data to generate a conditioned input to a machine-learned model to cause the machine-learned model to generate control instructions to control the web browser application to select particular filters on a web-based search results page. The filters can be selected based on predictions by the machine learned model conditioned on the user's session data. In this manner, for instance, the assistant system can assist the user in interacting with the web browser application, and the assistant system can provide intelligent assistance based on the stored session data. For example, using the stored session data, the assistant system can "remember" preferences and goals of the user that are relevant to the search task and help reduce the amount of time the user spends interacting with the web browser application to select the filters.

In another example, a user may be interacting with a calendar application to schedule a meeting. The user may input an initial request to schedule a meeting with certain attendees at a particular time. The calendar application may return a list of available times. The user may find that none of the suggested times are suitable. The user may then interact with the assistant system (e.g., by providing an input) to cause the assistant system to interact with the calendar application to refine the search for available times. For example, the assistant system may use stored session data (e.g., the user's typical working hours, previously scheduled meetings, travel times to meeting locations, etc.) to generate a conditioned input to a machine-learned model. This model may then generate control instructions to control the calendar application to adjust the search parameters (e.g., expanding the time window, considering alternative days, suggesting alternative meeting locations based on travel times, etc.). The assistant system may also leverage the user's previous meeting preferences (e.g., preferred meeting durations, preferred meeting locations, etc.) stored in the session data to further refine the search. In this manner, the assistant system may assist the user in interacting with the calendar application, and the assistant system may provide intelligent assistance based on the stored session data and user preferences, potentially reducing the time and effort required for the user to schedule the meeting.

In another example, a user may be composing an email message using an email application. The user may begin by typing a subject line and a few sentences of the email body. The user may then pause, uncertain of how to proceed with composing the remainder of the email. The user may interact with the assistant system (e.g., by providing a vocal or textual input) to request assistance in completing the email. The assistant system may use stored session data (e.g., the user's past email communication patterns, the content of the subject line and initial email body text, the recipient's email address, etc.) to generate a conditioned input to a machine-learned model. This model may then generate a suggested completion of the email message. The assistant system may also leverage information about the recipient (e.g., their job title, company, etc.) to adjust the tone and content of the suggested completion. In this manner, the assistant system may assist the user in composing the email message, and the assistant system may provide intelligent assistance based on the stored session data and contextual information, potentially reducing the time and effort required for the user to complete the email.

In another example, a user may be using a photo editing application to enhance a photograph. The user may have already performed several editing steps, such as cropping, adjusting brightness and contrast, and adding filters. The user may then want to further enhance a specific aspect of the photograph, such as sharpening a particular area or removing blemishes. The user may interact with the assistant system (e.g., by providing a vocal or textual input, or by selecting a region of the photograph using a pointing device) to request assistance in performing this task. The assistant system may use stored session data (e.g., the user's past photo editing actions, the current state of the photograph, the user's preferences regarding photo editing styles, etc.) to generate a conditioned input to a machine-learned model. This model may then generate specific instructions for the photo editing application, such as adjusting specific parameters of a sharpening filter or applying a blemish removal tool to a particular region of the photograph. The assistant system may also use stored session data to suggest relevant tools or parameters based on the user's past behavior and preferences. In this manner, the assistant system may assist the user in interacting with the photo editing application, and the assistant system may provide intelligent assistance based on the stored session data and user preferences, potentially reducing the time and effort required for the user to achieve the desired photo enhancement.

In embodiments where a user and an assistant cooperatively control an application, a handoff procedure may be implemented to manage concurrent inputs. The system may employ a prioritized input scheme, where manual user inputs may always take precedence over assistant inputs. To avoid conflicts, the assistant may monitor user activity and temporarily suspend its actions when a user initiates direct interaction with the application. Upon detecting a pause in user activity, the assistant may resume its operations. Alternatively, the assistant may predict user intent and proactively perform actions that may be easily reversible or cancellable by the user. The application's user interface (UI) may be designed to visually indicate which entity (user or assistant) is currently controlling specific aspects of the application.

An example prioritized input scheme can be configured to identify a conflict between concurrent inputs and select one of the conflicting inputs to control. In an example, the selection can be determined using a user input received via a user interface prompt that presents a description of the two or more concurrent input options and allows a user to select one. In an example, the selection can be determined using one or more heuristics configured to select one as a default input. For instance, a heuristic may be configured to favor manual user input over assistant input, thereby preventing the interruption of a user's own manual control of the application. In some instances, concurrent inputs may not conflict. For instance, some tasks may be factorized into multiple component tasks that can be executed independently of one another. In such instances, for instance, a user may provide an input regarding one component task and an assistant may provide an input regarding another component task. The system can permit both control inputs to be implemented concurrently. In this manner, an assistant system can work with a user to accelerate task execution without disturbing or disrupting a user's current manual process in executing a task. In an example, a conflict can be detected based on an overlap in a target feature of the application that is targeted by a control input from each of the assistant and the user. For example, a conflict can include detecting that both the user and the assistant system are attempting to control a user interface element of an application.

To avoid conflicts, the assistant may monitor user activity and temporarily suspend its actions when a user initiates direct interaction with the application. Upon detecting a pause in user activity, the assistant may resume its operations. For example, a threshold for inactivity may be implemented to avoid interfering with a user that may simply be pausing to decide on a next course of action. User activity may be determined based on inputs received by a computing device executing the application. The set of inputs recognizable as tolling such inactivity may be configured based on a user's preferences (e.g., based on previous settings, based on machine-learning of a user's pattern of engagement with an application and interactions with an assistant interface, and the like) or based on a limited set of inputs associated with the current application.

The assistant may predict user intent and proactively perform actions while enabling the actions to be easily reversible or cancellable by the user. For example, when an assistant proactively performs an action (e.g., applying a filter to a photograph) rather than in response to a direct user request (e.g., a user 'clicks' on the filter button on a photo editing application screen), the assistant system may precompute one or more intermediate states of the subject application to enable the assistant system to revert or cancel the action (e.g., by returning to a previous state of the photo editing application) or modify the action (e.g., by applying a different filter, selecting a different parameter value, etc.) with lower latency than if the user had to manually reverse or cancel the action.

In an example, the assistant system can generate multiple candidate actions to be performed and, at a later point in time (e.g., responsive to a detected lack of activity by the user), can provide an output for display to the user indicating one or more of the candidate actions for presentation to the user for selection by the user. The assistant system can generate, in parallel, results for each of the candidate actions and allow the user to select a desired action to be implemented for the current task. Responsive to a selection of one of the candidate actions by the user, the assistant system can adopt the precomputed result of the selected candidate action and purge those precomputed results that the user did not select. If none of the proposed candidate actions are selected by the user, the assistant system can revert to a prior state.

The application's user interface (UI) may visually indicate when the assistant is currently controlling specific aspects of the application. The application user interface may use highlighting or an overlay effect applied to the user interface elements currently being manipulated by the assistant. A visual cue may be temporarily displayed only during the period of assistant control and may disappear once the assistant ceases control of that element. The visual cue may itself include an interactive element that allows a user to pause or suspend the control of the element.

In some implementations, all or part of an application interface subject to assistant control may be locked from user intervention to avoid conflict. A locked user interface can be configured to generate, responsive to detecting an interaction, a prompt for display on a display device to ask if the user would like to interact with the locked user interface. Responsive to receiving a response to the prompt that indicates the user would like to continue to interact with the locked user interface, the assistant system can stop control of the locked interface and provide control to the user. Responsive to receiving a response to the prompt that indicates the user would not like to continue to interact with the locked user interface, the assistant system can re-enable control of the locked interface to the assistant. A locked user interface can display changes in the underlying interface (e.g., rendering a web page as it is navigated; rendering changes to an image as it is edited; rendering a textual or audiovisual document or presentation as it is generated, etc.). A locked user interface can be annotated with an overlay indicating what portion of the interface the assistant is currently operating on (e.g., a highlighted border surrounding an interface section operated on by the assistant or grey overlay).

In an example, the personal assistant can operate as a machine-learned agent system. In some implementations, the agent system can be implemented as a "situated agent". The term situated agent refers to a setting in which the agent system shares one or more perceptual inputs with a human user. For example, the situated agent can receive and process various data inputs, including video, audio, and/or textual data which are also observable by the human user. The agent system can process these inputs to generate responses that are contextually-relevant for the user's physical or digital environment, for example enabling the agent system to generate dialogue or other responses or outputs which assist the user in understanding and/or navigating the environment.

Figure 2:
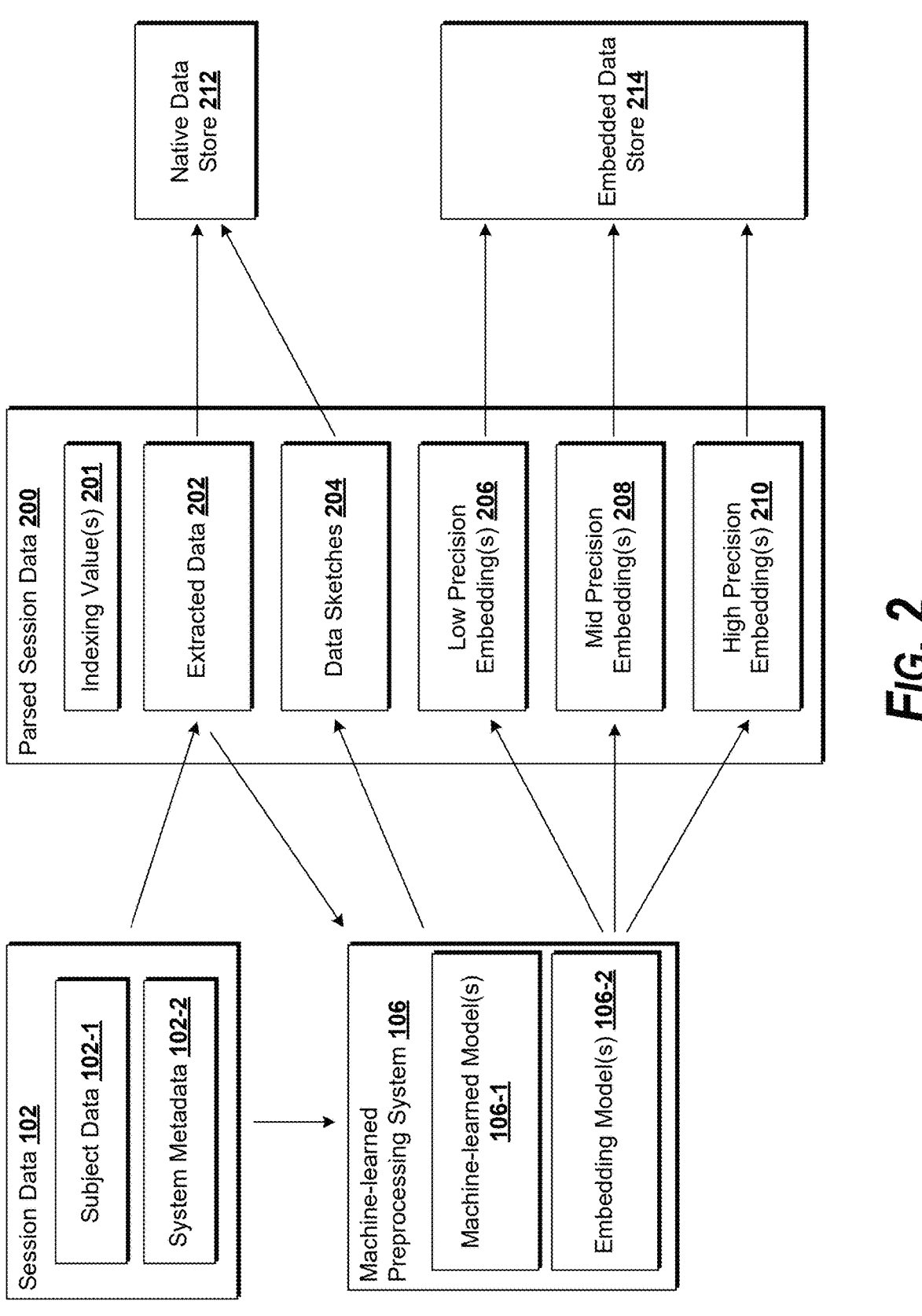
FIG. 2 is a block diagram of an example system according to example implementations of aspects of the present disclosure.

In further detail, an example session data parsing technique is described with respect to FIG. 2. FIG. 2 is a block diagram of an example processing flow for obtaining parsed session data 200 from session data 102. Session data 102 can include subject data 102-1 that describes foreground activity of system 100, such as content loaded for rendering by system 100 (e.g., web content, messages, or other display content), content input to the system (e.g., user inputs), etc. Session data 102 can include system metadata 102-2 that describes other contextual signals associated with subject data 102-1, such as current states of other sensors or other applications at the same or associated time steps.

Parsed session data 200 can include multiple different session data objects indexed using one or more indexing values 201 for retrieval. Parsed session data 200 can include extracted data 204 drawn directly from session data 102. Extracted data 202 or session data 102 can be processed using one or more machine-learned models 106-1 of machine-learned preprocessing system 106 to generate data sketches 204. Data sketches 204 can include one or more different reduced-precision representations of extracted data 202 (e.g., captions of images, summaries of text, keywords, labels, etc.).

Machine learned preprocessing system 106 process session data 102, extracted data 202, and data sketches 204 to generate with different levels of precision. For example, one or more embedding models 106-2 can process coarse sketches of data sketches 204 (e.g., keywords, tags, etc.) to generate low precision embeddings 206. In this manner, for instance, low precision embeddings 206 can provide an embedded representation of high-level details of session data 102. A query against a low precision embedding 206 can thus quickly represent an alignment between a query and main attributes of session data 102. Similarly, embedding model(s) 106-2 can process more refined data sketches 204 (e.g., summaries of web pages, application sessions, documents, videos, messages, etc.) to generate mid precision embeddings 208. In this manner, for instance, a query against a mid-precision embedding 208 can represent more nuanced alignment between a query and particular attributes within session data 102. Similarly, embedding model(s) 106-2 can process direct chunks of session data 102 or chunks of extracted data 202 to generate high precision embeddings 210 that reflect the content of different portions of session data 102 with high specificity. In this manner, for instance, a query against a high precision embedding 210 can represent alignment between a query and a specific content attribute of session data 102.

Machine-learned preprocessing system 106 can also generate variable precision embeddings without using data sketches 204. For instance, Machine-learned preprocessing system 106 can vary a chunk size and embed the various size chunks. Larger chunk sizes can lead to lower precision embeddings with broader representation of the content while smaller chunk sizes can lead to higher precision embeddings of more specific content aspects.

In a web browser example, a machine-learned preprocessing system 106 can process web content to a series of databases in the following manner. A page can be added to a processing queue. For example, processing can occur on a background thread. When the user visits a page, data pertaining to the page document can be stored in a SQL database, and it can be added to a last-in-first-out queue to be processed asynchronously.

High precision data: The data pertaining to the page can include raw text extracted from the page HTML, the page title, and the page URL. The data pertaining to the page can include image or other content modalities as well.

Mid precision data: The page in its entirety can be summarized to generate a data sketch. The page can be summarized using a sequence processing model (e.g., primary model 112, another model, etc.). The page data can be chunked for long pages. Each chunk can be summarized, and all the chunk summaries can be summarized together. Image descriptions can be generated using an image processing or multimodal model. A website screenshot can be stored to depict the rendered HTML with all content. This image can be captioned as well.

Low precision data: The page summary can be processed using a sequence processing model to generate keywords, which can be used for faster, lower-resolution retrieval operations.

An embedding model can generate embeddings for high precision data, mid precision data, and low precision data. These can be added to the vector store. The entries in the vector store can be encoded with metadata matching the indexing values of the un-embedded data items to enable retrieval.

Search and retrieval can be performed in the vector domain. User input can be embedded, and distance measurement can be used to resolve matching vectors. Using indexing metadata, source documents can be resolved from the SQL database. The variety of data types can be used for different operations, depending on the scope of the request.

For example, where a request is scoped to a single page, vector search can be performed on the raw page contents. Where the scope is broader (e.g., a group of pages), summaries can be used as a proxy for the raw documents. For global level queries, metadata can be used as a coarser-resolution proxy for querying over a higher number of documents.

Parsed session data 200 can be stored in various different data storage structures. Extracted data 202 and data sketches 204 can be stored in a native data store 212. The native data store 212 can include a general-purpose database or other data storage framework associated with system 100.

Embedded data store 214 can store embedded session data objects (e.g., the embeddings 206, 208, 210). Embedded data store 214 can include a storage architecture specially adapted for facilitating efficient vector query operations (e.g., a vector database). Embedded data store 214 can be configured for efficient loading into a processing memory of a parallel processing accelerator. For instance, one or more portions of embedded data store 214 can be cached in a memory device allocated to or included in a parallel processing accelerator. For instance, recent embeddings can be maintained in a cache of a parallel processing accelerator to enable rapid retrieval of relevant context from recent session data.

Machine-learned preprocessing system 106 can generate parsed session data 200 in one or more background threads. For instance, system 100 can queue session data objects for parsing. System 100 can add session data to the queue, for example, as session data events occur (e.g., as web content is loaded by system 100, as operations are performed using system 100, as system 100 generates, receives, loads, or otherwise processes data or controls a computing device). Machine-learned preprocessing system 106 can process the queue asynchronously. Machine-learned preprocessing system 106 can process queued session data objects in parallel using multiple cores, multiple threads, etc. to implement machine-learned model(s) 106-1 and embedding model(s) 106-2.

Figure 3:
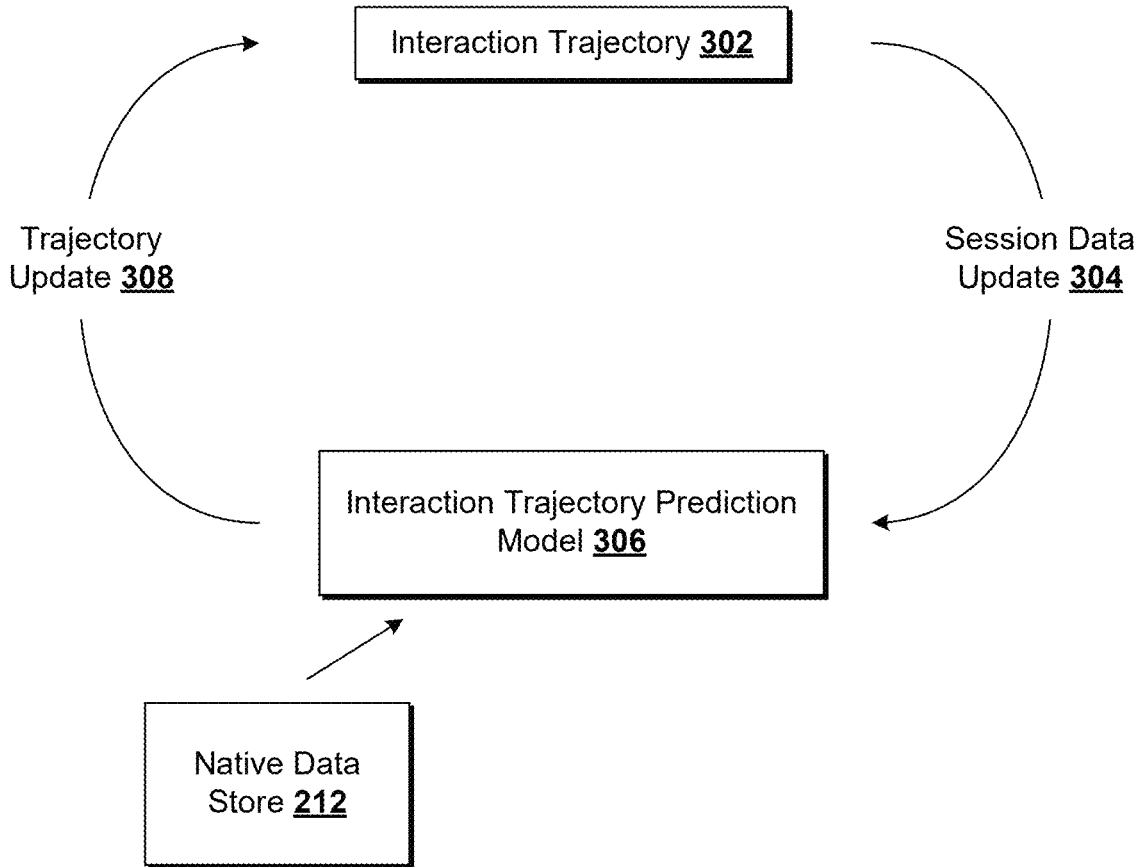
FIG. 3 is a block diagram of an example system according to example implementations of aspects of the present disclosure.

FIG. 3 is a block diagram illustrating a processing flow for preprocessing session data 102 (or parsed session data 200)

for generating additional context signals for conditioning inputs. System 100 can maintain an interaction trajectory 302 that characterizes past system states associated with user interactions and how the user journey led to current user interactions. For example, an interaction trajectory 302 can include a natural language description of a tasks the system has performed for the user and how they relate to current states of system 100. The precision of the trajectory can vary in time. For instance, the trajectory can have a recency bias. For example, an interaction trajectory 302 can include a sparse description of various tasks performed over the last week, more detailed description of tasks performed over the current day, and a detailed listing of tasks performed over the preceding hour. Trajectory 302 can be updated as new information becomes available. For instance, system 100 can obtain a session data update 304 (e.g., when new session data 102 is obtained, such as when a new web page is loaded, a new application interface is opened, a new document is created, etc.).

Responsive to a signal indicating a session data update 304, interaction trajectory prediction model 306 can process data from native data store 212 or embedded data store 214 to generate an updated trajectory. For instance, system 100 can input to interaction trajectory prediction model 306 recent data sketches from native data store 212 along with an input command to generate a summary of recent activity. System 100 can use an embedding of a current input or one or more embeddings of a recent session data object query embedded data store 214 for relevant context. For instance, a query over embedded data store 214 can reveal that similar session data activity occurred in a previous month. One or more corresponding session data objects from native data store 212 can be passed to interaction trajectory prediction model 306 so that the trajectory reflects that the user's activity could be picking up a thread from one or more prior sessions in a more distant past.

Interaction trajectory prediction model 306 can generate multiple summaries of activity over different times scales. For a shorter time scale, Interaction trajectory prediction model 306 can load a conversation history (e.g., a dialog between a user and a message-based conversational assistant). Interaction trajectory prediction model 306 can generate a natural language description of recent activity in view of the recent conversation history. Interaction trajectory prediction model 306 can subsequently summarize this description. At a longer time scale, Interaction trajectory prediction model 306 can load a longer horizon set of activities (e.g., web history) that are not as dense as conversational history. Interaction trajectory prediction model 306 can generate a natural language description over recent activity over the longer horizon. The overviews at different time scales can be combined to form a trajectory.

Interaction trajectory prediction model 306 can be or include a machine-learned sequence processing model configured to generate natural language content. Interaction trajectory prediction model 306 can be a lightweight model configured to operate on a same device as system 100. Interaction prediction model 306 can be a lightweight cloud hosted model optimized for latency.

Interaction trajectory prediction model 306 can be executed using a discrete parallel processing accelerator. For instance, example discrete parallel processing accelerators for executing interaction trajectory prediction model 306 can include a graphics processing unit (GPU) or an application specific integrated circuit (ASIC) configured for machine-learned model execution. Interaction trajectory prediction model 306 can be executed in parallel with other preprocessing tasks.

System 100 can execute interaction trajectory prediction model 306 to generate a trajectory update 308. Interaction trajectory 302 can be replaced by a new trajectory in trajectory update 308. Interaction trajectory 302 can include a rolling buffer of updates. In this manner, for instance, recent updates can displace older, less relevant updates.

In this manner, for instance, system 100 can maintain a relevant interaction trajectory that can inform and contextualize any input received by system 100. In this manner, for instance, user inputs can be understood by system 100 within a consistent perspective. A user may not be required to explain the user's goals with every interaction. This can enable system 100 to understand relatively simple queries in the context of more complex interactions over longer time scales.

By maintaining the trajectory, an up-to-date trajectory can be provided to a primary machine-learned model without necessarily having to recompute it responsive to each new query. This can allow system 100 to exhibit lower response times to queries because the trajectory can be precomputed. In some instances, the precomputed trajectory can be passed to the primary machine-learned model before completion of other preprocessing tasks. For instance, the primary machine-learned model can begin to process an initial portion of conditioned input 110 while system 100 is completing a remainder of conditioned input 110. The initial portion can include the precomputed trajectory.

Figure 4A:
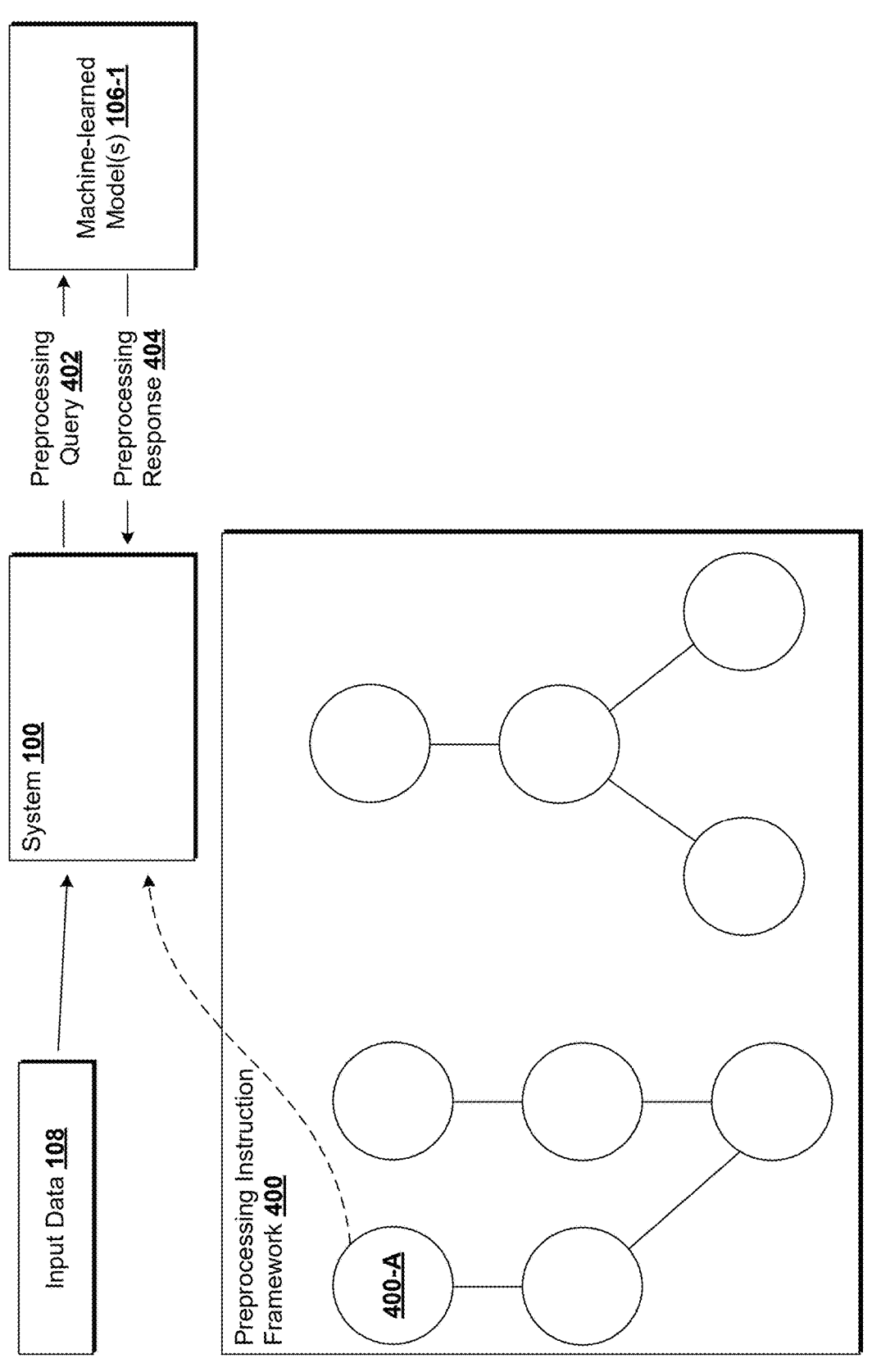
FIG. 4A is a block diagram of an example system according to example implementations of aspects of the present disclosure.

FIG. 4A is a block diagram of a predetermined preprocessing framework 400 that can guide a preprocessing flow. A first node 400-A of a preprocessing framework graph can be associated with a decision regarding whether input data 108 is relevant to a particular data category. First node 400-A can correspond to a predetermined instruction for generating a preprocessing query 402 to be processed by machine-learned model(s) 106-1 to return a preprocessing response 404. First node 400-A can correspond to a particular machine-learned model or model component (e.g., output layer or decoder) that can output a preprocessing response 404 based on input data 108 (e.g., without additional instructions).

Figure 4B:
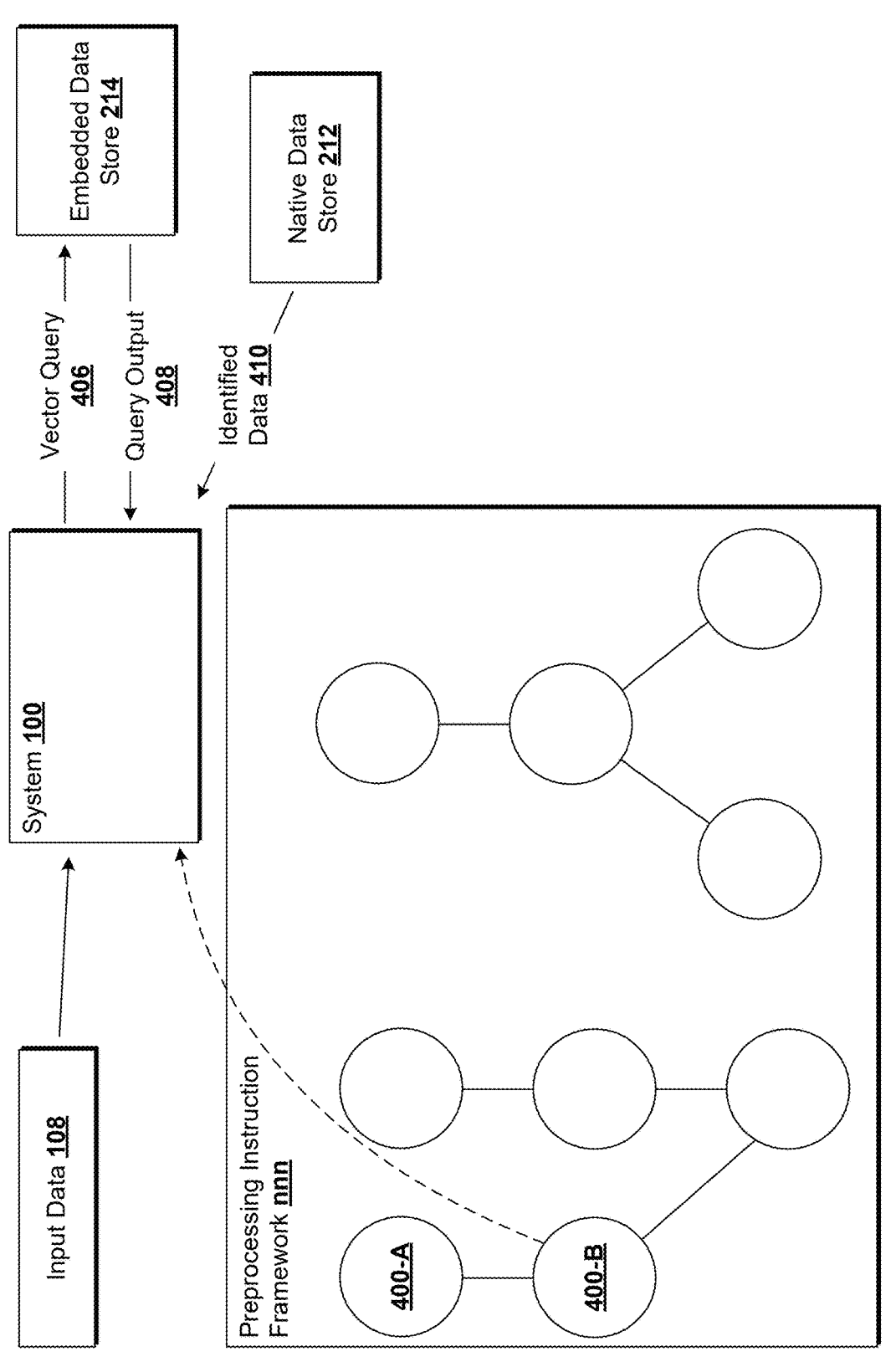
FIG. 4B is a block diagram of an example system according to example implementations of aspects of the present disclosure.

Preprocessing response 404 can include a categorical indicator that a particular data category is relevant. As shown in FIG. 4B, a second node 400-B can be processed to query over the data category. A vector query 406 can be based on an embedding of all or part of input data 108. System 100 can search embedded data store 214 for related vector objects (e.g., using a similarity search). System 100 can retrieve a query output 408 that identifies a session data object associated with a similar vector (e.g., using indexing value(s) 201). System 100 can retrieve the identified data 410 from native storage 212.

Figure 4C:
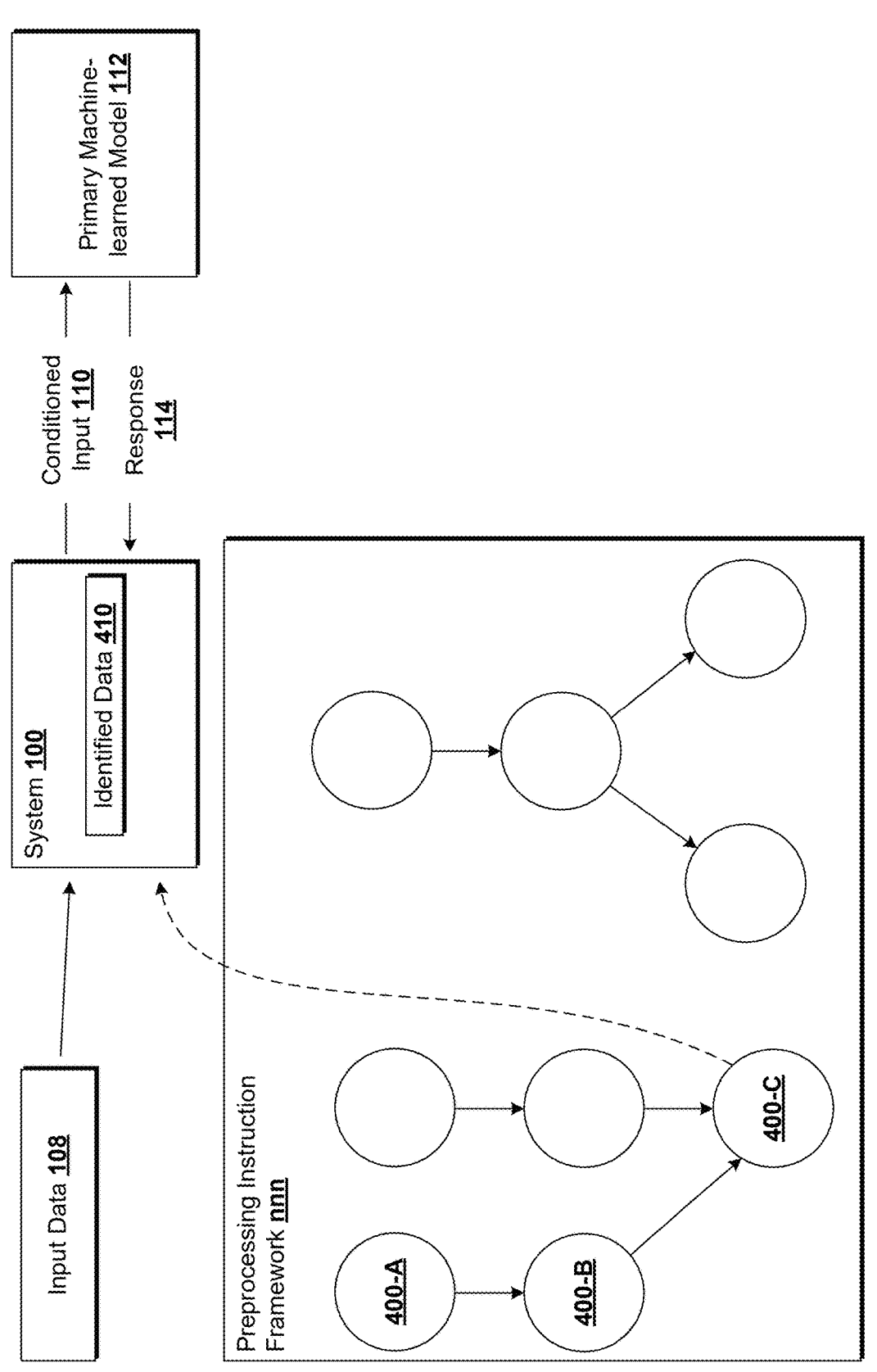
FIG. 4C is a block diagram of an example system according to example implementations of aspects of the present disclosure.

As shown in FIG. 4C, a third node 400-C can correspond to an instruction to generate a conditioned input 110 using identified data 410. The third node 400-C can also receive inputs from other processing branches that can be implemented in parallel with nodes 400-A and 400-B.

Other processing trees of preprocessing instruction framework 400 can be used if input data 108 is classified differently. For instance, other processing trees can lead to different leaf nodes for different instructions for obtaining a final output. In some processing trees, a primary machine-learned model may not be used. For instance, if a user query can be answered using the vector search alone, a primary machine-learned model may not be invoked.

Preprocessing frameworks 400 and postprocessing frameworks 600 can be modified and customized. For instance, one or more downloadable extensions can be implemented to adapt or expand the logic used in processing input data 108. The extension can be obtained from a trusted source, such as a digital application storefront. Before allowing the extension to interact with or otherwise affect the processing of session data 102, system 100 can authenticate the extension by requiring the extension to present a secured credential or other authentication token that indicates that the user has provided authorization for the extension to participate in system 100.

System 100 can include a secured API to allow integration with other applications, devices, and systems. System 100 can implement a tiered permissions system for access to session data 102. For instance, a user can grant permission to an extension for only accessing coarse data sketches from session data instead of full or higher precision sketches.

Figure 5:
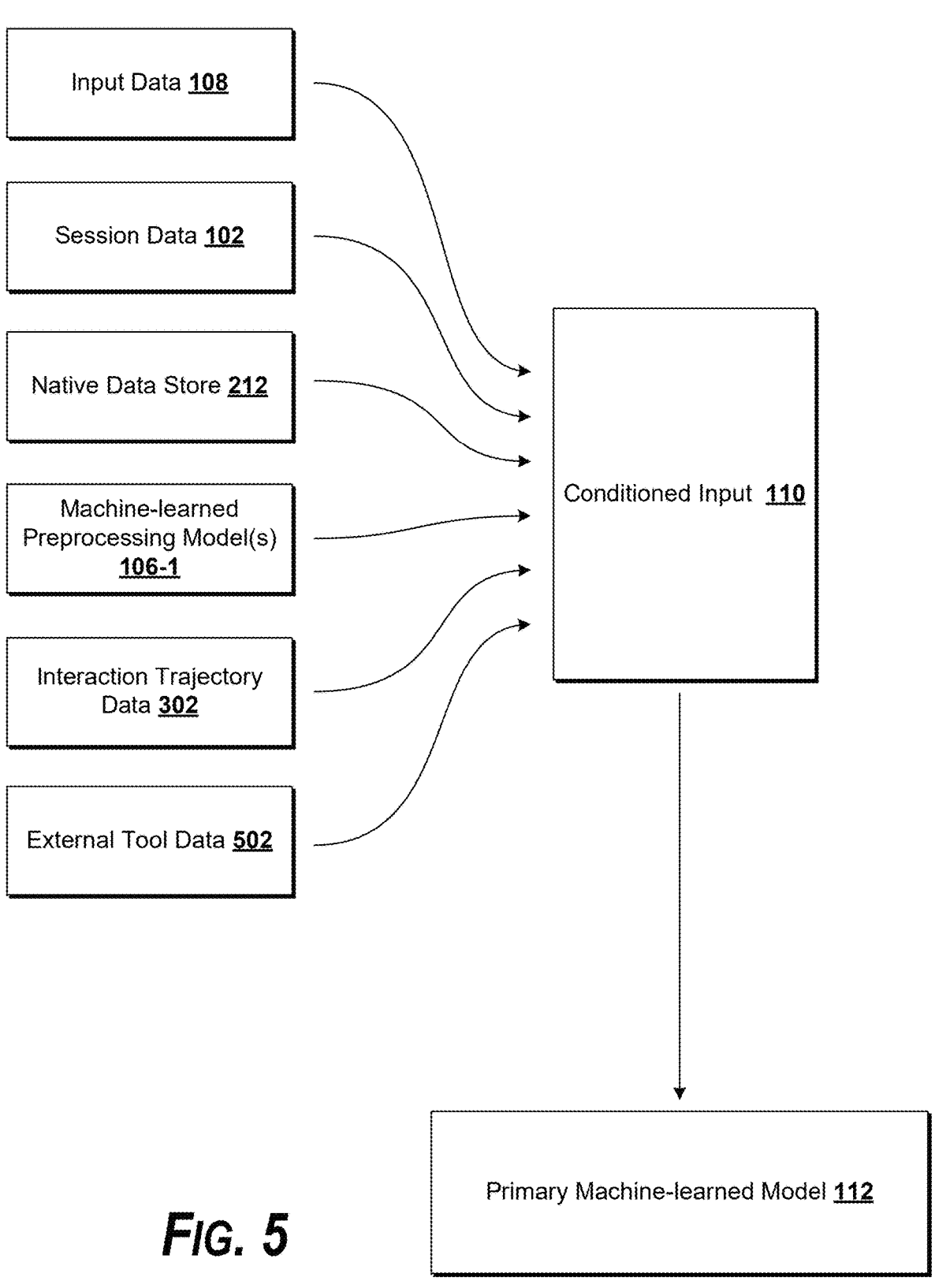
FIG. 5 is a block diagram of an example system according to example implementations of aspects of the present disclosure.

FIG. 5 is a block diagram highlighting example inputs that can feed directly or indirectly into a conditioned input 110. External tool data 502 can include schemas, few-shot exemplars, or other data that can inform primary machine-learned model 112 regarding how to invoke usage of the tool. External tool data 502 can be retrieved using machine-learned preprocessing system 106.

Figure 6A:
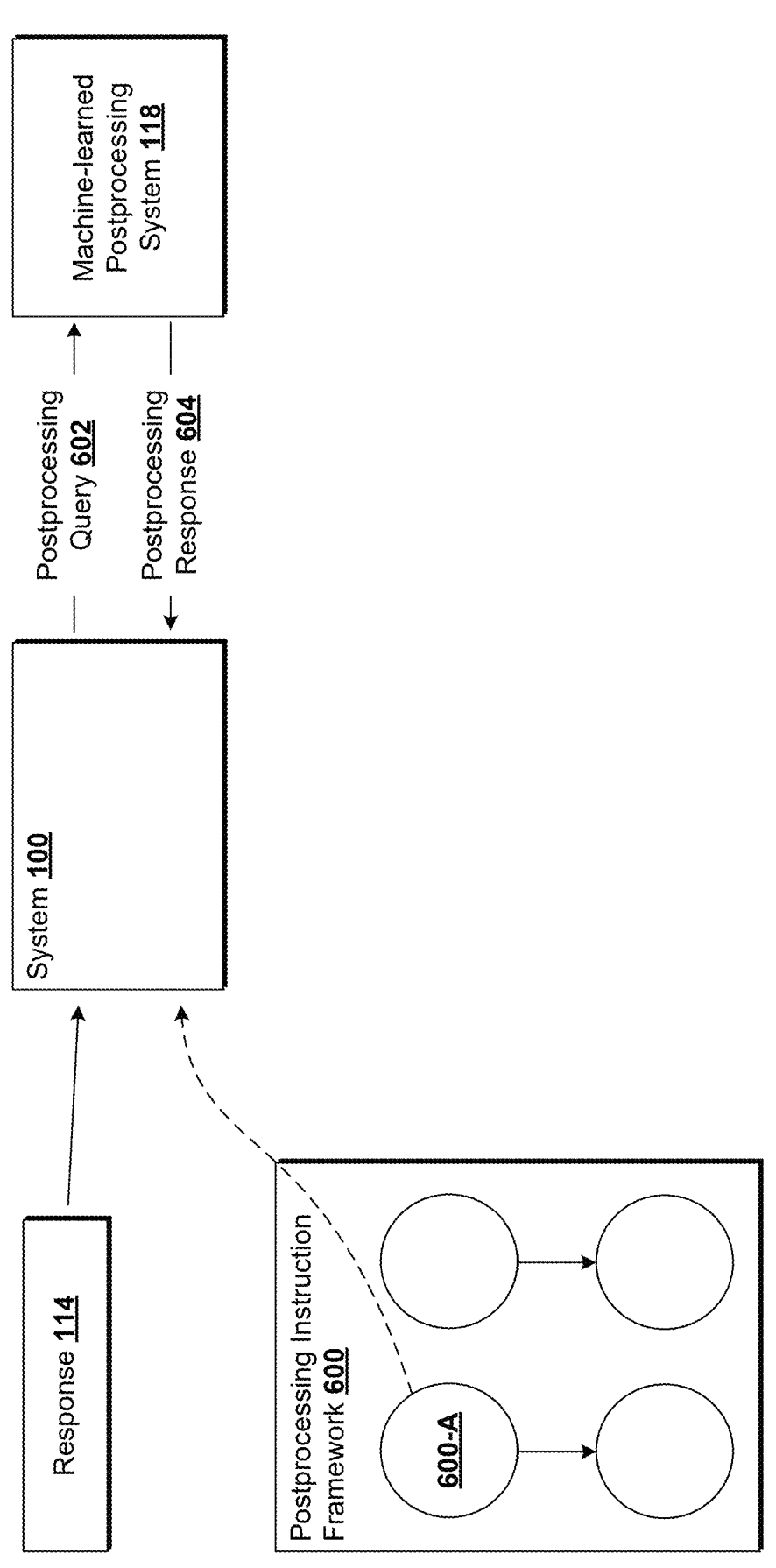
FIG. 6A is a block diagram of an example system according to example implementations of aspects of the present disclosure.

FIG. 6A is a block diagram of a predetermined postprocessing framework 600 that can guide a preprocessing flow. A first node 600-A of a preprocessing framework graph can be associated with a decision regarding whether response 114 is relevant to a particular tool. First node 600-A can correspond to a predetermined instruction for generating a postprocessing query 602 to be processed by machine-learned postprocessing system 118 to return a postprocessing response 604. First node 600-A can correspond to a particular machine-learned model or model component (e.g., output layer or decoder) that can output a postprocessing response 604 based on response 114 (e.g., without additional instructions).

Figure 6B:
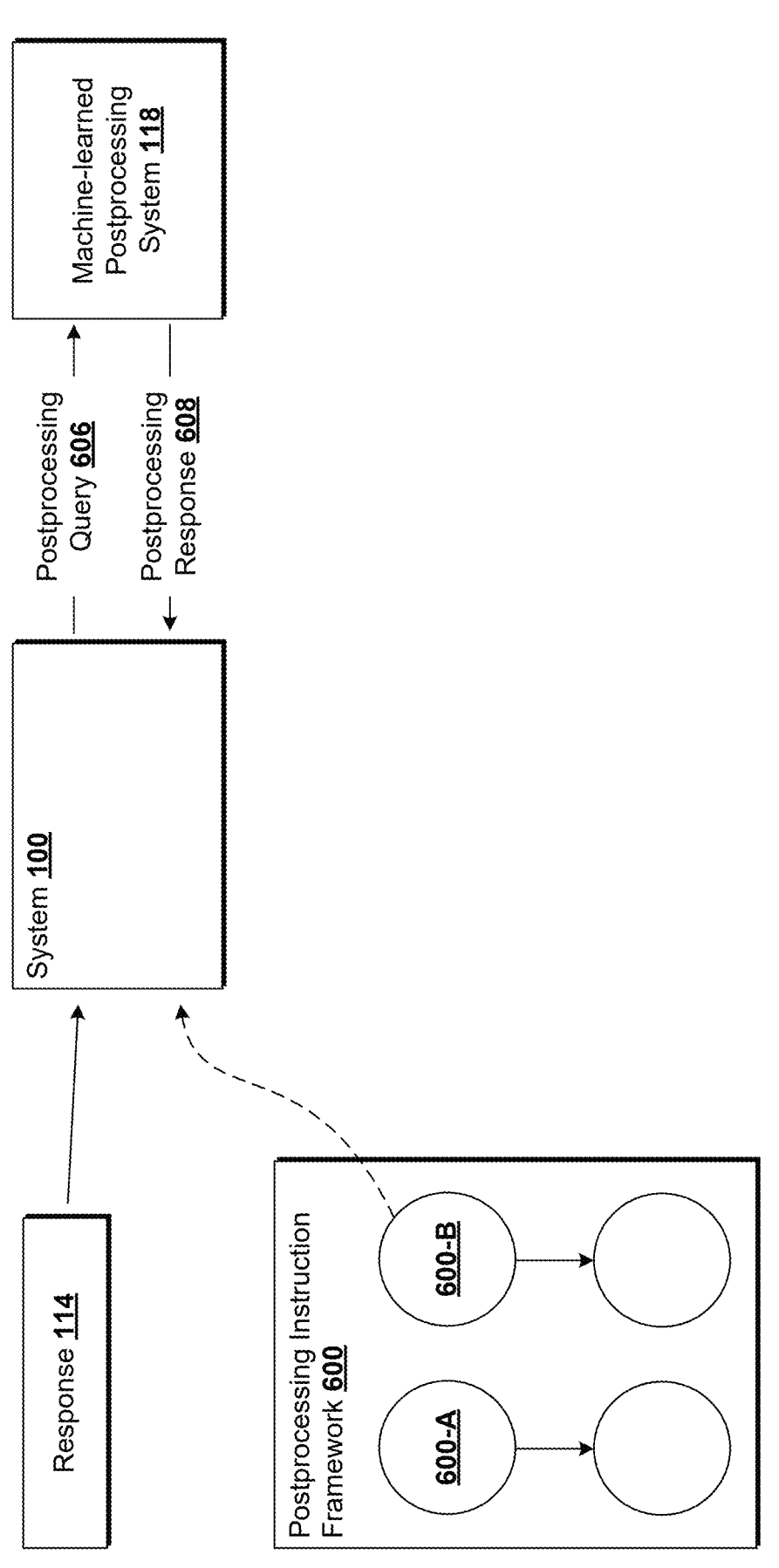
FIG. 6B is a block diagram of an example system according to example implementations of aspects of the present disclosure.

Postprocessing response 604 can include a categorical indicator that a particular tool associated with node 600-A is not relevant. As shown in FIG. 6B, a second node 600-B can be processed. A second node 600-B of a preprocessing framework graph can be associated with a decision regarding whether response 114 is relevant to a different tool. Second node 600-B can correspond to a predetermined instruction for generating a postprocessing query 606 to be processed by machine-learned postprocessing system 118 to return a postprocessing response 608. Second node 600-B can correspond to a particular machine-learned model or model component (e.g., output layer or decoder) that can output a postprocessing response 608 based on response 114 (e.g., without additional instructions).

Figure 6C:
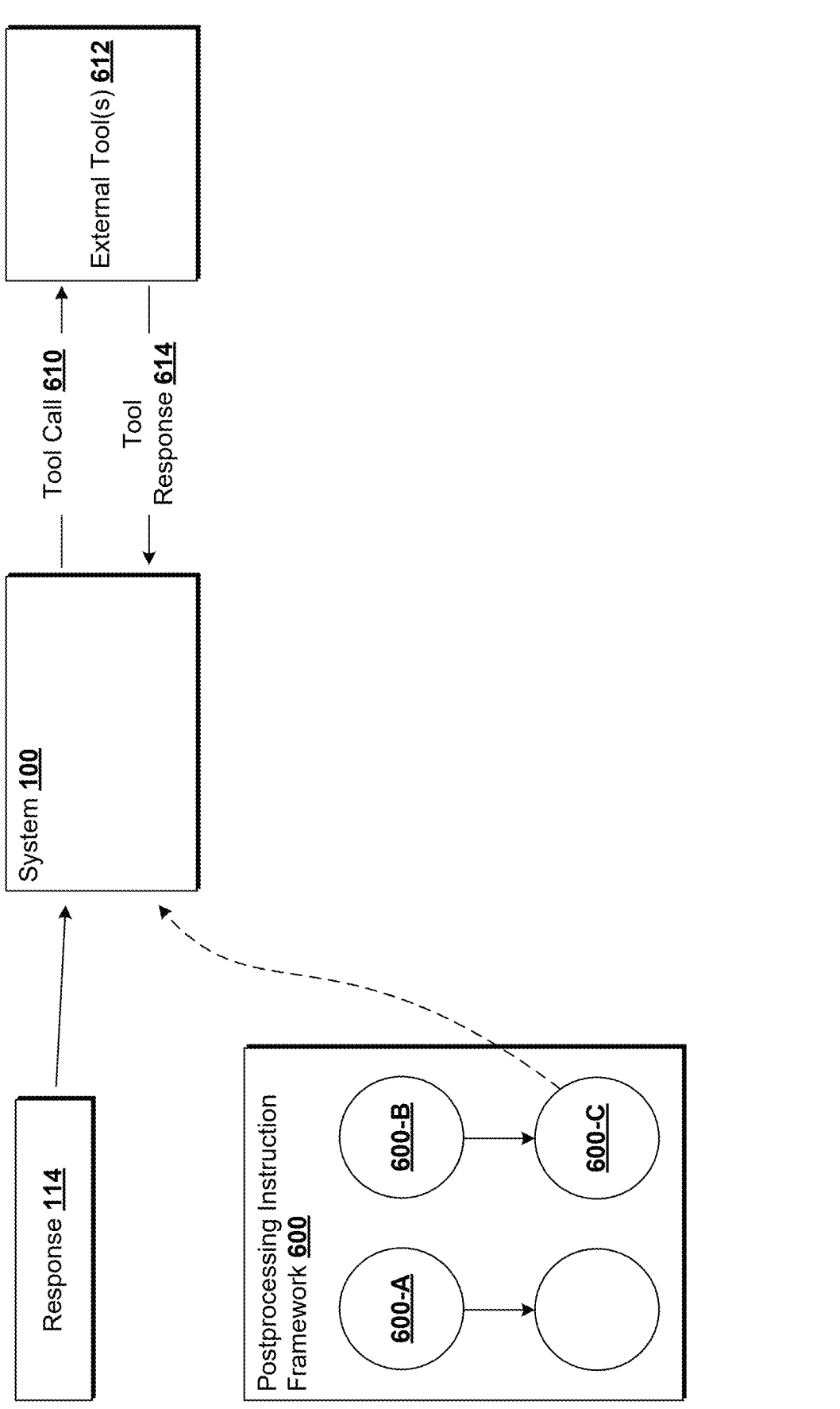
FIG. 6C is a block diagram of an example system according to example implementations of aspects of the present disclosure.

Postprocessing response 608 can include a categorical indicator that the different tool associated with node 600-B is relevant. As shown in FIG. 6C, a third node 600-C can be processed. A third node 600-C of a preprocessing framework graph can be associated with outputting a tool call 610 to the corresponding external tool 612. Third node 600-C can correspond to a predetermined instruction for generating a tool call 610. Third node 600-C can correspond to a particular machine-learned model or model component (e.g., output layer or decoder) that can output a tool call 610 based on response 114 (e.g., without additional instructions). Third node 600-C can initiate one or more parsing operations that parse response 114 for a schema matching an appropriate syntax for external tool(s) 612.

External tool(s) 612 can return a tool response 614 that a system can use to generate output data 120. System 100 can return tool response 614 to primary machine learned model 112 to confirm that the tool response 614 is responsive to the initial query.

Another example post processing operation can include rewriting a response of the model 112 to align with a configured preference for style, tone, etc. Alternatively, this can be accomplished in a preprocessing operation by injecting an instruction into conditioned input 110 to cause the model to align with a configured preference for style, tone, etc.

An example implementation of system 100 is a browser with an interaction assistance system. Example browser-based tasks that the interaction assistance system can perform include, for instance, a web history search using a top-K vector match across embedded data store 214 within one or more time bounds. Time bounds on a history search can be inferred from a user input 108 and trajectory 302 using a machine-learned model (e.g., primary machine-learned model 112). A history search can prioritize matches over low precision embeddings to facilitate rapid retrieval of high-level aligned results.

An example browser-based task is grouping and labeling of open tabs in a window. System 100 can receive an input 108 indicating a request to group tabs. System 100 can construct a conditioned input 110 containing content from one or more tabs (e.g., data sketches 204 for each page) and instruct primary model 112 to group the tabs. System 100 can parse response 114 to rearrange the open tabs according to the grouping. System 100 can group tabs directly using vector-based clustering.

An example browser-based task is grouping and labeling of web history. System 100 can leverage embedded data store 214 to cluster visited pages. Data sketches for the clustered pages can be passed in an input to primary machine-learned model 112 with an instruction to generate a cluster label or summary. System 100 can parse response 114 and associate the generated label or summary with the cluster.

Figure 7A:
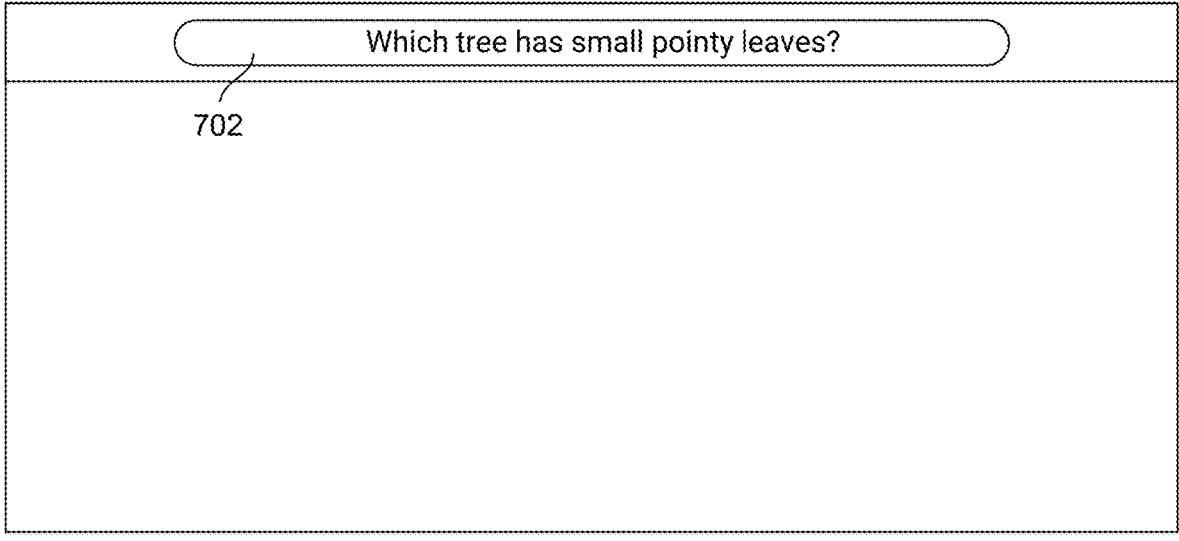
FIG. 7A is an illustration of an example user interface of an example system according to example implementations of aspects of the present disclosure.

An example browser-based task includes information retrieval. FIG. 7A illustrates an example browser interface having a unified input interface 702. In FIG. 7A, unified input interface 702 can receive input such as a written query, "Which tree has small pointy leaves." System 100 can process the input 108 to determine a relevance of various items from a browsing history and various tools.

Figure 7B:
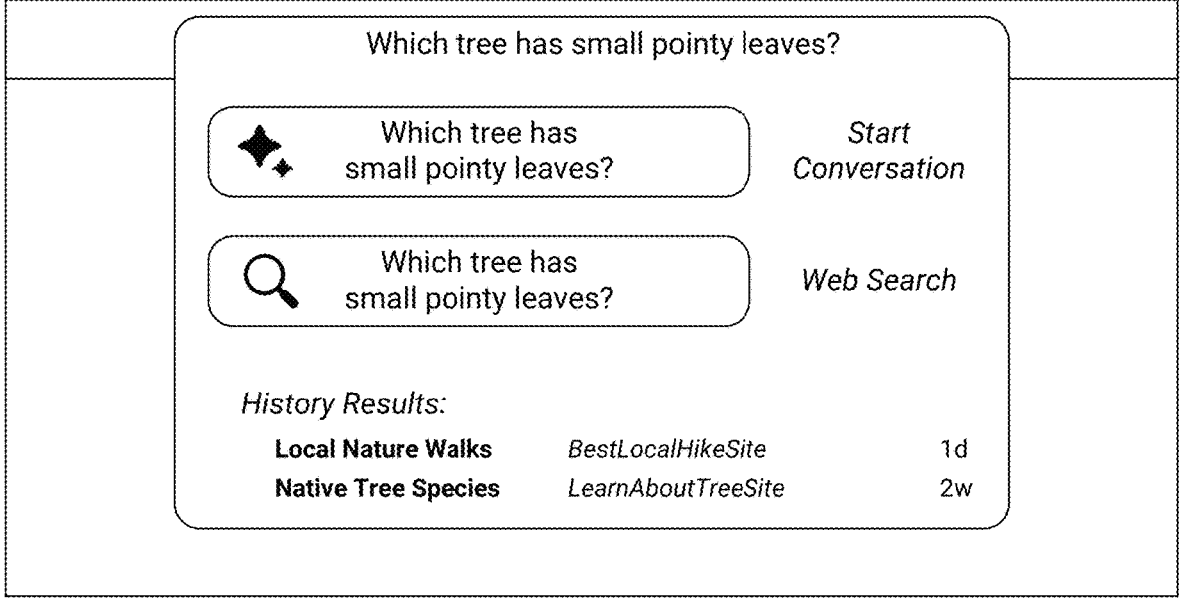
FIG. 7B is an illustration of an example user interface of an example system according to example implementations of aspects of the present disclosure.

FIG. 7B illustrates an example interface presenting an output data 120. For example, system 100 can determine that two history results are pertinent to the input. These can be displayed to the user. System 100 can determine that a web search tool is pertinent to the input. System 100 can generate output data 120 (e.g., directly using a preprocessing system) that causes the browser to render an input element for engaging a web search with the input. System 100 can determine that a conversational chatbot tool is pertinent to the input. System 100 can generate output data 120 (e.g., directly using a preprocessing system) that causes the browser to render an input element for engaging a conversational dialogue interface using the input.

An example processing framework can proceed as follows. System 100 can use machine-learned preprocessing system 106 to determine that the input indicates that the user is providing information to the browser to complete account information, machine-learned preprocessing system 106 can save the provided information in one or more data stores (native or embedded). System 100 can return a message thanking the user for providing the information.

System 100 can use machine-learned preprocessing system 106 to determine that the user is asking a question. System 100 can use machine-learned preprocessing system 106 to determine that the question relates to a current page. System 100 can use machine-learned preprocessing system 106 to retrieve page elements and order by relevance. System 100 can use machine-learned preprocessing system 106 to determine that the question relates to a web history. System 100 can use machine-learned preprocessing system 106 to extract search keywords from the question and extract time descriptions for relevant history searches. System 100 can load history that is relevant to the question (e.g., within temporal bounds and aligning in a vector search). System 100 can load recent message history of chat messages between system 100 and the user. System 100 can use machine-learned preprocessing system 106 to extract parts of conversational history that are relevant to the question. System 100 can load the interaction trajectory 302 and use machine-learned preprocessing system 106 to extract parts that are relevant to this question. System 100 can construct a conditioned input using this collected information and query a primary machine-learned model 112 to answer the question.

System 100 can update a message history to contain the question and the answer. System 100 can generate follow-up questions or responses. System 100 can use post-processing system 118 to determine if citations would be helpful. System 100 can use post-processing system 118 to combine history content and current page information into an input to a machine-learned model (e.g., primary machine-learned model 112) to generate search keywords for a web search tool. System 100 can receive a response 114 containing search keywords and use post-processing system 118 to execute a web search and fetch a link for citation with the answer to the question.

System 100 can use machine-learned preprocessing system 106 to determine if the user's question relates to a location or place. System 100 can generate a tool call for a mapping tool to cause system 100 to render the answer in a mapping interface.

System 100 can facilitate manual injection of context into inputs to a machine-learned model (e.g., a primary machine-learned model 112).

FIG. 8 is an illustration of an example interface of a browser displaying an image. A context menu of the browser application (e.g., initiated with a "right click" or other input) can include an option to ask a question about the image. Inputs to the dialog box can be combined with the selected image itself into a conditioned input 110. System 100 can retrieve an interaction trajectory 302. System 100 can retrieve recent inputs from the user or messages delivered to the user (e.g., recent messages in a chat history). In this manner, for instance, a user can quickly and easily query a model regarding content displayed within the browser.

An input can be, for instance, "tell me what kind of tree this is," and system 100 can construct a conditioned input 110 to cause primary machine-learned model 112 to identify the tree. An input can be, for instance, "show me where I can buy a tree like this," and system 100 can identify what, if any, session data 102 is relevant to help primary machine-learned model 112 to identify vendors from which the user can purchase a tree. System 100 can retrieve an interaction trajectory 302. System 100 can retrieve recent inputs from the user or messages delivered to the user (e.g., recent messages in a chat history).

FIG. 9 illustrates a similar technology applied to selected text.

Figure 10:
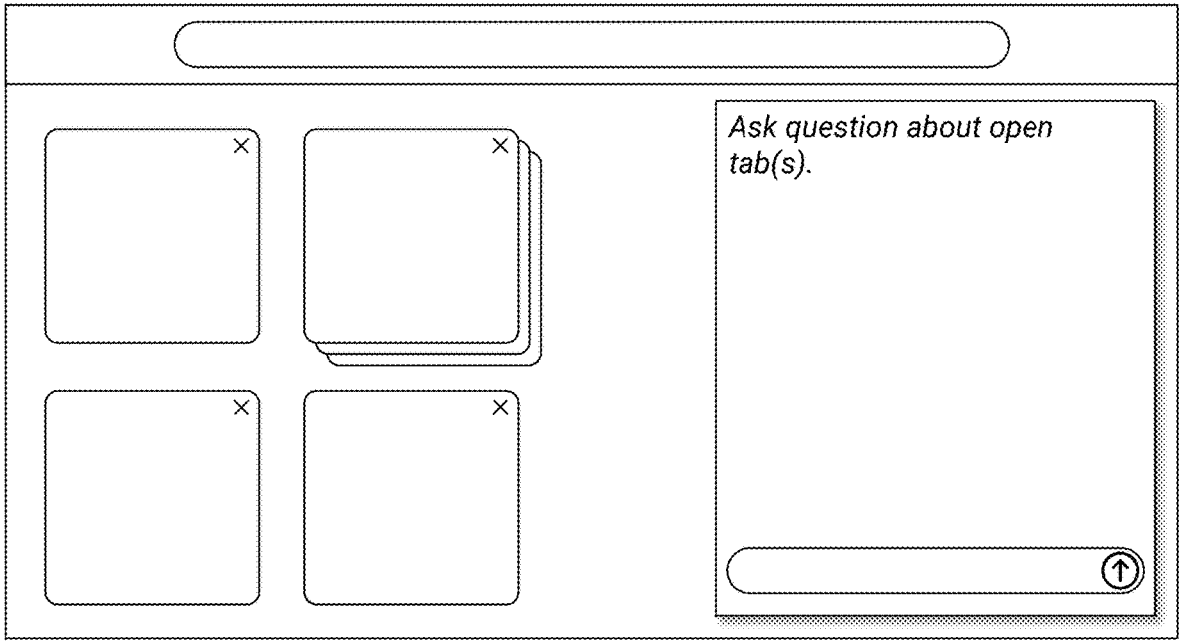
FIG. 10 is an illustration of an example user interface of an example system according to example implementations of aspects of the present disclosure.

FIG. 10 illustrates an example interface for inputting queries over open tabs. The open tabs can be processed into session data 102. System 100 can receive an input query via the dialog interface. System 100 can preprocess the input to identify which of the tabs, or which parts of the tabbed web pages, are relevant to responding to the input query. Page elements can be ranked by relevance to the user's query. System 100 can retrieve an interaction trajectory 302. System 100 can retrieve recent inputs from the user or messages delivered to the user (e.g., recent messages in a chat history). System 100 can construct a conditioned input 110. Primary model 112 can process the conditioned input 110 to generate a response 114 to the user's query.

Figure 11:
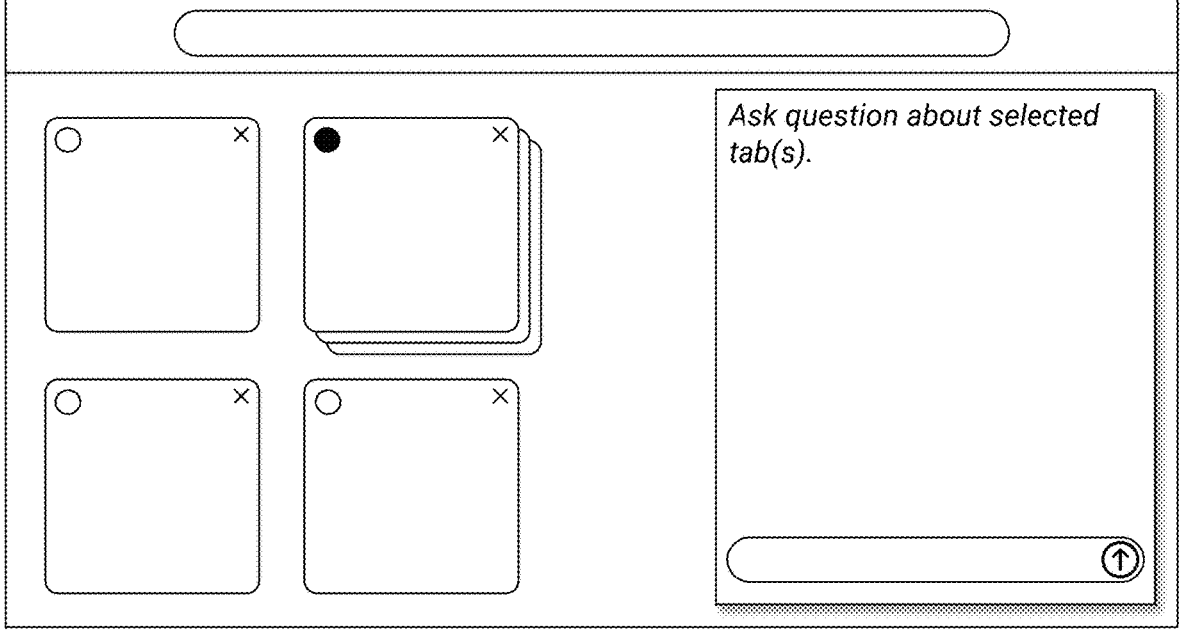
FIG. 11 is an illustration of an example user interface of an example system according to example implementations of aspects of the present disclosure.

FIG. 11 illustrates an example interface for inputting queries over selected tabs. The open tabs can be processed into session data 102. An indexing value in session data 102 can indicate whether one or more tabs are active or selected. System 100 can receive an input query via the dialog interface. System 100 can preprocess the input to identify which of the selected tabs, or which parts of the selected tabbed web pages, are relevant to responding to the input query. Page elements can be ranked by relevance to the user's query. System 100 can retrieve an interaction trajectory 302. System 100 can retrieve recent inputs from the user or messages delivered to the user (e.g., recent messages in a chat history). System 100 can construct a conditioned input 110. Primary model 112 can process the conditioned input 110 to generate a response 114 to the user's query.

Figure 12A:
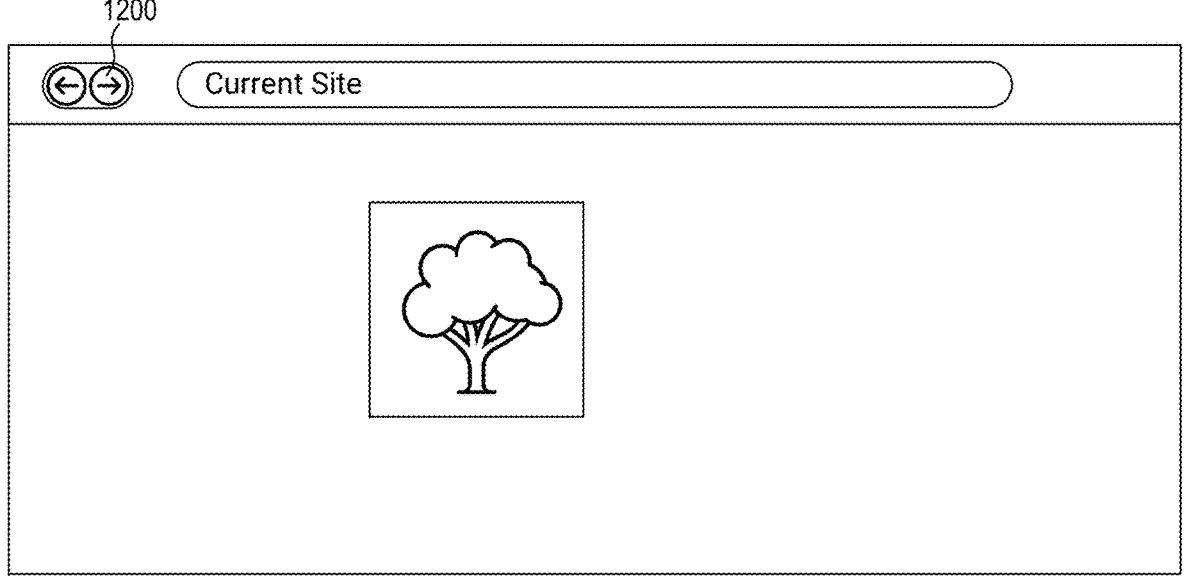
FIG. 12A is an illustration of an example user interface of an example system according to example implementations of aspects of the present disclosure.
Figure 12B:
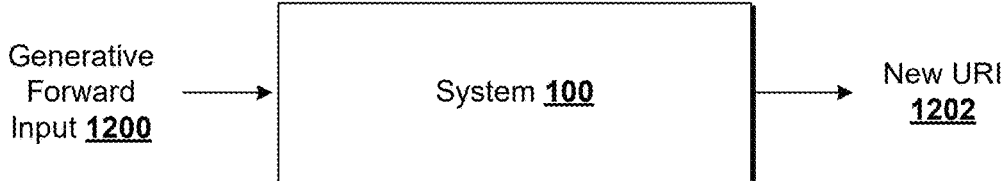
FIG. 12B is a block diagram of an example system according to example implementations of aspects of the present disclosure.

FIGS. 12A and 12B illustrate a generative forward input 1200 procedure in which the browser can receive an input indicating a request to advance to a next page, when there is no actual "next" page that has been visited yet. System 100 can load data sketches for recently visited pages. System 100 can obtain an interaction trajectory 302 that traces the user's recent activity and predicts a current task. System 100 can retrieve an interaction trajectory 302. System 100 can retrieve recent inputs from the user or messages delivered to the user (e.g., recent messages in a chat history). System 100 can submit this information in a conditioned input 110 with an instruction to generate search keywords for a likely next site the user can visit. System 100 can post-process the response to identify that a search tool is pertinent. System 100 can use a web search tool to fetch top web results for the search using the keywords and output a new URI 1202. System 100 can navigate the browser to the new URI 1202.

FIG. 13 depicts a flowchart of a method 1300 for various implementations according to aspects of the present disclosure. One or more portion(s) of example method 1300 can be implemented by a computing system that includes one or more computing devices such as, for example, computing systems described with reference to the other figures. Each respective portion of example method 1300 can be performed by any (or any combination) of one or more computing devices. Moreover, one or more portion(s) of example method 1300 can be implemented on the hardware components of the device(s) described herein, for example, to train one or more systems or models. FIG. 13 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 13 is described with reference to elements/terms described with respect to other systems and figures for exemplary illustrated purposes and is not meant to be limiting. One or more portions of example method 1300 can be performed additionally, or alternatively, by other systems.

At 1302, example method 1300 can include receiving input data describing a user interaction with a user computing device. Example input data can include input data 108. Input data 108 can describe an instruction, request, or other query for performing a task using system 100. Input data 108 can describe inputs for performing a task using an application. An example application is a web browser application. An example application is an assistant application. Other applications may be used.

At 1304, example method 1300 can include determining session data descriptive of operations of the user computing device. Session data can include session data 102. Session data 102 can include data describing states of an operational environment of system 100, data received by system 100, data generated by system 100, etc. Determining session data can include querying over session data 102 to obtain context for input data 108 from session data 102. Queries can be performed in vector space. For instance, session data can be encoded into vector representations to enable efficient vector-based similarity searches to obtain relevant session data.

In an example, example method 1300 at 1304 can include determining, using a vector database representing session data associated with the browser application, session data descriptive of at least one of: a web browsing history, or a current state of the browser application.

At 1306, example method 1300 can include constructing, using the session data, an input sequence that is configured for input to a machine-learned sequence processing model to perform a task associated with the input data. Construction of the input sequence can be performed using a preprocessing system (e.g., machine-learned preprocessing system 106). Machine-learned preprocessing system 106 can construct an input sequence using session data retrieved at 1304. The machine-learned sequence processing model can be primary machine-learned model 112.

At 1308, example method 1300 can include obtaining a response sequence generated by processing the input sequence using the machine-learned sequence processing model. The response sequence can be, for instance, response 114.

At 1310, example method 1300 can include parsing the response sequence to generate output data for performing an operation of the user computing device. Parsing the response sequence can be implemented using, for instance, machine-learned postprocessing system 118 to execute postprocessing operations 116.

In an example, parsing the response sequence can include parsing the response sequence to generate output data for rendering a response within the browser application or modifying a state of the browser application. For example, the output data can include markup language for causing content to render within the browser application. In an example, the output data can include commands for causing the browser application to perform one or more operations, such as interacting with web content.

Advantageously, in some example implementations, a user computing device can execute one or more operations of example method 1300 using a discrete parallel processing accelerator. For instance, a discrete parallel processing accelerator can include a graphics processing unit (GPU) or an application specific integrated circuit (ASIC) configured for machine-learned model execution. The discrete parallel processing accelerator can be used to perform vector-based queries over session data. The discrete parallel processing accelerator can be used to execute one or more machine-learned models in a machine-learned preprocessor to extract relevant session data and construct an input. The discrete parallel processing accelerator can be used to execute the machine-learned sequence processing model. The discrete parallel processing accelerator can be used to execute one or more models in the machine-learned postprocessing system 118. The discrete parallel processing accelerator can be used to execute one or more postprocessing tools using tool calls output in response 114.

In some implementations of example method 1300, the input sequence is constructed using an interaction trajectory generated by a machine-learned interaction trajectory generation system. A machine-learned interaction trajectory generation system can generate trajectories using a machine-learned sequence processing model. In some implementations of example method 1300, machine-learned trajectory generation model(s) are the same model as primary sequence processing model 112. For example, a trajectory generation model inference can include inputting a trajectory generation input to a model and generating a trajectory generation output. A trajectory generation input can include an input data structure configured to induce the model to generate outputs that correspond to desired trajectory generation activity. For example, the model can attend over the input data structure to generate one or more attention values representing one or more associations between one or more portions of a representation of the input data structure and one or more portions of a context window including the representation of the input data structure. The model can generate one or more predicted values based on the one or more attention values. The model can generate the output based on the one or more predicted values. In this manner, for instance, a trajectory generation input can include an input data structure configured to induce the model to generate outputs that correspond to desired trajectory generation activity. The model can be the primary machine-learned sequence processing model 112 or a different sequence processing model.

In some implementations of example method 1300, the interaction trajectory includes data characterizing recorded user interactions. For example, system 100 can maintain an interaction trajectory 302 that characterizes past system states associated with user interactions and how the user journey led to current user interactions. For example, an interaction trajectory 302 can include a natural language description of a tasks the system has performed for the user and how they relate to current states of system 100. The precision of the trajectory can vary in time. For instance, the trajectory can have a recency bias. For example, an interaction trajectory 302 can include a sparse description of various tasks performed over the last week, more detailed description of tasks performed over the current day, and a detailed listing of tasks performed over the preceding hour. Trajectory 302 can be updated as new information becomes available. For instance, system 100 can obtain a session data update 304 (e.g., when new session data 102 is obtained, such as when a new web page is loaded, a new application interface is opened, a new document is created, etc.).

In some implementations of example method 1300, the machine-learned trajectory generation system is configured to generate updated interaction trajectories responsive to state changes in the session data. For example, interaction trajectory prediction model 306 can process data from native data store 212 or embedded data store 214 to generate an updated trajectory. For instance, system 100 can input to interaction trajectory prediction model 306 recent data sketches from native data store 212 along with an input command to generate a summary of recent activity. System 100 can use an embedding of a current input or one or more embeddings of a recent session data object query embedded data store 214 for relevant context. For instance, a query over embedded data store 214 can reveal that similar session data activity occurred in a previous month. One or more corresponding session data objects from native data store 212 can be passed to interaction trajectory prediction model 306 so that the trajectory reflects that the user's activity could be picking up a thread from one or more prior sessions in a more distant past.

Advantageously, the machine-learned trajectory generation system can be executed using a discrete parallel processing accelerator of the user computing device, optionally wherein the discrete parallel processing accelerator includes a graphics processing unit (GPU) or an application specific integrated circuit (ASIC) configured for machine-learned model execution.

In some implementations of example method 1300, determining the session data can include constructing a preprocessing input to a machine-learned preprocessing system based on the input data. For instance, the preprocessing input can include an instruction to perform one or more of preprocessing operations 104. For example, preprocessing operations 104 can include parsing input data 108 to determine a relevance of various categories of session data. For instance, preprocessing operations 104 can include determining a relevance of the input data to categories of data or tools. Preprocessing operations 104 can include generating, using machine-learned preprocessing system 106, categorical indicators of a relevance of a particular data type or category to input data 108. Preprocessing operations 104 can include generating, using machine-learned preprocessing system 106, categorical indicators of a relevance of a particular data type or category to input data 108. Preprocessing operations 104 can include parsing identified relevant session data objects for particular relevant portions. For instance, preprocessing operations 104 can include passing a retrieved session data object (e.g., retrieved based on an identified relevance) to a machine-learned model with an instruction to return one or more portion(s) relevant to a given input data 108. For example, a chat history, activity history, or other record can be processed by a machine-learned model that returns a portion of the history or record most related to a given input data 108.

In some implementations of example method 1300, determining the session data can include obtaining a preprocessing output generated by processing the preprocessing input using the machine-learned preprocessing system. A preprocessing output can correspond to an output of one or more of preprocessing operations 104. For example, a preprocessing output can include a categorical indicator of a relevance of a particular category of session data with respect to the input data.

In some implementations of example method 1300, determining the session data can include retrieving the session data by querying over data of a particular category indicated as relevant using a preprocessing operation (e.g., identified as relevant in a preprocessing output). For example, the preprocessing input can include a query identifying the particular category. The preprocessing output can be a response to the query indicating that the particular category is relevant to the input. Based on this categorical indicator, example method 1300 can include querying over session data (e.g., using a vector-based query) to retrieve data from the particular category. In some implementations of example method 1300, the machine-learned preprocessing system includes a particular machine-learned preprocessing model that was fine-tuned to evaluate a relevance of input queries to the particular category.

In some implementations of example method 1300, example method 1300 can include constructing the input sequence by constructing a preprocessing input to a machine-learned preprocessing system based on the input data. For instance, constructing a preprocessing input can include referencing a predetermined instruction framework (e.g., framework 400) to determine a template or schema for preprocessing the input.

In some implementations of example method 1300, example method 1300 can include constructing the input sequence by obtaining a preprocessing output generated by processing the preprocessing input using the machine-learned preprocessing system, and the preprocessing output can include a categorical indicator of a relevance of a particular tool for performing an operation with respect to the input data. For example, in addition or in alternative to determining the relevance of session data, preprocessing operations 104 can return the relevance of particular tools for augmenting a performance of a machine-learned model. In some implementations of example method 1300, example method 1300 can include constructing the input sequence by obtaining, using the particular tool, data for constructing the input sequence.

In some implementations of example method 1300, the preprocessing input includes a query identifying a particular tool. In some implementations of example method 1300, the machine-learned preprocessing system includes a particular machine-learned preprocessing model that was fine-tuned to evaluate a relevance of input queries to the particular tool. In some implementations of example method 1300, the particular machine-learned preprocessing model includes a sequence processing model. This sequence processing model can be the same as or different from a primary sequence processing model 112.

In some implementations of example method 1300, the machine-learned preprocessing model(s) are the same model as primary sequence processing model 112. For example, a preprocessing model inference can include inputting a preprocessing input to a model and generating a preprocessing output. A preprocessing input can include an input data structure configured to induce the model to generate outputs that correspond to desired preprocessing activity. For example, the model can attend over the input data structure to generate one or more attention values representing one or more associations between one or more portions of a representation of the input data structure and one or more portions of a context window including the representation of the input data structure. The model can generate one or more predicted values based on the one or more attention values. The model can generate the output based on the one or more predicted values. In this manner, for instance, a preprocessing input can include an input data structure configured to induce the model to generate outputs that correspond to desired preprocessing activity. The model can be the primary machine-learned sequence processing model 112 or a different sequence processing model.

Similarly, in some implementations of example method 1300, the machine-learned postprocessing model(s) are the same model as primary sequence processing model 112. For example, a postprocessing model inference can include inputting a postprocessing input to a model and generating a postprocessing output. A postprocessing input can include an input data structure configured to induce the model to generate outputs that correspond to desired postprocessing activity. For example, the model can attend over the input data structure to generate one or more attention values representing one or more associations between one or more portions of a representation of the input data structure and one or more portions of a context window including the representation of the input data structure. The model can generate one or more predicted values based on the one or more attention values. The model can generate the output based on the one or more predicted values. In this manner, for instance, a postprocessing input can include an input data structure configured to induce the model to generate outputs that correspond to desired postprocessing activity. The model can be the primary machine-learned sequence processing model 112 or a different sequence processing model.

In some implementations of example method 1300, the particular machine-learned preprocessing model includes a classification model. In some implementations of example method 1300, the particular machine-learned preprocessing model includes a sequence processing model with one or more output layers configured for generating a probability distribution over an output space of one or more categorical indicators. For instance, a sequence processing model can be constructed with a classification output head that generates probabilities over a "vocabulary" of categorical indicators. This simplified output space can increase repeatability, reliability, interpretability, etc. Alternatively, the sequence processing model can retain a larger vocabulary, such as a natural language vocabulary. In such implementations, the sequence processing model can regress categorical indicators using natural language text tokens.

In some implementations of example method 1300, example method 1300 can include constructing the input sequence by extracting, using a machine-learned preprocessing system, portions of the session data that are relevant to the input data. For instance, upon determination that a type of session data is relevant (e.g., a browsing history, the contents of a current page, etc.), a dataset of that type of session data can be passed to a model for parsing. For example, a snippet of browsing history, chat log, or page content can be passed to a natural language processing model with a request to return a smaller portion or a summary of content from the session data most relevant to a particular input. The model can return a smaller portion or a summary of the content.

In some implementations of example method 1300, constructing the input sequence can include constructing a preprocessing input including a first portion of the session data. For instance, the preprocessing input can be a string or other input structure that includes session data of a selected type, the input, and a request for a portion of the session data relevant to the input. In some implementations of example method 1300, constructing the input sequence can include identifying a second portion of the session data that is relevant to the input data by processing the first portion using the machine-learned preprocessing system. The second portion can be returned by the machine-learned preprocessing system responsive to the request.

In some implementations of example method 1300, the machine-learned preprocessing system executes locally on the user computing device. Advantageously, for instance, the machine-learned preprocessing system can be executed using a discrete parallel processing accelerator of the user computing device, optionally wherein the discrete parallel processing accelerator includes a graphics processing unit (GPU) or an application specific integrated circuit (ASIC)

configured for machine-learned model execution. For example, one or more machine-learned models can be executed using parallelized model sharding across cores of the discrete parallel processing accelerator.

In some implementations of example method 1300, the machine-learned sequence processing model executes locally on the user computing device. Advantageously, for instance, the machine-learned sequence processing model can be executed using a discrete parallel processing accelerator of the user computing device, optionally wherein the discrete parallel processing accelerator includes a graphics processing unit (GPU) or an application specific integrated circuit (ASIC) configured for machine-learned model execution. For example, one or more machine-learned models can be executed using parallelized model sharding across cores of the discrete parallel processing accelerator.

In some implementations of example method 1300, the machine-learned preprocessing system performs a preprocessing task using a machine-learned preprocessing model that is characterized by one or more of the following characteristics: fewer parameters than the machine-learned sequence processing model; a lower output latency than the machine-learned sequence processing model; or a smaller memory footprint than the machine-learned sequence processing model. In general, for instance, In some implementations of example method 1300, constructing the input sequence can include performing, using the machine-learned preprocessing system, a plurality of preprocessing tasks in parallel. Each of one or more different preprocessing tasks can be performed independently and in parallel using multiple instances of the same model or using different models.

In some implementations of example method 1300, constructing the input sequence can include retrieving portions of the session data that are relevant to the input data using a similarity search over embedded representations of the session data. In some implementations of example method 1300, determining the session data can include generating a query embedding of at least a portion of the input data. In some implementations of example method 1300, determining the session data can include querying, using the query embedding, a data store of embedded session data objects. In some implementations of example method 1300, determining the session data can include retrieving session data associated with one or more of the embedded session data objects.

In some implementations of example method 1300, determining the session data can include classifying the input data to determine a corresponding retrieval precision. For instance, different types of session data can be retrieved at different levels of precision based on the scope of the query. The level of precision can be selected or configured based on a desired latency of performing the retrieval. For instance, a query over a browsing history can include a broad scope over an extended time range. To decrease a latency of the query, queries over browsing history can be performed at a lower precision.

In some implementations of example method 1300, determining the session data can include querying, using a query embedding, a subset of a data store of embedded session data, the subset characterized by the corresponding retrieval precision. For example, to continue the above example with respect to browsing history, a lower precision representation can include page keywords. A similarity search can be performed over embedded page keywords (e.g., in lieu of querying over full page content of each page in the history).

This selective use of reduced precision can decrease a query latency while maintaining a broad query scope.

In some implementations of example method 1300, the data store of embedded session data objects includes, for a respective item of session data a first embedding describing a portion of the respective item, the first embedding characterized by a first precision, and a second embedding describing the portion of the respective item, the second embedding characterized by a second precision lower than the first precision. For example, a given web page explored in a session can be archived in the data store of session data. Higher precision embeddings can be generated by, for instance, embedding each paragraph of text of the page separately. Higher precision embeddings can be generated by, for instance, using a higher-dimensional embedding space. Lower precision embeddings can be generated by, for instance, generating a single embedding for the entire page, or by generating an embedding for a summary that summarizes the entire page, or by generating an embedding for a keyword extracted from a summary.

In some implementations of example method 1300, the session data includes a data sketch. For example, a data sketch can include a data sketch 204. In some implementations of example method 1300, determining the session data includes retrieving, based on the corresponding retrieval precision, the data sketch.

In some implementations of example method 1300, example method 1300 can include generating and storing, for a respective item of session data, one or more data sketches including a reduced precision representation of the respective item of session data. For example, a data sketch can include a data sketch 204. Data sketches 204 can include one or more different reduced-precision representations of extracted data 202 (e.g., captions of images, summaries of text, keywords, labels, etc.).

In some implementations of example method 1300, parsing the response sequence includes constructing a postprocessing input to a machine-learned postprocessing system based on the response sequence. An example postprocessing system can include machine-learned postprocessing system 118. A postprocessing input can be constructed based on a postprocessing framework 600.

In some implementations of example method 1300, parsing the response sequence includes obtaining a postprocessing output generated by processing the postprocessing input using the machine-learned postprocessing system. In some implementations, the postprocessing output includes a categorical indicator of a relevance of a particular tool for performing an operation with respect to the response sequence. In some implementations of example method 1300, parsing the response sequence includes obtaining, using the particular tool, data for constructing the output data. In some implementations of example method 1300, the postprocessing input includes a query identifying the particular tool.

In some implementations of example method 1300, the machine-learned postprocessing system includes a particular machine-learned postprocessing model that was fine-tuned to evaluate a relevance of input queries to the particular tool.

In some implementations of example method 1300, the particular machine-learned postprocessing model includes a sequence processing model. The sequence processing model can be the same as or different from primary machine-learned model 112.

In some implementations of example method 1300, the particular machine-learned postprocessing model includes a classification model. For instance, the classification model can classify a postprocessing input as relevant to a particular classification that indicates a relevant tool (or no relevant tool). In some implementations of example method 1300, the particular machine-learned postprocessing model includes a sequence processing model with one or more output layers configured for generating a probability distribution over an output space of one or more categorical indicators.

In some implementations of example method 1300, the output data includes content for rendering on the user computing device. For instance, the output data can include text for rendering on a screen or rendering via an audio interface. The output data can include a chat response (e.g., for a chatbot to respond to a user input). The output data can include an action for an application to perform.

In some implementations of example method 1300, the output data includes inputs for an application programming interface (API) of an operational environment to control an operation of the operational environment. The output data can instruct the operational environment to open a window, open a tab, close or move tabs, resize a window, start a program, navigate to a URL or URI, etc. For instance, in some implementations of example method 1300, the output data includes markup language for configuring a display interface to render a response (e.g., using a browser application to interpret and render the markup language).

In some implementations of example method 1300, the session data includes at least one or more data types selected from: image data, audio data, video data. In some implementations of example method 1300, the input data includes at least one or more data types selected from: image data, audio data, video data. In some implementations of example method 1300, the output data includes at least one or more data types selected from: image data, audio data, video data.

In an example, image data and audio data for input (e.g., combined as video or separately input) can be obtained via sensors of a user device. Image data can include captured images or rendered images of digital environments (e.g., renderings of graphical user interfaces). Audio input can include speech inputs. Audio output can include speech outputs.

In some implementations of example method 1300, determining session data descriptive of operations of the user computing device can include querying a vector database of session data. The vector database of session data can be obtained using an embedding method. The embedding method can be a preprocessing operation. The embedding method can operate in the background as session data is generated, cached, etc.

In some implementations of example method 1300, an example embedding method can include receiving session data descriptive of subject content configured for rendering in association with an application executing on a computing device. In some implementations of example method 1300, the session data is automatically queued for processing and storage in embedded and non-embedded representations. Example embedding methods are described herein with respect to FIG. 2.

In some implementations of example method 1300, the example embedding method can include extracting selected portions of the subject content (e.g., extracted data 202).

In some implementations of example method 1300, the example embedding method can include obtaining an embedded representation that was generated by embedding the selected portions using a machine-learned embedding model (e.g., part of machine-learned preprocessing system 106).

In some implementations of example method 1300, the example embedding method can include storing the embedded representations in a vector database (e.g., embedded data store 214).

In some implementations of example method 1300, the example embedding method can include indexing the embedded representations using index values shared with the corresponding selected portions such that a selected portion can be retrieved by querying over the vector database.

Advantageously, the embedding method can be executed using a discrete parallel processing accelerator of the computing device, optionally wherein the discrete parallel processing accelerator includes a graphics processing unit (GPU) or an application specific integrated circuit (ASIC) configured for machine-learned model execution. For instance, embedding models 106-2 can be efficiently executed in a background process by leveraging hardware acceleration chips that relieve a primary system processor (e.g., CPU) from executing this background process.

In some implementations of example method 1300, the machine-learned embedding model executes on a user computing device (e.g., an endpoint device with which the user interacts). For instance, the computing device can contain a discrete parallel processing accelerator that implements at least a portion of example method 1300.

In some implementations of example method 1300, the machine-learned embedding model executes on a server responsive to a request for a given item of subject content. For instance, the server can contain a discrete parallel processing accelerator that implements at least a portion of example method 1300. In some implementations of example method 1300, the server relays the subject content and the embedding to the user. In some implementations of example method 1300, the server provides a cached embedding to the user, wherein the embedding was cached from a prior embedding operation. In some implementations of example method 1300, obtaining the embedding includes: querying an embedding server for a cached embedding; and downloading the cached embedding.

In some implementations of example method 1300, the example embedding method can include determining that an item of subject content is publicly accessible prior to querying the embedding server. For instance, some items of web content can be accessible only after establishing a secure session on a particular user device. A web server can, but might not, have access to participate in the secure session. Thus, the caches available to the web server might lack cached embeddings for content that is secured using secured credentials.

In some implementations of example method 1300, obtaining the embedding includes: querying an embedding server for an embedding; and downloading the cached embedding.

In some implementations of example method 1300, the application is a browser application. For instance, a computing device can execute any aspect of example method 1300 to facilitate interactions with a browser application. Session data can be browsing session data. For example, in some implementations of example method 1300, the subject content includes web page data.

In some implementations of example method 1300, the session data is descriptive of the current state of the browser application, wherein the session data is descriptive of one or more open tabs in a tabbed browsing interface of the browser application.

In some implementations of example method 1300, the input data includes a query over content from the one or more open tabs.

In some implementations of example method 1300, the input data is received via a context menu activated within the browser application.

In some implementations of example method 1300, the machine-learned sequence processing model is configured to generate a response sequence that indicates one or more commands to adjust one or more tabs in the tabbed browsing interface based on relevance to the input data.

In some implementations of example method 1300, the input data includes a natural language query input via a unified input interface within the browser application, wherein the unified input interface is configured to determine a relevance of the natural language query to one or more functions of the browser application and render an interactive element associated with at least one relevant function.

In some implementations of example method 1300, the vector database includes embedded representations of a plurality of modalities of subject content.

In some implementations of example method 1300, the selected portions are separately stored in a key-value database. For example, a native data store 212 can store original or native representations of content extracted from the subject content (e.g., unembedded content).

In some implementations of example method 1300, the subject content is loaded, by the application, into volatile memory of the computing device in preparation for rendering the subject content, and wherein the extracting and embedding operates directly on the subject content while being persisted in volatile memory by the application. For instance, the embeddings can be generated while the content is loaded into memory, avoiding caching and recalling the subject content at a later time to perform the processing into session data.

In some implementations of example method 1300, the subject content is cached and queued for embedding using a background process.

In some implementations of example method 1300, the example embedding method can include generating reduced precision representations of the selected portions (e.g., data sketches 204). In some implementations of example method 1300, a reduced precision representation includes at least one of: a summary generated for a chunk of content; keywords extracted from a chunk of content; or a caption generated by processing an image.

In some implementations of example method 1300, the example embedding method can include generating reduced precision representations of a respective selected portion by instructing a machine-learned sequence processing model to summarize the respective selected portion. In some implementations of example method 1300, the example embedding method can include generating reduced precision representations of a respective selected portion by instructing a machine-learned sequence processing model to return keywords descriptive of: the respective selected portion, or a machine-generated summary of the respective selected portion.

In some implementations of example method 1300, the example embedding method can include retrieving, for a given query vector, a selected portion using a vector-based similarity search over the vector database.

In some implementations of example method 1300, the example embedding method can include restricting the similarity search over a subset of the vector database corresponding to a reduced level of precision. For instance, a reduced level of precision can be used to reduce a latency of a query. In some implementations of example method 1300, the reduced level of precision is selected based on a category associated with the given query vector. In some implementations of example method 1300, the reduced level of precision is selected based on a category assigned to a query represented by the given query vector, the category assigned by a machine-learned preprocessing model.

In some implementations of example method 1300, the example embedding method can include populating an input sequence using retrieved selected portions. For instance, a preprocessing framework 400 can provide an input template for input 110. Content generated or retrieved by machine-learned preprocessing system 106 can populate the input template.

In some implementations of example method 1300, the example embedding method can include providing the input sequence to be processed by a machine-learned sequence processing model.

FIG. 14 depicts a flowchart of an example embedding method 1400 for various implementations according to aspects of the present disclosure. One or more portion(s) of example embedding method 1400 can be implemented by a computing system that includes one or more computing devices such as, for example, computing systems described with reference to the other figures. Each respective portion of example embedding method 1400 can be performed by any (or any combination) of one or more computing devices. Moreover, one or more portion(s) of example embedding method 1400 can be implemented on the hardware components of the device(s) described herein, for example, to train one or more systems or models. FIG. 14 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 14 is described with reference to elements/terms described with respect to other systems and figures for exemplary illustrated purposes and is not meant to be limiting. One or more portions of example embedding method 1400 can be performed additionally, or alternatively, by other systems.

At 1402, example embedding method 1400 can include receiving session data descriptive of subject content configured for rendering in association with an application executing on a computing device. In some implementations of example embedding method 1400, the session data is automatically queued for processing and storage in embedded and non-embedded representations. Example embedding methods are described herein with respect to FIG. 2.

At 1404, example embedding method 1400 can include extracting selected portions of the subject content (e.g., extracted data 202).

At 1406, example embedding method 1400 can include obtaining an embedded representation that was generated by embedding the selected portions using a machine-learned embedding model (e.g., part of machine-learned preprocessing system 106).

At 1408, example embedding method 1400 can include storing the embedded representations in a vector database (e.g., embedded data store 214).

At 1410, example embedding method 1400 can include indexing the embedded representations using index values shared with the corresponding selected portions such that a selected portion can be retrieved by querying over the vector database.

Advantageously, the embedding method can be executed using a discrete parallel processing accelerator of the computing device, optionally wherein the discrete parallel processing accelerator includes a graphics processing unit (GPU) or an application specific integrated circuit (ASIC) configured for machine-learned model execution. For instance, embedding models 106-2 can be efficiently executed in a background process by leveraging hardware acceleration chips that relieve a primary system processor (e.g., CPU) from executing this background process.

In some implementations of example embedding method 1400, the machine-learned embedding model executes on a user computing device (e.g., an endpoint device with which the user interacts). For instance, the computing device can contain a discrete parallel processing accelerator that implements at least a portion of example embedding method 1400.

In some implementations of example embedding method 1400, the machine-learned embedding model executes on a server responsive to a request for a given item of subject content. For instance, the server can contain a discrete parallel processing accelerator that implements at least a portion of example embedding method 1400. In some implementations of example embedding method 1400, the server relays the subject content and the embedding to the user. In some implementations of example embedding method 1400, the server provides a cached embedding to the user, wherein the embedding was cached from a prior embedding operation. In some implementations of example embedding method 1400, obtaining the embedding includes: querying an embedding server for a cached embedding; and downloading the cached embedding.

In some implementations of example embedding method 1400, the example embedding method can include determining that an item of subject content is publicly accessible prior to querying the embedding server. For instance, some items of web content can be accessible only after establishing a secure session on a particular user device. A web server can, but might not, have access to participate in the secure session. Thus, the caches available to the web server might lack cached embeddings for content that is secured using secured credentials.

In some implementations of example embedding method 1400, obtaining the embedding includes: querying an embedding server for an embedding; and downloading the cached embedding.

In some implementations of example embedding method 1400, the application is a browser application. For instance, a computing device can execute any aspect of example embedding method 1400 to facilitate interactions with a browser application. Session data can be browsing session data. For example, in some implementations of example embedding method 1400, the subject content includes web page data.

In some implementations of example embedding method 1400, the vector database includes embedded representations of a plurality of modalities of subject content.

In some implementations of example embedding method 1400, the selected portions are separately stored in a key-value database. For example, a native data store 212 can store original or native representations of content extracted from the subject content (e.g., unembedded content).

In some implementations of example embedding method 1400, the subject content is loaded, by the application, into volatile memory of the computing device in preparation for rendering the subject content, and wherein the extracting and embedding operates directly on the subject content while being persisted in volatile memory by the application. For instance, the embeddings can be generated while the content is loaded into memory, avoiding caching and recalling the subject content at a later time to perform the processing into session data.

In some implementations of example embedding method 1400, the subject content is cached and queued for embedding using a background process.

In some implementations of example embedding method 1400, the example embedding method can include generating reduced precision representations of the selected portions (e.g., data sketches 204). In some implementations of example embedding method 1400, a reduced precision representation includes at least one of: a summary generated for a chunk of content; keywords extracted from a chunk of content; or a caption generated by processing an image.

In some implementations of example embedding method 1400, the example embedding method can include generating reduced precision representations of a respective selected portion by instructing a machine-learned sequence processing model to summarize the respective selected portion. In some implementations of example embedding method 1400, the example embedding method can include generating reduced precision representations of a respective selected portion by instructing a machine-learned sequence processing model to return keywords descriptive of: the respective selected portion, or a machine-generated summary of the respective selected portion.

In some implementations of example embedding method 1400, the example embedding method can include retrieving, for a given query vector, a selected portion using a vector-based similarity search over the vector database.

In some implementations of example embedding method 1400, the example embedding method can include restricting the similarity search over a subset of the vector database corresponding to a reduced level of precision. For instance, a reduced level of precision can be used to reduce a latency of a query. In some implementations of example embedding method 1400, the reduced level of precision is selected based on a category associated with the given query vector. In some implementations of example embedding method 1400, the reduced level of precision is selected based on a category assigned to a query represented by the given query vector, the category assigned by a machine-learned preprocessing model.

In some implementations of example embedding method 1400, the example embedding method can include populating an input sequence using retrieved selected portions. For instance, a preprocessing framework 400 can provide an input template for input 110. Content generated or retrieved by machine-learned preprocessing system 106 can populate the input template.

In some implementations of example embedding method 1400, the example embedding method can include providing the input sequence to be processed by a machine-learned sequence processing model.

In some implementations of example embedding method 1400, the embedded representations can be used to facilitate interactions with a system. For instance, queries over the embedded representations can be used to condition inputs to a machine-learned sequence processing model.

For example, the embedded representations obtained using example embedding method 1400 can be used in performing any aspect or any combination of aspects of any variation of example method 1300 described above.

Figure 15:
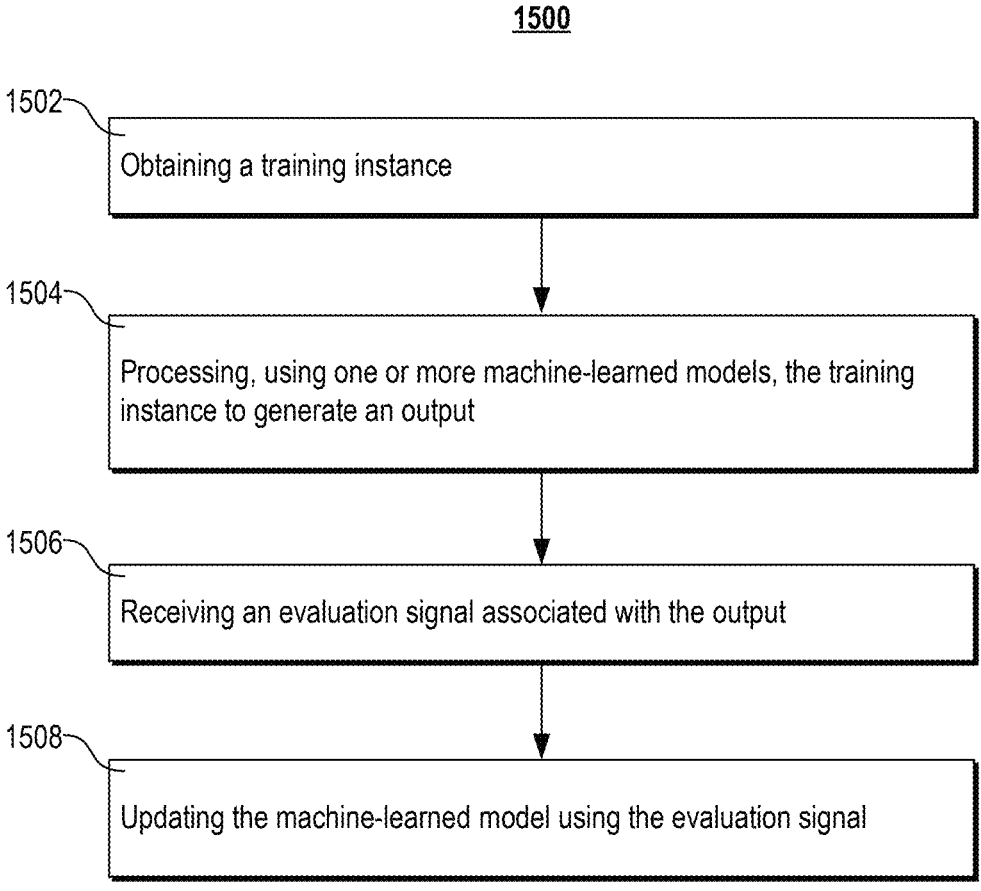
FIG. 15 is a flow chart diagram illustrating an example method for training a machine-learned model according to example implementations of aspects of the present disclosure.

FIG. 15 depicts a flowchart of a method 1500 for training one or more machine-learned models according to aspects of the present disclosure. For instance, an example machine-learned model can include a primary machine-learned model 112, any model or model component in machine-learned preprocessing system 106, and model or model component in machine-learned postprocessing system 118, interaction trajectory model 306, etc.

One or more portion(s) of example method 1500 can be implemented by a computing system that includes one or more computing devices such as, for example, computing systems described with reference to the other figures. Each respective portion of example method 1500 can be performed by any (or any combination) of one or more computing devices. Moreover, one or more portion(s) of example method 1500 can be implemented on the hardware components of the device(s) described herein, for example, to train one or more systems or models. FIG. 15 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 15 is described with reference to elements/terms described with respect to other systems and figures for exemplary illustrated purposes and is not meant to be limiting. One or more portions of example method 1500 can be performed additionally, or alternatively, by other systems.

At 1502, example method 1500 can include obtaining a training instance. A set of training data can include a plurality of training instances divided between multiple datasets (e.g., a training dataset, a validation dataset, or testing dataset). A training instance can be labeled or unlabeled. Although referred to in example method 1500 as a "training" instance, it is to be understood that runtime inferences can form training instances when a model is trained using an evaluation of the model's performance on that runtime instance (e.g., online training/learning). Example data types for the training instance and various tasks associated therewith are described throughout the present disclosure.

At 1504, example method 1500 can include processing, using one or more machine-learned models, the training instance to generate an output. The output can be directly obtained from the one or more machine-learned models or can be a downstream result of a chain of processing operations that includes an output of the one or more machine-learned models.

At 1506, example method 1500 can include receiving an evaluation signal associated with the output. The evaluation signal can be obtained using a loss function. Various determinations of loss can be used, such as mean squared error, likelihood loss, cross entropy loss, hinge loss, contrastive loss, or various other loss functions. The evaluation signal can be computed using known ground-truth labels (e.g., supervised learning), predicted or estimated labels (e.g., semi- or self-supervised learning), or without labels (e.g., unsupervised learning). The evaluation signal can be a reward (e.g., for reinforcement learning). The reward can be computed using a machine-learned reward model configured to generate rewards based on output(s) received. The reward can be computed using feedback data describing human feedback on the output(s).

At 1508, example method 1500 can include updating the machine-learned model using the evaluation signal. For example, values for parameters of the machine-learned model(s) can be learned, in some embodiments, using various training or learning techniques, such as, for example, backwards propagation. For example, the evaluation signal can be backpropagated from the output (or another source of the evaluation signal) through the machine-learned model(s) to update one or more parameters of the model(s) (e.g., based on a gradient of the evaluation signal with respect to the parameter value(s)). For example, system(s) containing one or more machine-learned models can be trained in an end-to-end manner. Gradient descent techniques can be used to iteratively update the parameters over a number of training iterations. In some implementations, performing backwards propagation of errors can include performing truncated backpropagation through time. Example method 1500 can include implementing a number of generalization techniques (e.g., weight decays, dropouts, etc.) to improve the generalization capability of the models being trained.

In some implementations, example method 1500 can be implemented for training a machine-learned model from an initialized state to a fully trained state (e.g., when the model exhibits a desired performance profile, such as based on accuracy, precision, recall, etc.).

In some implementations, example method 1500 can be implemented for particular stages of a training procedure. For instance, in some implementations, example method 1500 can be implemented for pre-training a machine-learned model. Pre-training can include, for instance, large-scale training over potentially noisy data to achieve a broad base of performance levels across a variety of tasks/data types. In some implementations, example method 1500 can be implemented for fine-tuning a machine-learned model. Fine-tuning can include, for instance, smaller-scale training on higher-quality (e.g., labeled, curated, etc.) data. Fine-tuning can affect all or a portion of the parameters of a machine-learned model. For example, various portions of the machine-learned model can be "frozen" for certain training stages. For example, parameters associated with an embedding space can be "frozen" during fine-tuning (e.g., to retain information learned from a broader domain(s) than present in the fine-tuning dataset(s)). An example fine-tuning approach includes reinforcement learning. Reinforcement learning can be based on user feedback on model performance during use.

An example method 1300' includes receiving user action data.

An example method 1300' includes constructing a preliminary query using the user action data.

An example method 1300' includes generating, using a preliminary machine-learned sequence processing model, a categorical response to the preliminary query.

An example method 1300' includes constructing, based on the categorical response to the first preliminary query and the user input, a primary query responsive to the user action data that includes data from a category indicated by the categorical response.

An example method 1300' includes generating, using a primary machine-learned sequence processing model, a response to the primary query.

An example method 1300' includes initiating one or more output operations based on the response to the primary query.

Figure 16:
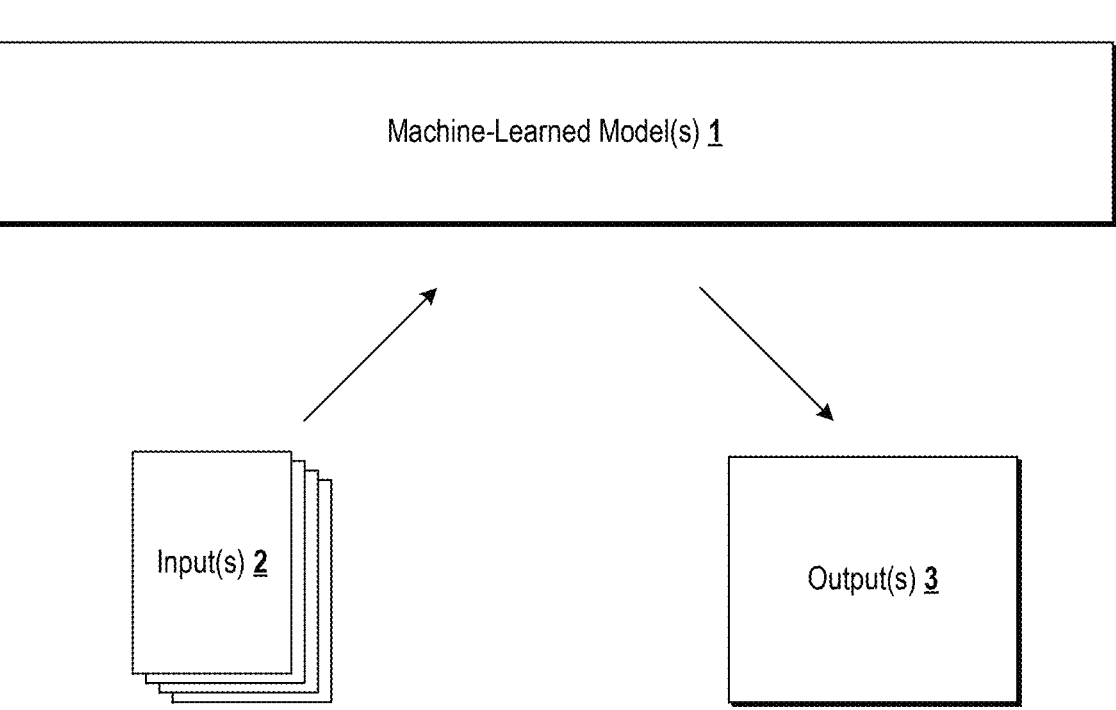
FIG. 16 is a block diagram of an example processing flow for using machine-learned model(s) to process input(s) to generate output(s) according to example implementations of aspects of the present disclosure.

FIG. 16 is a block diagram of an example processing flow for using machine-learned model(s) 1 to process input(s) 2 to generate output(s) 3.

Machine-learned model(s) 1 can be or include any one of or any part of machine-learned models referenced with respect to system 100. For example, any one or multiple of machine-learned models 106-1 or embedding model(s) 106-2 can be a machine-learned model 1. Primary machine-learned model 112 can be a machine-learned model 1. Any model or learned component of machine-learned postprocessing system 118 can be or include a machine-learned model 1. Features and variations described herein with respect to machine-learned model 1 are to be understood as describing features and variations of any of the machine-learned models described herein. Where this description references machine-learned model 1 it is to be understood that implementations of each of the other models described herein are implicitly referenced and represented thereby.

Machine-learned model(s) 1 can be or include one or multiple machine-learned models or model components. Example machine-learned models can include neural networks (e.g., deep neural networks). Example machine-learned models can include non-linear models or linear models. Example machine-learned models can use other architectures in lieu of or in addition to neural networks. Example machine-learned models can include decision tree based models, support vector machines, hidden Markov models, Bayesian networks, linear regression models, k-means clustering models, etc.

Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism such as self-attention. For example, some example machine-learned models can include multi-headed self-attention models.

Machine-learned model(s) 1 can include a single or multiple instances of the same model configured to operate on data from input(s) 2. Machine-learned model(s) 1 can include an ensemble of different models that can cooperatively interact to process data from input(s) 2. For example, machine-learned model(s) 1 can employ a mixture-of-experts structure. See, e.g., Zhou et al., *Mixture-of-Experts with Expert Choice Routing*, ARXIV: 2202.09368v2 (Oct. 14, 2022).

Input(s) 2 can generally include or otherwise represent various types of data. Input(s) 2 can include one type or many different types of data. Output(s) 3 can be data of the same type(s) or of different types of data as compared to input(s) 2. Output(s) 3 can include one type or many different types of data.

Example data types for input(s) 2 or output(s) 3 include natural language text data, software code data (e.g., source code, object code, machine code, or any other form of computer-readable instructions or programming languages), machine code data (e.g., binary code, assembly code, or other forms of machine-readable instructions that can be executed directly by a computer's central processing unit), assembly code data (e.g., low-level programming languages that use symbolic representations of machine code instructions to program a processing unit), genetic data or other chemical or biochemical data, image data, audio data, audio-visual data, haptic data, biometric data, medical data, financial data, statistical data, geographical data, astronomical data, historical data, sensor data generally (e.g., digital or analog values, such as voltage or other absolute or relative level measurement values from a real or artificial input, such as from an audio sensor, light sensor, displacement sensor, etc.), and the like. Data can be raw or processed and can be in any format or schema.

In multimodal inputs 2 or outputs 3, example combinations of data types include image data and audio data, image data and natural language data, natural language data and software code data, image data and biometric data, sensor data and medical data, etc. It is to be understood that any combination of data types in an input 2 or an output 3 can be present.

An example input 2 can include one or multiple data types, such as the example data types noted above. An example output 3 can include one or multiple data types, such as the example data types noted above. The data type(s) of input 2 can be the same as or different from the data type(s) of output 3. It is to be understood that the example data types noted above are provided for illustrative purposes only. Data types contemplated within the scope of the present disclosure are not limited to those examples noted above.

Figure 17:
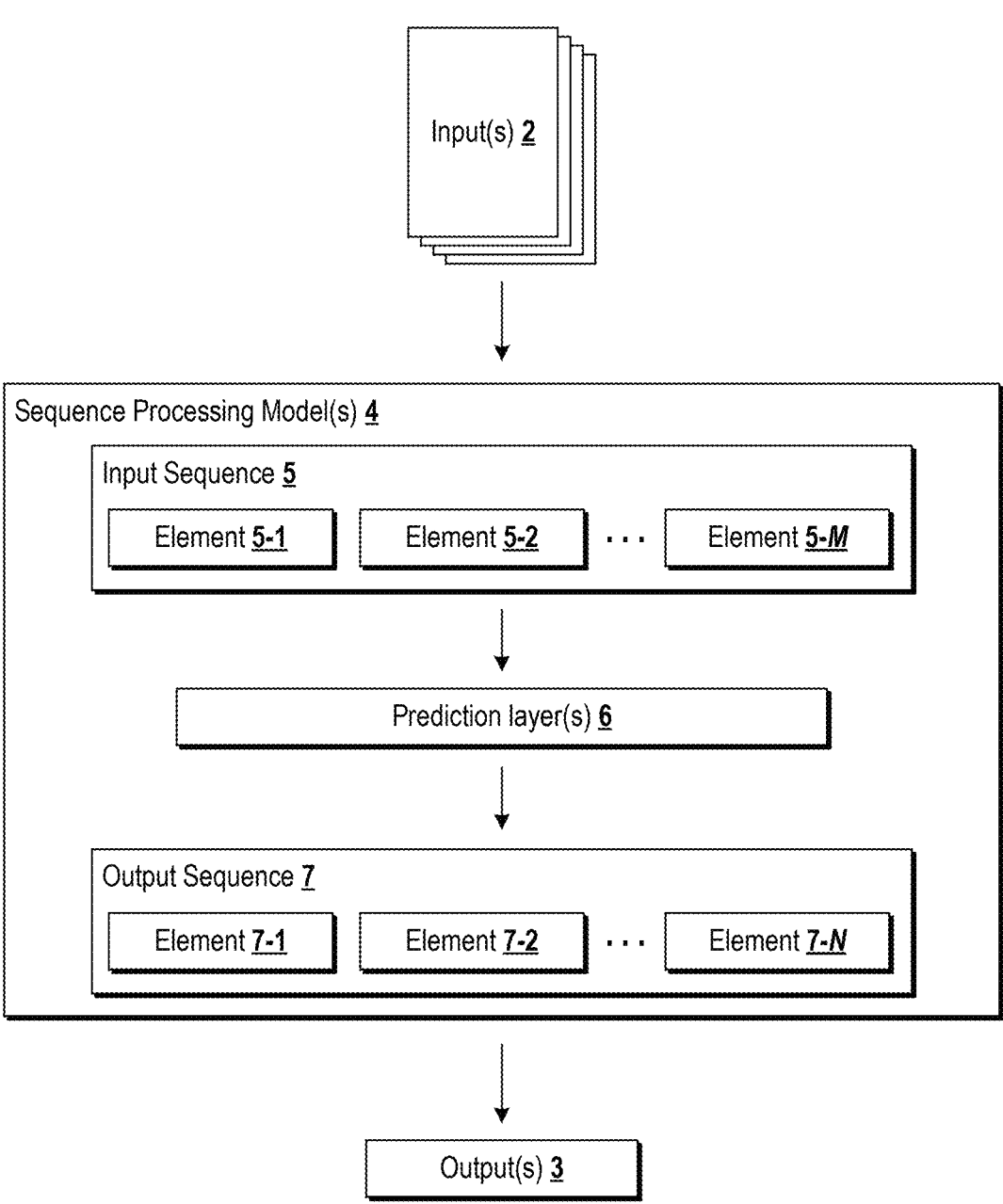
FIG. 17 is a block diagram of an example sequence processing model according to example implementations of aspects of the present disclosure.

FIG. 17 is a block diagram of an example implementation of an example machine-learned model configured to process sequences of information. For instance, an example implementation of machine-learned model(s) 1 can include machine-learned sequence processing model(s) 4. An example system can pass input(s) 2 to sequence processing model(s) 4. Sequence processing model(s) 4 can include one or more machine-learned components. Sequence processing model(s) 4 can process the data from input(s) 2 to obtain an input sequence 5. Input sequence 5 can include one or more input elements 5-1, 5-2, . . . , 5-M, etc. obtained from input(s) 2. Sequence processing model 4 can process input sequence 5 using prediction layer(s) 6 to generate an output sequence 7. Output sequence 7 can include one or more output elements 7-1, 7-2, . . . , 7-N, etc. generated based on input sequence 5. The system can generate output(s) 3 based on output sequence 7.

Sequence processing model(s) 4 can include one or multiple machine-learned model components configured to ingest, generate, or otherwise reason over sequences of information. For example, some example sequence processing models in the text domain are referred to as "Large Language Models," or LLMs. See, e.g., PaLM 2 Technical Report, GOOGLE, https://ai.google/static/documents/palm2techreport.pdf (n.d.). Other example sequence processing models can operate in various domains, such as image domains, see, e.g., Dosovitskiy et al., *An Image is Worth* 16×16 *Words: Transformers for Image Recognition at Scale*, ARXIV: 2010.11929v2 (Jun. 3, 2021), audio domains, see, e.g., Agostinelli et al., *MusicLM: Generating Music From Text*, ARXIV: 2301.11325v1 (Jan. 26, 2023), biochemical domains, see, e.g., Jumper et al., Highly accurate protein structure prediction with AlphaFold, 596 Nature 583 (Aug. 26, 2021), by way of example. Sequence processing model(s) 4 can process one or multiple types of data simultaneously. Sequence processing models can be multimodal. See, e.g., Google Deepmind, *Gemini: A Family of Highly Capable Multimodal Models* (2023), https://storage.googleapis.com/deepmind-media/gemini/gemini_1_report.pdf. Sequence processing model(s) 4 can include relatively large models (e.g., more parameters, computationally expensive, etc.), relatively small models (e.g., fewer parameters, computationally lightweight, etc.), or both.

In general, sequence processing model(s) 4 can obtain input sequence 5 using data from input(s) 2. For instance, input sequence 5 can include a representation of data from input(s) 2 in a format understood by sequence processing model(s) 4. One or more machine-learned components of sequence processing model(s) 4 can ingest the data from input(s) 2, parse the data into pieces compatible with the processing architectures of sequence processing model(s) 4 (e.g., via "tokenization"), and project the pieces into an input space associated with prediction layer(s) 6 (e.g., via "embedding").

Sequence processing model(s) 4 can ingest the data from input(s) 2 and parse the data into a sequence of elements to obtain input sequence 5. For example, a portion of input data from input(s) 2 can be broken down into pieces that collectively represent the content of the portion of the input data. The pieces can provide the elements of the sequence.

Elements 5-1, 5-2, . . . , 5-M can represent, in some cases, building blocks for capturing or expressing meaningful information in a particular data domain. For instance, the elements can describe "atomic units" across one or more domains. For example, for textual input source(s), the elements can correspond to groups of one or more words or sub-word components, such as sets of one or more characters.

For example, elements 5-1, 5-2, . . . , 5-M can represent tokens obtained using a tokenizer. For instance, a tokenizer can process a given portion of an input source and output a series of tokens (e.g., corresponding to input elements 5-1, 5-2, . . . , 5-M) that represent the portion of the input source. Various approaches to tokenization can be used. For instance, textual input source(s) can be tokenized using a byte-pair encoding (BPE) technique. See, e.g., Kudo et al., *SentencePiece: A simple and language independent subword tokenizer and detokenizer for Neural Text Processing*, PROCEEDINGS OF THE 2018 CONFERENCE ON EMPIRICAL METHODS IN NATURAL LANGUAGE PROCESSING (System Demonstrations), pages 66-71 (Oct. 31-Nov. 4, 2018), https://aclanthology.org/D18-2012.pdf. Image-based input source(s) can be tokenized by extracting and serializing patches from an image.

In general, arbitrary data types can be serialized and processed into input sequence 5. It is to be understood that element(s) 5-1, 5-2, . . . , 5-M depicted in FIG. 17 can be the tokens or can be the embedded representations thereof.

Prediction layer(s) 6 can predict one or more output elements 7-1, 7-2, . . . , 7-N based on the input elements. Prediction layer(s) 6 can include one or more machine-learned model architectures, such as one or more layers of learned parameters that manipulate and transform the input(s) to extract higher-order meaning from, and relationships between, input element(s) 5-1, 5-2, . . . , 5-M. In this manner, for instance, example prediction layer(s) 6 can predict new output element(s) in view of the context provided by input sequence 5.

Prediction layer(s) 6 can evaluate associations between portions of input sequence 5 and a particular output element. These associations can inform a prediction of the likelihood that a particular output follows the input context. For example, consider the textual snippet, "The carpenter's toolbox was small and heavy. It was full of _____." Example prediction layer(s) 6 can identify that "It" refers back to "toolbox" by determining a relationship between the respective embeddings. Example prediction layer(s) 6 can also link "It" to the attributes of the toolbox, such as "small" and "heavy." Based on these associations, prediction layer(s) 6 can, for instance, assign a higher probability to the word "nails" than to the word "sawdust."

A transformer is an example architecture that can be used in prediction layer(s) 4. See, e.g., Vaswani et al., *Attention Is*

*All You Need*, ᴀʀXɪᴠ: 1706.03762v7 (Aug. 2, 2023). A transformer is an example of a machine-learned model architecture that uses an attention mechanism to compute associations between items within a context window. The context window can include a sequence that contains input sequence 5 and potentially one or more output element(s) 7-1, 7-2, . . . , 7-N. A transformer block can include one or more attention layer(s) and one or more post-attention layer(s) (e.g., feedforward layer(s), such as a multi-layer perceptron).

Prediction layer(s) 6 can include other machine-learned model architectures in addition to or in lieu of transformer-based architectures. For example, recurrent neural networks (RNNs) and long short-term memory (LSTM) models can also be used, as well as convolutional neural networks (CNNs). In general, prediction layer(s) 6 can leverage various kinds of artificial neural networks that can understand or generate sequences of information.

Output sequence 7 can include or otherwise represent the same or different data types as input sequence 5. For instance, input sequence 5 can represent textual data, and output sequence 7 can represent textual data. Input sequence 5 can represent image, audio, or audiovisual data, and output sequence 7 can represent textual data (e.g., describing the image, audio, or audiovisual data). It is to be understood that prediction layer(s) 6, and any other interstitial model components of sequence processing model(s) 4, can be configured to receive a variety of data types in input sequence(s) 5 and output a variety of data types in output sequence(s) 7.

Output sequence 7 can have various relationships to input sequence 5. Output sequence 7 can be a continuation of input sequence 5. Output sequence 7 can be complementary to input sequence 5. Output sequence 7 can translate, transform, augment, or otherwise modify input sequence 5. Output sequence 7 can answer, evaluate, confirm, or otherwise respond to input sequence 5. Output sequence 7 can implement (or describe instructions for implementing) an instruction provided via input sequence 5.

Output sequence 7 can be generated autoregressively. For instance, for some applications, an output of one or more prediction layer(s) 6 can be passed through one or more output layers (e.g., softmax layer) to obtain a probability distribution over an output vocabulary (e.g., a textual or symbolic vocabulary) conditioned on a set of input elements in a context window. In this manner, for instance, output sequence 7 can be autoregressively generated by sampling a likely next output element, adding that element to the context window, and re-generating the probability distribution based on the updated context window, and sampling a likely next output element, and so forth.

Output sequence 7 can also be generated non-autoregressively. For instance, multiple output elements of output sequence 7 can be predicted together without explicit sequential conditioning on each other. See, e.g., Saharia et al., Non-Autoregressive Machine Translation with Latent Alignments, ᴀʀXɪᴠ: 2004.07437v3 (Nov. 16, 2020).

Output sequence 7 can include one or multiple portions or elements. In an example content generation configuration, output sequence 7 can include multiple elements corresponding to multiple portions of a generated output sequence (e.g., a textual sentence, values of a discretized waveform, computer code, etc.). In an example classification configuration, output sequence 7 can include a single element associated with a classification output. For instance, an output "vocabulary" can include a set of classes into which an input sequence is to be classified. For instance, a vision transformer block can pass latent state information to a multilayer perceptron that outputs a likely class value associated with an input image.

Figure 18:
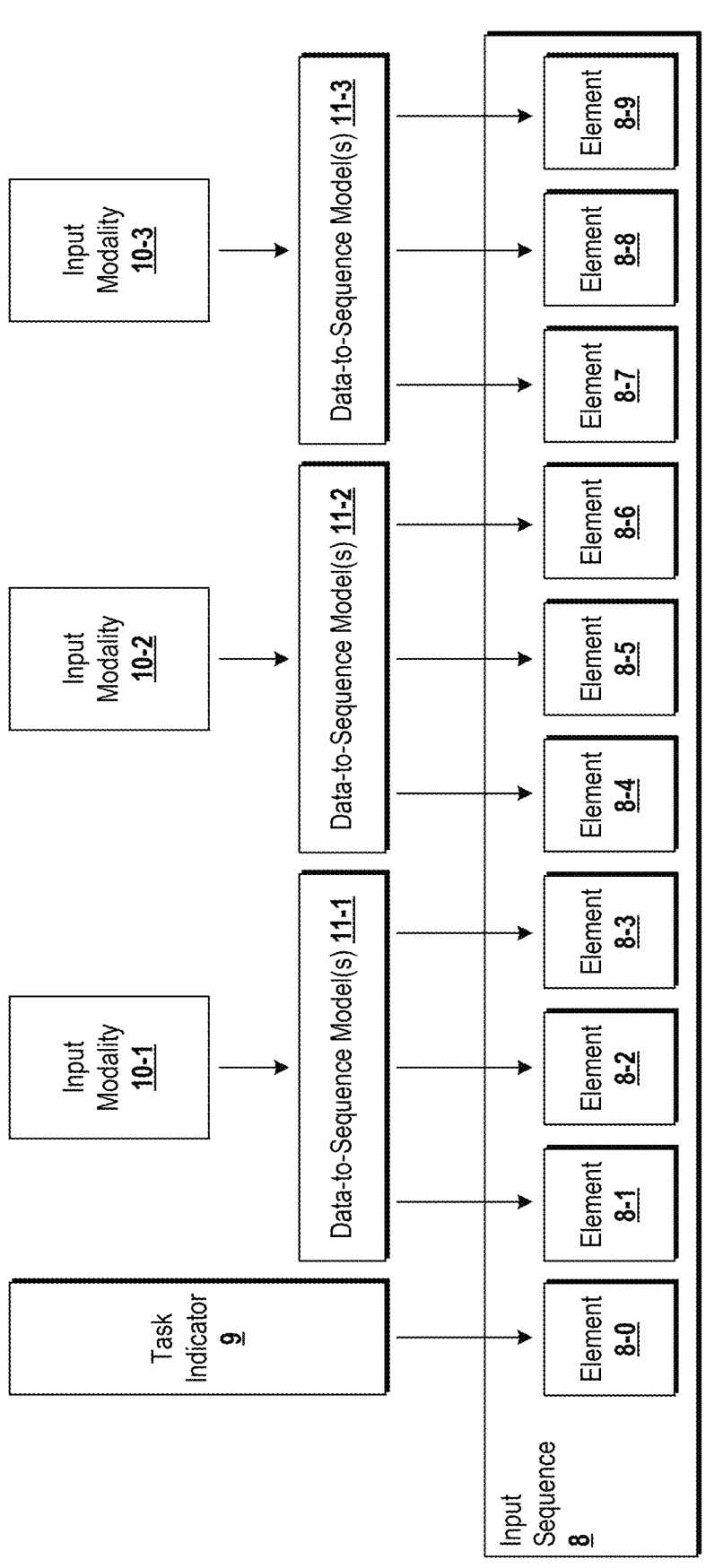
FIG. 18 is a block diagram of an example technique for populating an example input sequence for processing by a sequence processing model according to example implementations of aspects of the present disclosure.

FIG. 18 is a block diagram of an example technique for populating an example input sequence 8. Input sequence 8 can include various functional elements that form part of the model infrastructure, such as an element 8-0 obtained from a task indicator 9 that signals to any model(s) that process input sequence 8 that a particular task is being performed (e.g., to help adapt a performance of the model(s) to that particular task). Input sequence 8 can include various data elements from different data modalities. For instance, an input modality 10-1 can include one modality of data. A data-to-sequence model 11-1 can process data from input modality 10-1 to project the data into a format compatible with input sequence 8 (e.g., one or more vectors dimensioned according to the dimensions of input sequence 8) to obtain elements 8-1, 8-2, 8-3. Another input modality 10-2 can include a different modality of data. A data-to-sequence model 11-2 can project data from input modality 10-2 into a format compatible with input sequence 8 to obtain elements 8-4, 8-5, 8-6. Another input modality 10-3 can include yet another different modality of data. A data-to-sequence model 11-3 can project data from input modality 10-3 into a format compatible with input sequence 8 to obtain elements 8-7, 8-8, 8-9.

Input sequence 8 can be the same as or different from input sequence 5. Input sequence 8 can be a multimodal input sequence that contains elements that represent data from different modalities using a common dimensional representation. For instance, an embedding space can have P dimensions. Input sequence 8 can be configured to contain a plurality of elements that have P dimensions. In this manner, for instance, example implementations can facilitate information extraction and reasoning across diverse data modalities by projecting data into elements in the same embedding space for comparison, combination, or other computations therebetween.

For example, elements 8-0, . . . , 8-9 can indicate particular locations within a multidimensional embedding space. Some elements can map to a set of discrete locations in the embedding space. For instance, elements that correspond to discrete members of a predetermined vocabulary of tokens can map to discrete locations in the embedding space that are associated with those tokens. Other elements can be continuously distributed across the embedding space. For instance, some data types can be broken down into continuously defined portions (e.g., image patches) that can be described using continuously distributed locations within the embedding space.

In some implementations, the expressive power of the embedding space may not be limited to meanings associated with any particular set of tokens or other building blocks. For example, a continuous embedding space can encode a spectrum of high-order information. An individual piece of information (e.g., a token) can map to a particular point in that space: for instance, a token for the word "dog" can be projected to an embedded value that points to a particular location in the embedding space associated with canine-related information. Similarly, an image patch of an image of a dog on grass can also be projected into the embedding space. In some implementations, the projection of the image of the dog can be similar to the projection of the word "dog" while also having similarity to a projection of the word "grass," while potentially being different from both. In some implementations, the projection of the image patch may not exactly align with any single projection of a single word. In some implementations, the projection of the image patch can align with a combination of the projections of the words "dog" and "grass." In this manner, for instance, a high-order embedding space can encode information that can be independent of data modalities in which the information is expressed.

Task indicator 9 can include a model or model component configured to identify a task being performed and inject, into input sequence 8, an input value represented by element 8-0 that signals which task is being performed. For instance, the input value can be provided as a data type associated with an input modality and projected along with that input modality (e.g., the input value can be a textual task label that is embedded along with other textual data in the input; the input value can be a pixel-based representation of a task that is embedded along with other image data in the input; etc.). The input value can be provided as a data type that differs from or is at least independent from other input(s). For instance, the input value represented by element 8-0 can be a learned within a continuous embedding space.

Input modalities 10-1, 10-2, and 10-3 can be associated with various different data types (e.g., as described above with respect to input(s) 2 and output(s) 3).

Data-to-sequence models 11-1, 11-2, and 11-3 can be the same or different from each other. Data-to-sequence models 11-1, 11-2, and 11-3 can be adapted to each respective input modality 10-1, 10-2, and 10-3. For example, a textual data-to-sequence model can subdivide a portion of input text and project the subdivisions into element(s) in input sequence 8 (e.g., elements 8-1, 8-2, 8-3, etc.). An image data-to-sequence model can subdivide an input image and project the subdivisions into element(s) in input sequence 8 (e.g., elements 8-4, 8-5, 8-6, etc.). An arbitrary datatype data-to-sequence model can subdivide an input of that arbitrary datatype and project the subdivisions into element(s) in input sequence 8 (e.g., elements 8-7, 8-8, 8-9, etc.).

Data-to-sequence models 11-1, 11-2, and 11-3 can form part of machine-learned sequence processing model(s) 4. Data-to-sequence models 11-1, 11-2, and 11-3 can be jointly trained with or trained independently from machine-learned sequence processing model(s) 4. Data-to-sequence models 11-1, 11-2, and 11-3 can be trained end-to-end with machine-learned sequence processing model(s) 4.

Figure 19:
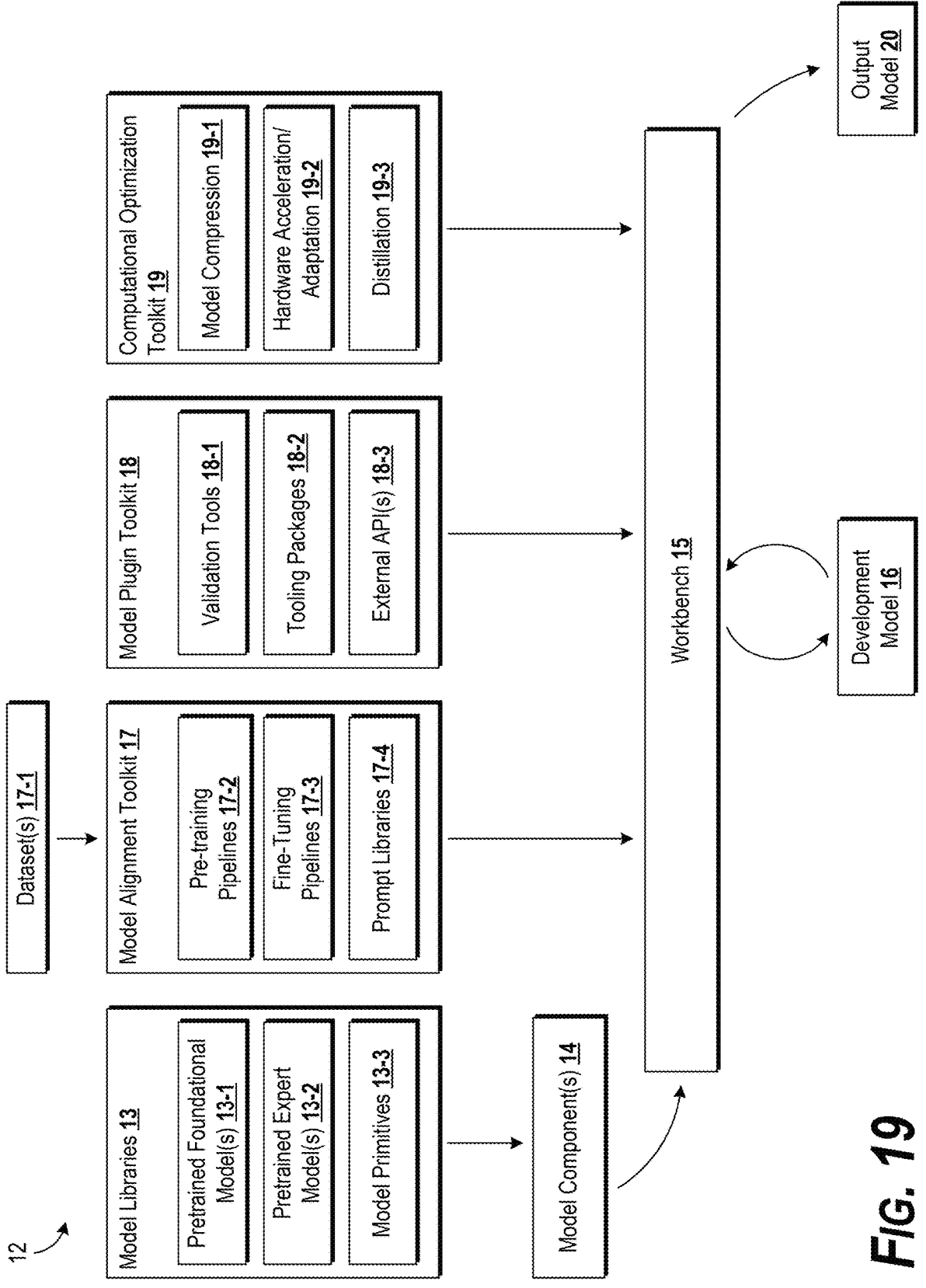
FIG. 19 is a block diagram of an example model development platform according to example implementations of aspects of the present disclosure.

FIG. 19 is a block diagram of an example model development platform 12 that can facilitate creation, adaptation, and refinement of example machine-learned models (e.g., machine-learned model(s) 1, sequence processing model(s) 4, etc.). Model development platform 12 can provide a number of different toolkits that developer systems can employ in the development of new or adapted machine-learned models.

Model development platform 12 can provide one or more model libraries 13 containing building blocks for new models. Model libraries 13 can include one or more pre-trained foundational models 13-1, which can provide a backbone of processing power across various tasks. Model libraries 13 can include one or more pre-trained expert models 13-2, which can be focused on performance in particular domains of expertise. Model libraries 13 can include various model primitives 13-3, which can provide low-level architectures or components (optionally pre-trained), which can be assembled in various arrangements as desired.

Model development platform 12 can receive selections of various model components 14. Model development platform 12 can pass selected model components 14 to a workbench 15 that combines selected model components 14 into a development model 16.

Workbench 15 can facilitate further refinement and adaptation of development model 16 by leveraging a number of different toolkits integrated with model development platform 12. For example, workbench 15 can facilitate alignment of the development model 16 with a desired performance profile on various tasks using a model alignment toolkit 17.

Model alignment toolkit 17 can provide a number of tools for causing development model 16 to generate outputs aligned with desired behavioral characteristics. Alignment can include increasing an accuracy, precision, recall, etc. of model outputs. Alignment can include enforcing output styles, schema, or other preferential characteristics of model outputs. Alignment can be general or domain-specific. For instance, a pre-trained foundational model 13-1 can begin with an initial level of performance across multiple domains. Alignment of the pre-trained foundational model 13-1 can include improving a performance in a particular domain of information or tasks (e.g., even at the expense of performance in another domain of information or tasks).

Model alignment toolkit 17 can integrate one or more dataset(s) 17-1 for aligning development model 16. Curated dataset(s) 17-1 can include labeled or unlabeled training data. Dataset(s) 17-1 can be obtained from public domain datasets. Dataset(s) 17-1 can be obtained from private datasets associated with one or more developer system(s) for the alignment of bespoke machine-learned model(s) customized for private use-cases.

Pre-training pipelines 17-2 can include a machine-learned model training workflow configured to update development model 16 over large-scale, potentially noisy datasets. For example, pre-training can leverage unsupervised learning techniques (e.g., de-noising, etc.) to process large numbers of training instances to update model parameters from an initialized state and achieve a desired baseline performance. Pre-training pipelines 17-2 can leverage unlabeled datasets in dataset(s) 17-1 to perform pre-training. Workbench 15 can implement a pre-training pipeline 17-2 to pre-train development model 16.

Fine-tuning pipelines 17-3 can include a machine-learned model training workflow configured to refine the model parameters of development model 16 with higher-quality data. Fine-tuning pipelines 17-3 can update development model 16 by conducting supervised training with labeled dataset(s) in dataset(s) 17-1. Fine-tuning pipelines 17-3 can update development model 16 by conducting reinforcement learning using reward signals from user feedback signals. Workbench 15 can implement a fine-tuning pipeline 17-3 to fine-tune development model 16.

Prompt libraries 17-4 can include sets of inputs configured to induce behavior aligned with desired performance criteria. Prompt libraries 17-4 can include few-shot prompts (e.g., inputs providing examples of desired model outputs for prepending to a desired runtime query), chain-of-thought prompts (e.g., inputs providing step-by-step reasoning within the exemplars to facilitate thorough reasoning by the model), and the like.

Example prompts can be retrieved from an available repository of prompt libraries 17-4. Example prompts can be contributed by one or more developer systems using workbench 15.

In some implementations, pre-trained or fine-tuned models can achieve satisfactory performance without exemplars in the inputs. For instance, zero-shot prompts can include inputs that lack exemplars. Zero-shot prompts can be within a domain within a training dataset or outside of the training domain(s).

Prompt libraries 17-4 can include one or more prompt engineering tools. Prompt engineering tools can provide workflows for retrieving or learning optimized prompt values. Prompt engineering tools can facilitate directly learning prompt values (e.g., input element values) based on one or more training iterations. Workbench 15 can implement prompt engineering tools in development model 16.

Prompt libraries 17-4 can include pipelines for prompt generation. For example, inputs can be generated using development model 16 itself or other machine-learned models. In this manner, for instance, a first model can process information about a task and output an input for a second model to process in order to perform a step of the task. The second model can be the same as or different from the first model. Workbench 15 can implement prompt generation pipelines in development model 16.

Prompt libraries 17-4 can include pipelines for context injection. For instance, a performance of development model 16 on a particular task can improve if provided with additional context for performing the task. Prompt libraries 17-4 can include software components configured to identify desired context, retrieve the context from an external source (e.g., a database, a sensor, etc.), and add the context to the input prompt. Workbench 15 can implement context injection pipelines in development model 16.

Although various training examples described herein with respect to model development platform 12 refer to "pre-training" and "fine-tuning," it is to be understood that model alignment toolkit 17 can generally support a wide variety of training techniques adapted for training a wide variety of machine-learned models. Example training techniques can correspond to the example training method 1500 described above.

Model development platform 12 can include a model plugin toolkit 18. Model plugin toolkit 18 can include a variety of tools configured for augmenting the functionality of a machine-learned model by integrating the machine-learned model with other systems, devices, and software components. For instance, a machine-learned model can use tools to increase performance quality where appropriate. For instance, deterministic tasks can be offloaded to dedicated tools in lieu of probabilistically performing the task with an increased risk of error. For instance, instead of autoregressively predicting the solution to a system of equations, a machine-learned model can recognize a tool to call for obtaining the solution and pass the system of equations to the appropriate tool. The tool can be a traditional system of equations solver that can operate deterministically to resolve the system of equations. The output of the tool can be returned in response to the original query. In this manner, tool use can allow some example models to focus on the strengths of machine-learned models—e.g., understanding an intent in an unstructured request for a task—while augmenting the performance of the model by offloading certain tasks to a more focused tool for rote application of deterministic algorithms to a well-defined problem.

Model plugin toolkit 18 can include validation tools 18-1. Validation tools 18-1 can include tools that can parse and confirm output(s) of a machine-learned model. Validation tools 18-1 can include engineered heuristics that establish certain thresholds applied to model outputs. For example, validation tools 18-1 can ground the outputs of machine-learned models to structured data sources (e.g., to mitigate "hallucinations").

Model plugin toolkit 18 can include tooling packages 18-2 for implementing one or more tools that can include scripts or other executable code that can be executed alongside development model 16. Tooling packages 18-2 can include one or more inputs configured to cause machine-learned model(s) to implement the tools (e.g., few-shot prompts that induce a model to output tool calls in the proper syntax, etc.). Tooling packages 18-2 can include, for instance, fine-tuning training data for training a model to use a tool.

Model plugin toolkit 18 can include interfaces for calling external application programming interfaces (APIs) 18-3. For instance, in addition to or in lieu of implementing tool calls or tool code directly with development model 16, development model 16 can be aligned to output instructions that initiate API calls to send or obtain data via external systems.

Model plugin toolkit 18 can integrate with prompt libraries 17-4 to build a catalog of available tools for use with development model 16. For instance, a model can receive, in an input, a catalog of available tools, and the model can generate an output that selects a tool from the available tools and initiates a tool call for using the tool.

Model development platform 12 can include a computational optimization toolkit 19 for optimizing a computational performance of development model 16. For instance, tools for model compression 19-1 can allow development model 16 to be reduced in size while maintaining a desired level of performance. For instance, model compression 19-1 can include quantization workflows, weight pruning and sparsification techniques, etc. Tools for hardware acceleration 19-2 can facilitate the configuration of the model storage and execution formats to operate optimally on different hardware resources. For instance, hardware acceleration 19-2 can include tools for optimally sharding models for distributed processing over multiple processing units for increased bandwidth, lower unified memory requirements, etc. Tools for distillation 19-3 can provide for the training of lighter-weight models based on the knowledge encoded in development model 16. For instance, development model 16 can be a highly performant, large machine-learned model optimized using model development platform 12. To obtain a lightweight model for running in resource-constrained environments, a smaller model can be a "student model" that learns to imitate development model 16 as a "teacher model." In this manner, for instance, the investment in learning the parameters and configurations of development model 16 can be efficiently transferred to a smaller model for more efficient inference.

Workbench 15 can implement one, multiple, or none of the toolkits implemented in model development platform 12. Workbench 15 can output an output model 20 based on development model 16. Output model 20 can be a deployment version of development model 16. Output model 20 can be a development or training checkpoint of development model 16. Output model 20 can be a distilled, compressed, or otherwise optimized version of development model 16.

Figure 20:
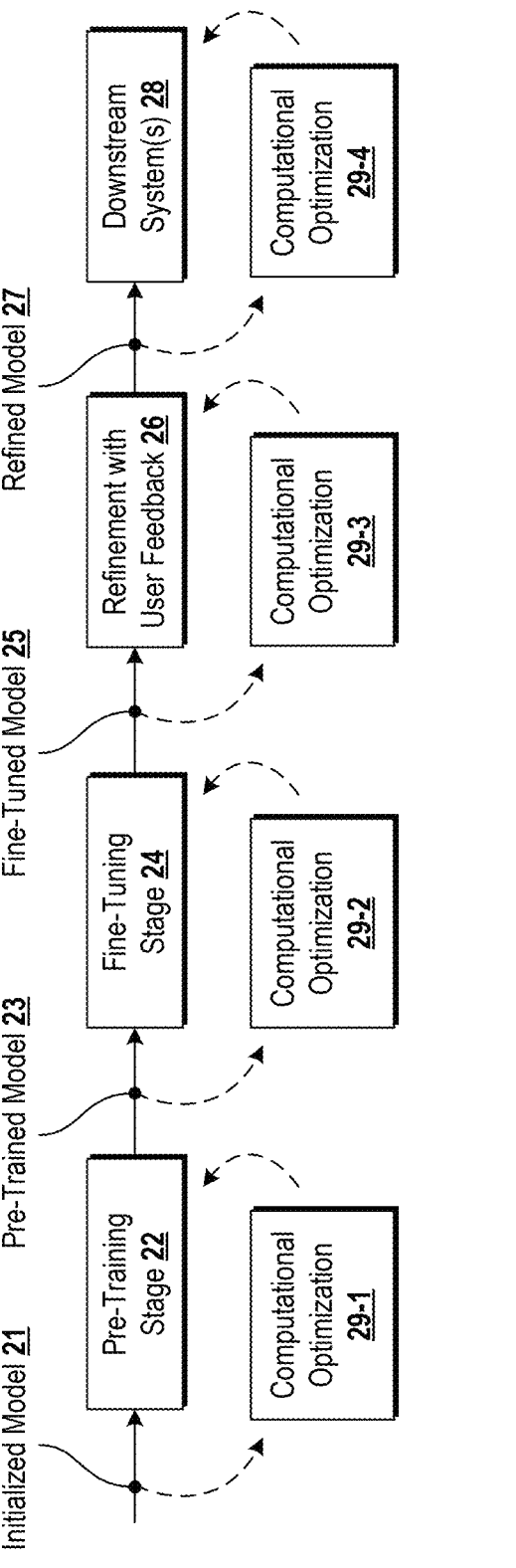
FIG. 20 is a block diagram of an example training workflow for training a machine-learned model according to example implementations of aspects of the present disclosure.

FIG. 20 is a block diagram of an example training flow for training a machine-learned development model 16. One or more portion(s) of the example training flow can be implemented by a computing system that includes one or more computing devices such as, for example, computing systems described with reference to the other figures. Each respective portion of the example training flow can be performed by any (or any combination) of one or more computing devices. Moreover, one or more portion(s) of the example training flow can be implemented on the hardware components of the device(s) described herein, for example, to train one or more systems or models. FIG. 20 depicts elements performed in a particular order for purposes of illustration and discussion.

Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 20 is described with reference to elements/terms described with respect to other systems and figures for exemplary illustrated purposes and is not meant to be limiting. One or more portions of the example training flow can be performed additionally, or alternatively, by other systems.

Initially, development model 16 can persist in an initial state as an initialized model 21. Development model 16 can be initialized with weight values. Initial weight values can be random or based on an initialization schema. Initial weight values can be based on prior pre-training for the same or for a different model.

Initialized model 21 can undergo pre-training in a pre-training stage 22. Pre-training stage 22 can be implemented using one or more pre-training pipelines 17-2 over data from dataset(s) 17-1. Pre-training can be omitted, for example, if initialized model 21 is already pre-trained (e.g., development model 16 contains, is, or is based on a pre-trained foundational model or an expert model).

Pre-trained model 23 can then be a new version of development model 16, which can persist as development model 16 or as a new development model. Pre-trained model 23 can be the initial state if development model 16 was already pre-trained. Pre-trained model 23 can undergo fine-tuning in a fine-tuning stage 24. Fine-tuning stage 24 can be implemented using one or more fine-tuning pipelines 17-3 over data from dataset(s) 17-1. Fine-tuning can be omitted, for example, if a pre-trained model has satisfactory performance, if the model was already fine-tuned, or if other tuning approaches are preferred.

Fine-tuned model 29 can then be a new version of development model 16, which can persist as development model 16 or as a new development model. Fine-tuned model 29 can be the initial state if development model 16 was already fine-tuned. Fine-tuned model 29 can undergo refinement with user feedback 26. For instance, refinement with user feedback 26 can include reinforcement learning, optionally based on human feedback from human users of fine-tuned model 25. As reinforcement learning can be a form of fine-tuning, it is to be understood that fine-tuning stage 24 can subsume the stage for refining with user feedback 26. Refinement with user feedback 26 can produce a refined model 27. Refined model 27 can be output to downstream system(s) 28 for deployment or further development.

In some implementations, computational optimization operations can be applied before, during, or after each stage. For instance, initialized model 21 can undergo computational optimization 29-1 (e.g., using computational optimization toolkit 19) before pre-training stage 22. Pre-trained model 23 can undergo computational optimization 29-2 (e.g., using computational optimization toolkit 19) before fine-tuning stage 24. Fine-tuned model 25 can undergo computational optimization 29-3 (e.g., using computational optimization toolkit 19) before refinement with user feedback 26. Refined model 27 can undergo computational optimization 29-4 (e.g., using computational optimization toolkit 19) before output to downstream system(s) 28. Computational optimization(s) 29-1, . . . , 29-4 can all be the same, all be different, or include at least some different optimization techniques.

Figure 21:
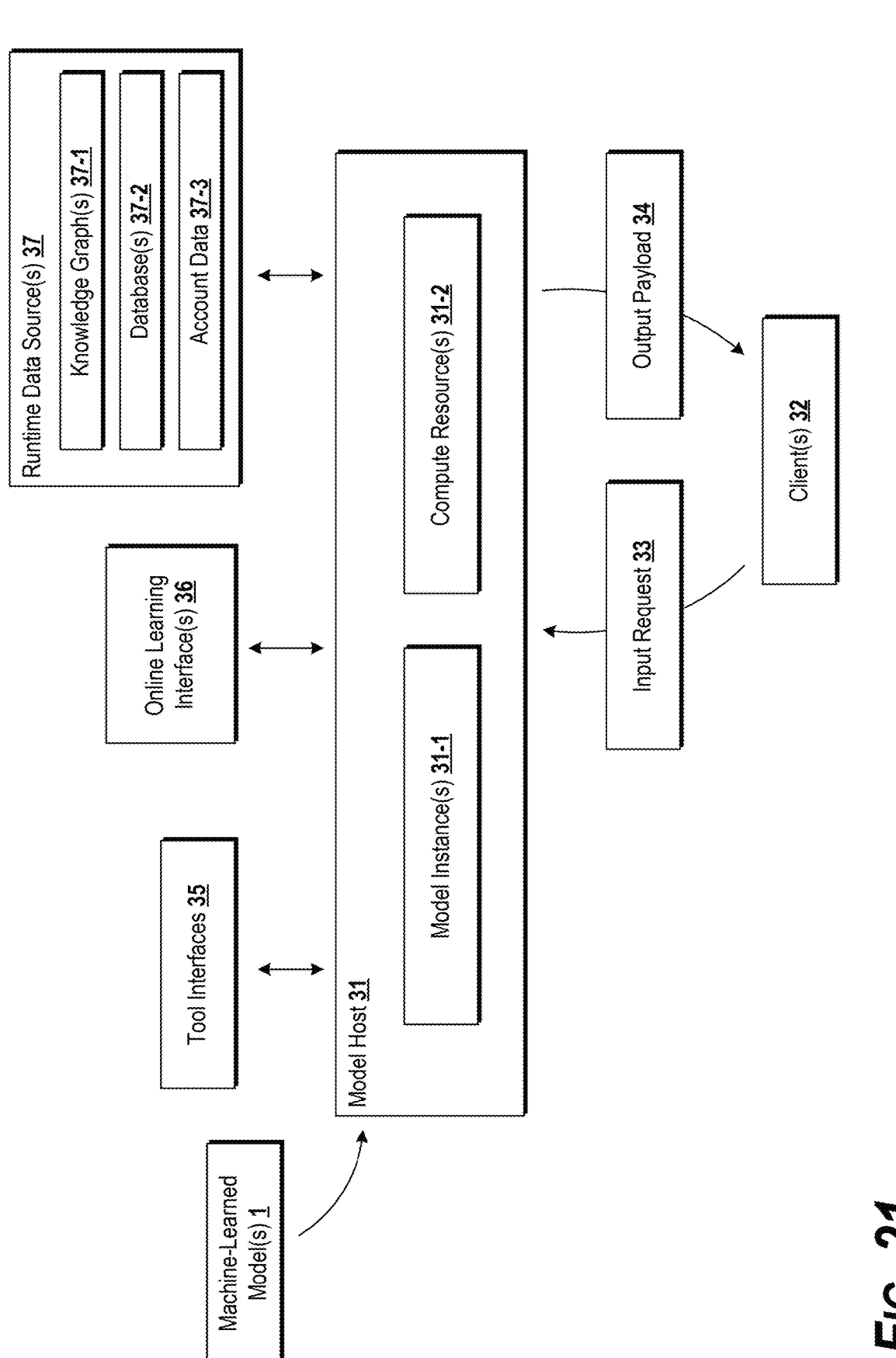
FIG. 21 is a block diagram of an inference system for operating one or more machine-learned model(s) to perform inference according to example implementations of aspects of the present disclosure.

FIG. 21 is a block diagram of an inference system for operating one or more machine-learned model(s) 1 to perform inference (e.g., for training, for deployment, etc.). A model host 31 can receive machine-learned model(s) 1. Model host 31 can host one or more model instance(s) 31-1, which can be one or multiple instances of one or multiple models. Model host 31 can host model instance(s) 31-1 using available compute resources 31-2 associated with model host 31.

Model host 31 can perform inference on behalf of one or more client(s) 32. Client(s) 32 can transmit an input request 33 to model host 31. Using input request 33, model host 31 can obtain input(s) 2 for input to machine-learned model(s) 1. Machine-learned model(s) 1 can process input(s) 2 to generate output(s) 3. Using output(s) 3, model host 31 can return an output payload 34 for responding to input request 33 from client(s) 32. Output payload 34 can include or be based on output(s) 3.

Model host 31 can leverage various other resources and tools to augment the inference task. For instance, model host 31 can communicate with tool interfaces 35 to facilitate tool use by model instance(s) 31-1. Tool interfaces 35 can include local or remote APIs. Tool interfaces 35 can include integrated scripts or other software functionality. Model host 31 can engage online learning interface(s) 36 to facilitate ongoing improvements to machine-learned model(s) 1. For instance, online learning interface(s) 36 can be used within reinforcement learning loops to retrieve user feedback on inferences served by model host 31. Model host 31 can access runtime data source(s) 37 for augmenting input(s) 2 with additional contextual information. For instance, runtime data source(s) 37 can include a knowledge graph 37-1 that facilitates structured information retrieval for information associated with input request(s) 33 (e.g., a search engine service). Runtime data source(s) 37 can include public or private, external or local database(s) 37-2 that can store information associated with input request(s) 33 for augmenting input(s) 2. Runtime data source(s) 37 can include account data 37-3 which can be retrieved in association with a user account corresponding to a client 32 for customizing the behavior of model host 31 accordingly.

Model host 31 can be implemented by one or multiple computing devices or systems. Client(s) 32 can be implemented by one or multiple computing devices or systems, which can include computing devices or systems shared with model host 31.

For example, model host 31 can operate on a server system that provides a machine-learning service to client device(s) that operate client(s) 32 (e.g., over a local or wide-area network). Client device(s) can be end-user devices used by individuals. Client device(s) can be server systems that operate client(s) 32 to provide various functionality as a service to downstream end-user devices.

In some implementations, model host 31 can operate on a same device or system as client(s) 32. Model host 31 can be a machine-learning service that runs on-device to provide machine-learning functionality to one or multiple applications operating on a client device, which can include an application implementing client(s) 32. Model host 31 can be a part of a same application as client(s) 32. For instance, model host 31 can be a subroutine or method implemented by one part of an application, and client(s) 32 can be another subroutine or method that engages model host 31 to perform inference functions within the application. It is to be understood that model host 31 and client(s) 32 can have various different configurations.

Model instance(s) 31-1 can include one or more machine-learned models that are available for performing inference. Model instance(s) 31-1 can include weights or other model components that are stored in persistent storage, temporarily cached, or loaded into high-speed memory. Model instance(s) 31-1 can include multiple instance(s) of the same model (e.g., for parallel execution of more requests on the same model). Model instance(s) 31-1 can include instance(s) of different model(s). Model instance(s) 31-1 can include cached intermediate states of active or inactive model(s) used to accelerate inference of those models. For instance, an inference session with a particular model may generate significant amounts of computational results that can be re-used for future inference runs (e.g., using a KV cache for transformer-based models). These computational results can be saved in association with that inference session so that session can be executed more efficiently when resumed.

Compute resource(s) 31-2 can include one or more processors (central processing units, graphical processing units, tensor processing units, machine-learning accelerators, etc.) connected to one or more memory devices. Compute resource(s) 31-2 can include a dynamic pool of available resources shared with other processes. Compute resource(s) 31-2 can include memory devices large enough to fit an entire model instance in a single memory instance. Compute resource(s) 31-2 can also shard model instance(s) across multiple memory devices (e.g., using data parallelization or tensor parallelization, etc.). This can be done to increase parallelization or to execute a large model using multiple memory devices which individually might not be able to fit the entire model into memory.

Input request 33 can include data for input(s) 2. Model host 31 can process input request 33 to obtain input(s) 2. Input(s) 2 can be obtained directly from input request 33 or can be retrieved using input request 33. Input request 33 can be submitted to model host 31 via an API.

Model host 31 can perform inference over batches of input requests 33 in parallel. For instance, a model instance 31-1 can be configured with an input structure that has a batch dimension. Separate input(s) 2 can be distributed across the batch dimension (e.g., rows of an array). The separate input(s) 2 can include completely different contexts. The separate input(s) 2 can be multiple inference steps of the same task. The separate input(s) 2 can be staggered in an input structure, such that any given inference cycle can be operating on different portions of the respective input(s) 2. In this manner, for instance, model host 31 can perform inference on the batch in parallel, such that output(s) 3 can also contain the batch dimension and return the inference results for the batched input(s) 2 in parallel. In this manner, for instance, batches of input request(s) 33 can be processed in parallel for higher throughput of output payload(s) 34.

Output payload 34 can include or be based on output(s) 3 from machine-learned model(s) 1. Model host 31 can process output(s) 3 to obtain output payload 34. This can include chaining multiple rounds of inference (e.g., iteratively, recursively, across the same model(s) or different model(s)) to arrive at a final output for a task to be returned in output payload 34. Output payload 34 can be transmitted to client(s) 32 via an API.

Online learning interface(s) 36 can facilitate reinforcement learning of machine-learned model(s) 1. Online learning interface(s) 36 can facilitate reinforcement learning with human feedback (RLHF). Online learning interface(s) 36 can facilitate federated learning of machine-learned model(s) 1.

Model host 31 can execute machine-learned model(s) 1 to perform inference for various tasks using various types of data. For example, various different input(s) 2 and output(s) 3 can be used for various different tasks. In some implementations, input(s) 2 can be or otherwise represent image data. Machine-learned model(s) 1 can process the image data to generate an output. As an example, machine-learned model(s) 1 can process the image data to generate an image recognition output (e.g., a recognition of the image data, a latent embedding of the image data, an encoded representation of the image data, a hash of the image data, etc.). As another example, machine-learned model(s) 1 can process the image data to generate an image segmentation output. As another example, machine-learned model(s) 1 can process the image data to generate an image classification output. As another example, machine-learned model(s) 1 can process the image data to generate an image data modification output (e.g., an alteration of the image data, etc.). As another example, machine-learned model(s) 1 can process the image data to generate an encoded image data output (e.g., an encoded and/or compressed representation of the image data, etc.). As another example, machine-learned model(s) 1 can process the image data to generate an upscaled image data output. As another example, machine-learned model(s) 1 can process the image data to generate a prediction output.

In some implementations, the task is a computer vision task. In some cases, input(s) 2 includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some implementations, input(s) 2 can be or otherwise represent natural language data. Machine-learned model(s) 1 can process the natural language data to generate an output. As an example, machine-learned model(s) 1 can process the natural language data to generate a language encoding output. As another example, machine-learned model(s) 1 can process the natural language data to generate a latent text embedding output. As another example, machine-learned model(s) 1 can process the natural language data to generate a translation output. As another example, machine-learned model(s) 1 can process the natural language data to generate a classification output. As another example, machine-learned model(s) 1 can process the natural language data to generate a textual segmentation output. As another example, machine-learned model(s) 1 can process the natural language data to generate a semantic intent output. As another example, machine-learned model(s) 1 can process the natural language data to generate an upscaled text or natural language output (e.g., text or natural language data that is higher quality than the input text or natural language, etc.). As another example, machine-learned model(s) 1 can process the natural language data to generate a prediction output (e.g., one or more predicted next portions of natural language content).

In some implementations, input(s) 2 can be or otherwise represent speech data (e.g., data describing spoken natural language, such as audio data, textual data, etc.). Machine-learned model(s) 1 can process the speech data to generate an output. As an example, machine-learned model(s) 1 can process the speech data to generate a speech recognition output. As another example, machine-learned model(s) 1 can process the speech data to generate a speech translation output. As another example, machine-learned model(s) 1 can process the speech data to generate a latent embedding output. As another example, machine-learned model(s) 1 can process the speech data to generate an encoded speech output (e.g., an encoded and/or compressed representation of the speech data, etc.). As another example, machine-learned model(s) 1 can process the speech data to generate an upscaled speech output (e.g., speech data that is higher quality than the input speech data, etc.). As another example, machine-learned model(s) 1 can process the speech data to generate a textual representation output (e.g., a textual representation of the input speech data, etc.). As another example, machine-learned model(s) 1 can process the speech data to generate a prediction output.

In some implementations, input(s) 2 can be or otherwise represent latent encoding data (e.g., a latent space representation of an input, etc.). Machine-learned model(s) 1 can process the latent encoding data to generate an output. As an example, machine-learned model(s) 1 can process the latent encoding data to generate a recognition output. As another example, machine-learned model(s) 1 can process the latent encoding data to generate a reconstruction output. As another example, machine-learned model(s) 1 can process the latent encoding data to generate a search output. As another example, machine-learned model(s) 1 can process the latent encoding data to generate a reclustering output. As another example, machine-learned model(s) 1 can process the latent encoding data to generate a prediction output.

In some implementations, input(s) 2 can be or otherwise represent statistical data. Statistical data can be, represent, or otherwise include data computed and/or calculated from some other data source. Machine-learned model(s) 1 can process the statistical data to generate an output. As an example, machine-learned model(s) 1 can process the statistical data to generate a recognition output. As another example, machine-learned model(s) 1 can process the statistical data to generate a prediction output. As another example, machine-learned model(s) 1 can process the statistical data to generate a classification output. As another example, machine-learned model(s) 1 can process the statistical data to generate a segmentation output. As another example, machine-learned model(s) 1 can process the statistical data to generate a visualization output. As another example, machine-learned model(s) 1 can process the statistical data to generate a diagnostic output.

In some implementations, input(s) 2 can be or otherwise represent sensor data. Machine-learned model(s) 1 can process the sensor data to generate an output. As an example, machine-learned model(s) 1 can process the sensor data to generate a recognition output. As another example, machine-learned model(s) 1 can process the sensor data to generate a prediction output. As another example, machine-learned model(s) 1 can process the sensor data to generate a classification output. As another example, machine-learned model(s) 1 can process the sensor data to generate a segmentation output. As another example, machine-learned model(s) 1 can process the sensor data to generate a visualization output. As another example, machine-learned model(s) 1 can process the sensor data to generate a diagnostic output. As another example, machine-learned model(s) 1 can process the sensor data to generate a detection output.

In some implementations, machine-learned model(s) 1 can be configured to perform a task that includes encoding input data for reliable and/or efficient transmission or storage (and/or corresponding decoding). For example, the task may be an audio compression task. The input may include audio data and the output may include compressed audio data. In another example, the input includes visual data (e.g. one or more images or videos), the output includes compressed visual data, and the task is a visual data compression task. In another example, the task may include generating an embedding for input data (e.g. input audio or visual data). In some cases, the input includes audio data representing a spoken utterance and the task is a speech recognition task. The output may include a text output which is mapped to the spoken utterance. In some cases, the task includes encrypting or decrypting input data. In some cases, the task includes a microprocessor performance task, such as branch prediction or memory address translation.

In some implementations, the task is a generative task, and machine-learned model(s) 1 can be configured to output content generated in view of input(s) 2. For instance, input(s) 2 can be or otherwise represent data of one or more modalities that encodes context for generating additional content.

In some implementations, the task can be a text completion task. Machine-learned model(s) 1 can be configured to process input(s) 2 that represent textual data and to generate output(s) 3 that represent additional textual data that completes a textual sequence that includes input(s) 2. For instance, machine-learned model(s) 1 can be configured to generate output(s) 3 to complete a sentence, paragraph, or portion of text that follows from a portion of text represented by input(s) 2.

In some implementations, the task can be an instruction following task. Machine-learned model(s) 1 can be configured to process input(s) 2 that represent instructions to perform a function and to generate output(s) 3 that advance a goal of satisfying the instruction function (e.g., at least a step of a multi-step procedure to perform the function). Output(s) 3 can represent data of the same or of a different modality as input(s) 2. For instance, input(s) 2 can represent textual data (e.g., natural language instructions for a task to be performed) and machine-learned model(s) 1 can process input(s) 2 to generate output(s) 3 that represent textual data responsive to the instructions (e.g., natural language responses, programming language responses, machine language responses, etc.). Input(s) 2 can represent image data (e.g., image-based instructions for a task to be performed, optionally accompanied by textual instructions) and machine-learned model(s) 1 can process input(s) 2 to generate output(s) 3 that represent textual data responsive to the instructions (e.g., natural language responses, programming language responses, machine language responses, etc.). One or more output(s) 3 can be iteratively or recursively generated to sequentially process and accomplish steps toward accomplishing the requested functionality. For instance, an initial output can be executed by an external system or be processed by machine-learned model(s) 1 to complete an initial step of performing a function. Multiple steps can be performed, with a final output being obtained that is responsive to the initial instructions.

In some implementations, the task can be a question answering task. Machine-learned model(s) 1 can be configured to process input(s) 2 that represent a question to answer and to generate output(s) 3 that advance a goal of returning an answer to the question (e.g., at least a step of a multi-step procedure to perform the function). Output(s) 3 can represent data of the same or of a different modality as input(s) 2. For instance, input(s) 2 can represent textual data (e.g., natural language instructions for a task to be performed) and machine-learned model(s) 1 can process input(s) 2 to generate output(s) 3 that represent textual data responsive to the question (e.g., natural language responses, programming language responses, machine language responses, etc.). Input(s) 2 can represent image data (e.g., image-based instructions for a task to be performed, optionally accompanied by textual instructions) and machine-learned model(s) 1 can process input(s) 2 to generate output(s) 3 that represent textual data responsive to the question (e.g., natural language responses, programming language responses, machine language responses, etc.). One or more output(s) 3 can be iteratively or recursively generated to sequentially process and accomplish steps toward answering the question. For instance, an initial output can be executed by an external system or be processed by machine-learned model(s) 1 to complete an initial step of obtaining an answer to the question (e.g., querying a database, performing a computation, executing a script, etc.). Multiple steps can be performed, with a final output being obtained that is responsive to the question.

In some implementations, the task can be an image generation task. Machine-learned model(s) 1 can be configured to process input(s) 2 that represent context regarding a desired portion of image content. The context can include text data, image data, audio data, etc. Machine-learned model(s) 1 can be configured to generate output(s) 3 that represent image data that depicts imagery related to the context. For instance, machine-learned model(s) 1 can be configured to generate pixel data of an image. Values for channel(s) associated with the pixels in the pixel data can be selected based on the context (e.g., based on a probability determined based on the context).

In some implementations, the task can be an audio generation task. Machine-learned model(s) 1 can be configured to process input(s) 2 that represent context regarding a desired portion of audio content. The context can include text data, image data, audio data, etc. Machine-learned model(s) 1 can be configured to generate output(s) 3 that represent audio data related to the context. For instance, machine-learned model(s) 1 can be configured to generate waveform data in the form of an image (e.g., a spectrogram). Values for channel(s) associated with pixels of the image can be selected based on the context. Machine-learned model(s) 1 can be configured to generate waveform data in the form of a sequence of discrete samples of a continuous waveform. Values of the sequence can be selected based on the context (e.g., based on a probability determined based on the context).

In some implementations, the task can be a data generation task. Machine-learned model(s) 1 can be configured to process input(s) 2 that represent context regarding a desired portion of data (e.g., data from various data domains, such as sensor data, image data, multimodal data, statistical data, etc.). The desired data can be, for instance, synthetic data for training other machine-learned models. The context can include arbitrary data type(s). Machine-learned model(s) 1 can be configured to generate output(s) 3 that represent data that aligns with the desired data. For instance, machine-learned model(s) 1 can be configured to generate data values for populating a dataset. Values for the data object(s) can be selected based on the context (e.g., based on a probability determined based on the context).

Figure 22:
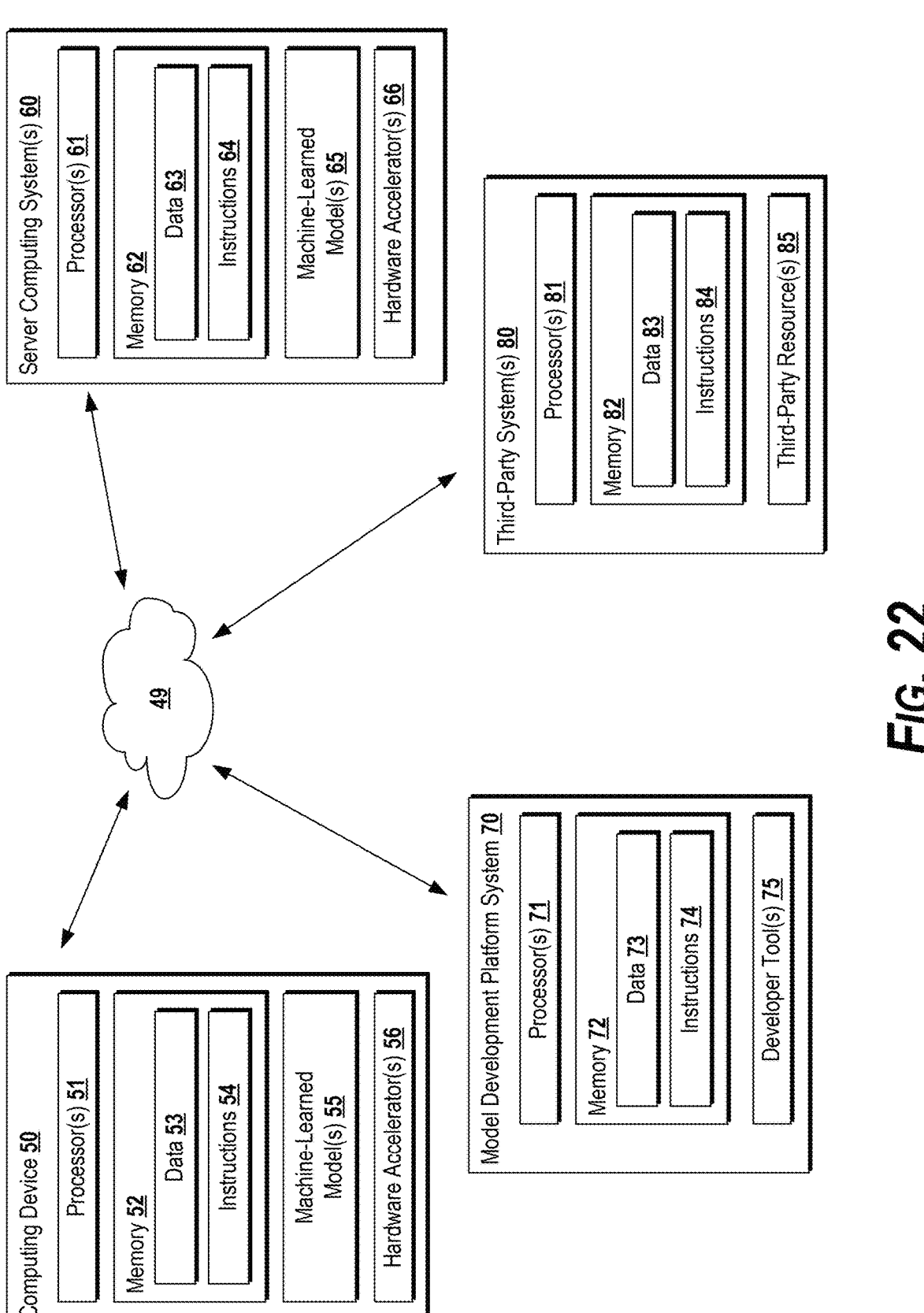
FIG. 22 is a block diagram of an example networked computing system according to example implementations of aspects of the present disclosure.

FIG. 22 is a block diagram of an example networked computing system that can perform aspects of example implementations of the present disclosure. The system can include a number of computing devices and systems that are communicatively coupled over a network 49. An example computing device 50 is described to provide an example of a computing device that can perform any aspect of the present disclosure (e.g., implementing model host 31, client(s) 32, or both). An example server computing system 60 is described as an example of a server computing system that can perform any aspect of the present disclosure (e.g., implementing model host 31, client(s) 32, or both). Computing device 50 and server computing system(s) 60 can cooperatively interact (e.g., over network 49) to perform any aspect of the present disclosure (e.g., implementing model host 31, client(s) 32, or both). Model development platform system 70 is an example system that can host or serve model development platform(s) 12 for development of machine-learned models. Third-party system(s) 80 are example system(s) with which any of computing device 50, server computing system(s) 60, or model development platform system(s) 70 can interact in the performance of various aspects of the present disclosure (e.g., engaging third-party tools, accessing third-party databases or other resources, etc.).

Network 49 can be any type of communications network, such as a local area network (e.g., intranet), wide area network (e.g., Internet), or some combination thereof and can include any number of wired or wireless links. In general, communication over network 49 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL). Network 49 can also be implemented via a system bus. For instance, one or more devices or systems of FIG. 22 can be co-located with, contained by, or otherwise integrated into one or more other devices or systems.

Computing device 50 can be any type of computing device, such as, for example, a personal computing device (e.g., laptop or desktop), a mobile computing device (e.g., smartphone or tablet), a gaming console or controller, a wearable computing device, an embedded computing device, a server computing device, a virtual machine operating on a host device, or any other type of computing device. Computing device 50 can be a client computing device. Computing device 50 can be an end-user computing device. Computing device 50 can be a computing device of a service provided that provides a service to an end user (who may use another computing device to interact with computing device 50).

Computing device 50 can include one or more processors 51 and a memory 52. Processor(s) 51 can be any suitable processing device (e.g., a processor core, a microprocessor, an ASIC, an FPGA, a controller, a microcontroller, etc.) and can be one processor or a plurality of processors that are operatively connected. Memory 52 can include one or more non-transitory computer-readable storage media, such as HBM, RAM, ROM, EEPROM, EPROM, flash memory devices, magnetic disks, etc., and combinations thereof. Memory 52 can store data 53 and instructions 54 which can be executed by processor(s) 51 to cause computing device 50 to perform operations. The operations can implement any one or multiple features described herein. The operations can implement example methods and techniques described herein.

Computing device 50 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, camera, LIDAR, a physical keyboard or other buttons, or other means by which a user can provide user input.

Computing device 50 can store or include one or more machine-learned models 55. Machine-learned models 55 can include one or more machine-learned model(s) 1, such as a sequence processing model 4. Machine-learned models 55 can include one or multiple model instance(s) 31-1. Machine-learned model(s) 55 can be received from server computing system(s) 60, model development platform system 70, third party system(s) 80 (e.g., an application distribution platform), or developed locally on computing device 50. Machine-learned model(s) 55 can be loaded into memory 52 and used or otherwise implemented by processor(s) 51. Computing device 50 can implement multiple parallel instances of machine-learned model(s) 55.

Computing device 50 can include one or more parallel processing accelerators, such as hardware accelerators 56. Graphics Processing Units (GPUs) are a type of parallel processing accelerator. GPUs can include very high core counts that can handle thousands of threads simultaneously. Application-Specific Integrated Circuits (ASICs) are another type of parallel processing accelerator. ASICs are custom chips designed for a specific application or task, as opposed to general-purpose processors. They can be highly efficient at the tasks for which they are designed. ASICs can be designed to efficiently perform the specific types of computations common in machine learning algorithms, such as matrix operations.

Server computing system(s) 60 can include one or more processors 61 and a memory 62. Processor(s) 61 can be any suitable processing device (e.g., a processor core, a microprocessor, an ASIC, an FPGA, a controller, a microcontroller, etc.) and can be one processor or a plurality of processors that are operatively connected. Memory 62 can include one or more non-transitory computer-readable storage media, such as HBM, RAM, ROM, EEPROM, EPROM, flash memory devices, magnetic disks, etc., and combinations thereof. Memory 62 can store data 63 and instructions 64 which can be executed by processor(s) 61 to cause server computing system(s) 60 to perform operations. The operations can implement any one or multiple features described herein. The operations can implement example methods and techniques described herein.

In some implementations, server computing system 60 includes or is otherwise implemented by one or multiple server computing devices. In instances in which server computing system 60 includes multiple server computing devices, such server computing devices can operate according to sequential computing architectures, parallel computing architectures, or some combination thereof.

Server computing system 60 can store or otherwise include one or more machine-learned models 65. Machine-learned model(s) 65 can be the same as or different from machine-learned model(s) 55. Machine-learned models 65 can include one or more machine-learned model(s) 1, such as a sequence processing model 4. Machine-learned models 65 can include one or multiple model instance(s) 31-1. Machine-learned model(s) 65 can be received from computing device 50, model development platform system 70, third party system(s) 80, or developed locally on server computing system(s) 60. Machine-learned model(s) 65 can be loaded into memory 62 and used or otherwise implemented by processor(s) 61. Server computing system(s) 60 can implement multiple parallel instances of machine-learned model(s) 65.

Server computing system(s) 60 can include one or more parallel processing accelerators, such as hardware accelerators 66. Graphics Processing Units (GPUs) are a type of parallel processing accelerator. GPUs can include very high core counts that can handle thousands of threads simultaneously. Application-Specific Integrated Circuits (ASICs) are another type of parallel processing accelerator. ASICs are custom chips designed for a specific application or task, as opposed to general-purpose processors. They can be highly efficient at the tasks for which they are designed. ASICs can be designed to efficiently perform the specific types of computations common in machine learning algorithms, such as matrix operations.

In an example configuration, machine-learned models 65 can be included in or otherwise stored and implemented by server computing system 60 to establish a client-server relationship with computing device 50 for serving model inferences. For instance, server computing system(s) 60 can implement model host 31 on behalf of client(s) 32 on computing device 50. For instance, machine-learned models 65 can be implemented by server computing system 60 as a portion of a web service (e.g., remote machine-learned model hosting service, such as an online interface for performing machine-learned model operations over a network on server computing system(s) 60). For instance, server computing system(s) 60 can communicate with computing device 50 over a local intranet or internet connection. For instance, computing device 50 can be a workstation or endpoint in communication with server computing system(s) 60, with implementation of machine-learned models 65 being managed by server computing system(s) 60 to remotely perform inference (e.g., for runtime or training operations), with output(s) returned (e.g., cast, streamed, etc.) to computing device 50. Machine-learned models 65 can work cooperatively or interoperatively with machine-learned models 55 on computing device 50 to perform various tasks.

In an example, computing device 50 can implement a system 100. A primary machine-learned model 112 can be executed on computing device 50 or server computing systems 60. Session data 102 (and embeddings/extractions thereof) can be stored on computing device 50 or server computing systems 60. In some instances, the bulk of the stored data and compute can be hosted server-side while the application logic (e.g., preprocessing systems and frameworks) can live client side. In some instances, as much processing is performed on computing device 50 as possible.

Model development platform system(s) 70 can include one or more processors 71 and a memory 72. Processor(s) 71 can be any suitable processing device (e.g., a processor core, a microprocessor, an ASIC, an FPGA, a controller, a microcontroller, etc.) and can be one processor or a plurality of processors that are operatively connected. Memory 72 can include one or more non-transitory computer-readable storage media, such as HBM, RAM, ROM, EEPROM, EPROM, flash memory devices, magnetic disks, etc., and combinations thereof. Memory 72 can store data 73 and instructions 74 which can be executed by processor(s) 71 to cause model development platform system(s) 70 to perform operations. The operations can implement any one or multiple features described herein. The operations can implement example methods and techniques described herein. Example operations include the functionality described herein with respect to model development platform 12. This and other functionality can be implemented by developer tool(s) 75.

Third-party system(s) 80 can include one or more processors 81 and a memory 82. Processor(s) 81 can be any suitable processing device (e.g., a processor core, a microprocessor, an ASIC, an FPGA, a controller, a microcontroller, etc.) and can be one processor or a plurality of processors that are operatively connected. Memory 82 can include one or more non-transitory computer-readable storage media, such as HBM, RAM, ROM, EEPROM, EPROM, flash memory devices, magnetic disks, etc., and combinations thereof. Memory 82 can store data 83 and instructions 84 which can be executed by processor(s) 81 to cause third-party system(s) 80 to perform operations. The operations can implement any one or multiple features described herein. The operations can implement example methods and techniques described herein. Example operations include the functionality described herein with respect to tools and other external resources called when training or performing inference with machine-learned model(s) 1, 4, 16, 20, 55, 65, etc. (e.g., third-party resource(s) 85).

FIG. 22 illustrates one example arrangement of computing systems that can be used to implement the present disclosure. Other computing system configurations can be used as well. For example, in some implementations, one or both of computing system 50 or server computing system(s) 60 can implement all or a portion of the operations of model development platform system 70. For example, computing system 50 or server computing system(s) 60 can implement developer tool(s) 75 (or extensions thereof) to develop, update/train, or refine machine-learned models 1, 4, 16, 20, 55, 65, etc. using one or more techniques described herein with respect to model alignment toolkit 17. In this manner, for instance, computing system 50 or server computing system(s) 60 can develop, update/train, or refine machine-learned models based on local datasets (e.g., for model personalization/customization, as permitted by user data preference selections).

Figure 23:
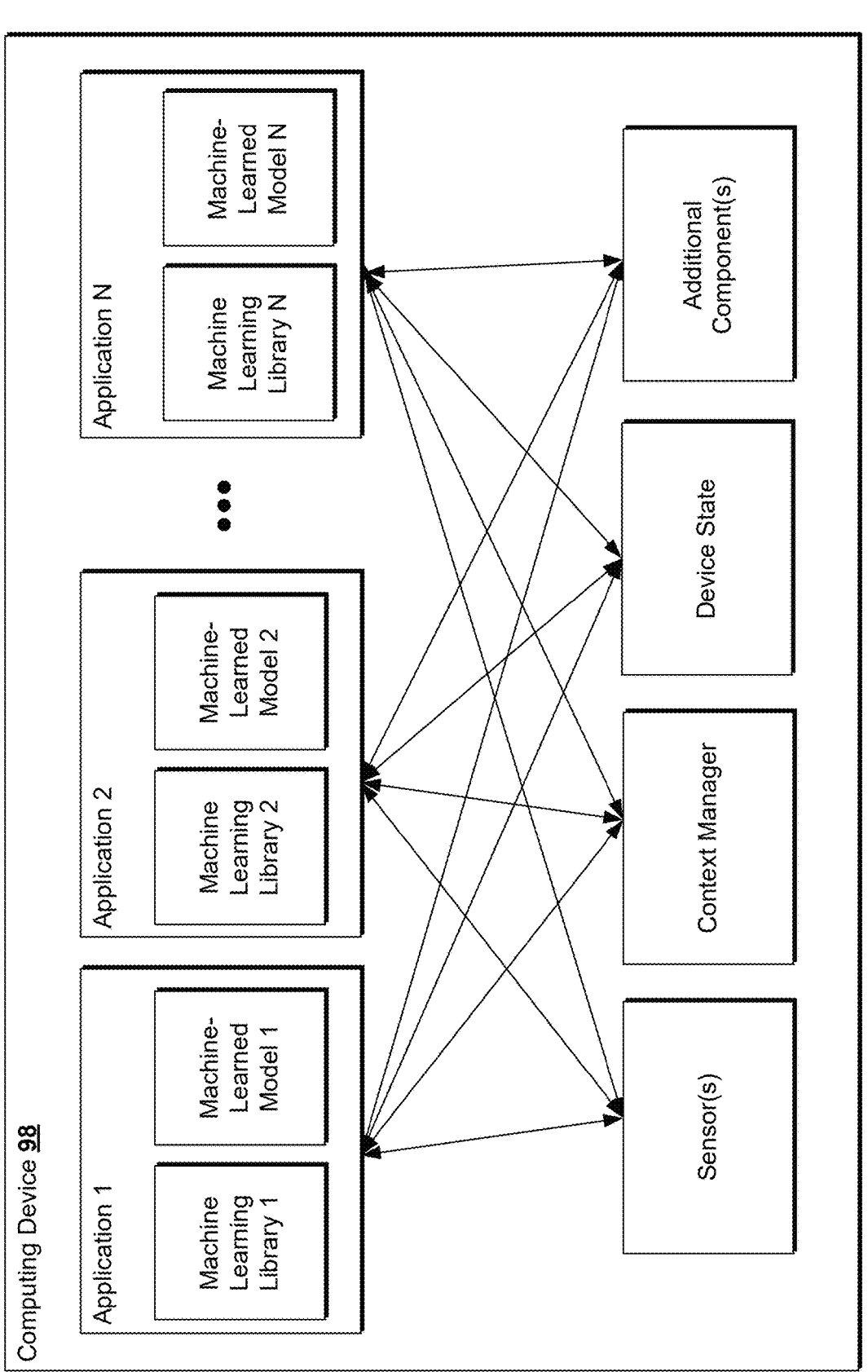
FIG. 23 is a block diagram of an example computing device according to example implementations of aspects of the present disclosure.

FIG. 23 is a block diagram of an example computing device 98 that performs according to example embodiments of the present disclosure. Computing device 98 can be a user computing device or a server computing device (e.g., computing device 50, server computing system(s) 60, etc.). Computing device 98 can implement model host 31. For instance, computing device 98 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 23, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 24:
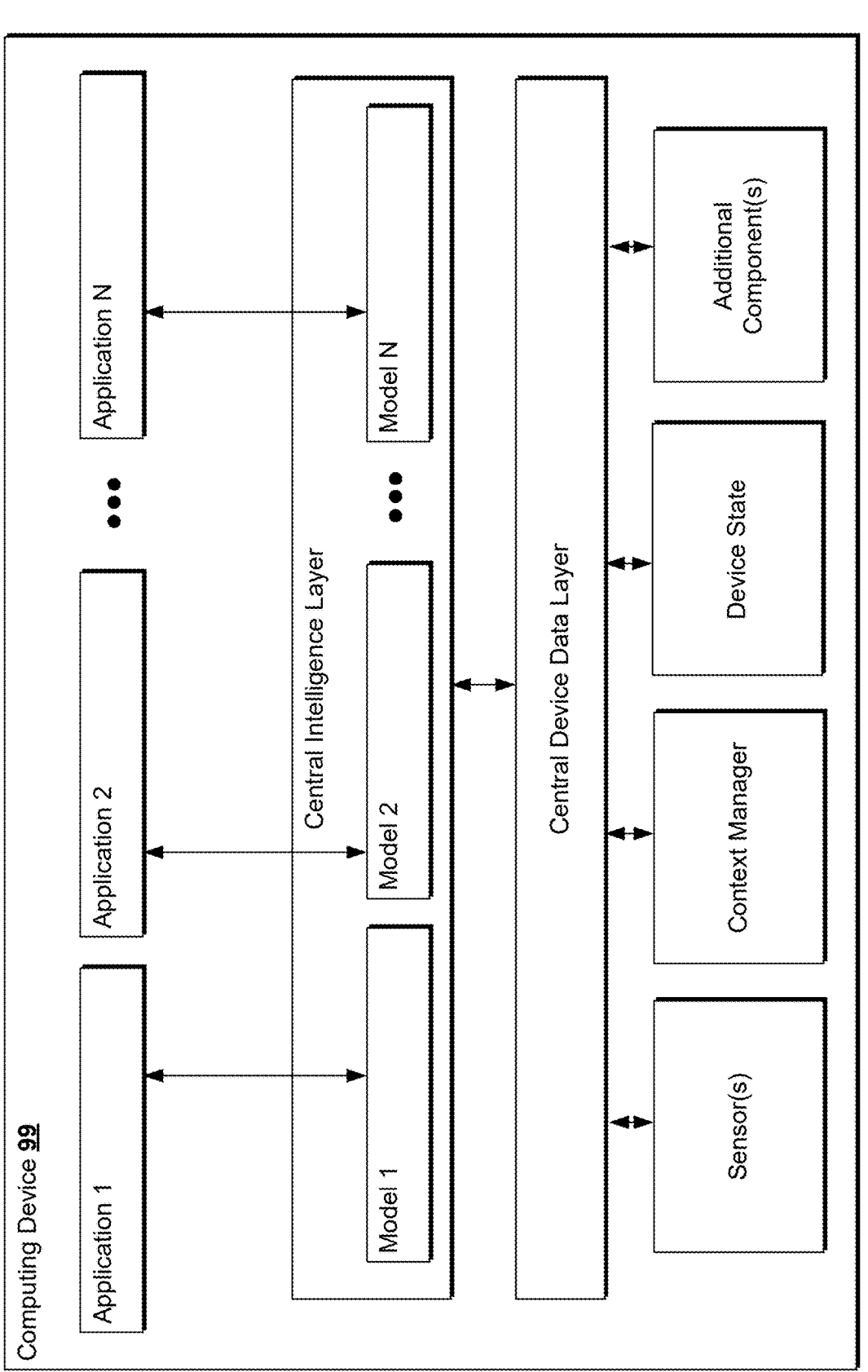
FIG. 24 is a block diagram of an example computing device according to example implementations of aspects of the present disclosure.

FIG. 24 is a block diagram of an example computing device 99 that performs according to example embodiments of the present disclosure. Computing device 99 can be the same as or different from computing device 98. Computing device 99 can be a user computing device or a server computing device (e.g., computing device 50, server computing system(s) 60, etc.). Computing device 98 can implement model host 31. For instance, computing device 99 can include a number of applications (e.g., applications 1 through N). Each application can be in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 24, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of computing device 99.

The central intelligence layer can communicate with a central device data layer. The central device data layer can be a centralized repository of data for computing device 99. As illustrated in FIG. 24, the central device data layer can communicate with a number of other components of the computing device, such as, for example, one or more sensors, a context manager, a device state component, or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Terms such as "based on" should be understood as "based at least in part on."

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

What is claimed is:

1. A computer-implemented method, the method comprising:

receiving input data describing a user interaction associated with a browser application operating on a user computing device;

retrieving a session data object associated with the input data based on searching a vector database representing session data associated with the browser application, session data descriptive of a web browsing history;

constructing, using the session data, conditioned input data for input to a machine-learned sequence processing model to perform a task associated with the input data, wherein the conditioned input data comprises the session data object and the input data, wherein the machine-learned sequence processing model attends over a plurality of input elements representing the conditioned input data to generate one or more output elements of an output sequence; and generating, based on the output sequence, output data for rendering a response comprising the output data within the browser application or modifying, based on the output data comprising a command for causing the browser application to perform an operation, a state of the browser application.

2. The method of claim 1, wherein the input data comprises a query over content from one or more open tabs of the browser application.

3. The method of claim 1, wherein the input data is received via a context menu activated within the browser application.

4. The method of claim 1, wherein the machine-learned sequence processing model is configured to generate a response sequence that indicates one or more commands to adjust one or more tabs in the tabbed browsing interface based on relevance to the input data.

5. The method of claim 1, wherein the input data comprises a natural language query input via a unified input interface within the browser application, wherein the unified input interface is configured to determine a relevance of the natural language query to one or more functions of the browser application and render an interactive element associated with at least one relevant function.

6. The method of claim 1, wherein the conditioned input data comprises an interaction trajectory that characterizes one or more prior user interactions with the browser application.

7. The method of claim 6, wherein:

the interaction trajectory is generated by a machine-learned interaction trajectory generation system;

the interaction trajectory comprises data characterizing recorded user interactions; and the machine-learned interaction trajectory generation system is configured to generate updated interaction trajectories responsive to state changes in the session data.

8. The method of claim 1, wherein constructing the conditioned input data comprises:

retrieving portions of the session data that are relevant to the input data using a similarity search over embeddings of the session data in the vector database.

9. The method of claim 8, wherein retrieving the session data object comprises:

classifying the input data to determine a corresponding retrieval precision; and querying, using a query embedding, a subset of a data store of embedded session data, the subset characterized by the corresponding retrieval precision.

10. The method of claim 1, wherein the vector database comprises, for a respective item of session data:

a first embedding describing a portion of the respective item, the first embedding characterized by a first precision; and a second embedding describing the portion of the respective item, the second embedding characterized by a second precision lower than the first precision.

11. The method of claim 9, wherein the session data comprises a data sketch, and wherein retrieving the session data object comprises:

retrieving, based on the corresponding retrieval precision, the data sketch.

12. The method of claim 1, wherein the output data comprises inputs for an application programming interface (API) of an operational environment to control an operation of the operational environment.

13. A computing system comprising:

one or more processors; and one or more non-transitory computer-readable media that store instructions that are executable by the one or more processors to cause the computing system to perform operations comprising:

receiving input data describing a user interaction associated with a browser application operating on a user computing device;

retrieving a session data object associated with the input data based on searching a vector database representing session data associated with the browser application, session data descriptive of a web browsing history;

constructing, using the session data, conditioned input data for input to a machine-learned sequence processing model to perform a task associated with the input data, wherein the conditioned input data comprises the session data object and the input data, wherein the machine-learned sequence processing model attends over a plurality of input elements representing the conditioned input data to generate one or more output elements of an output sequence; and generating, based on the output sequence, output data for rendering a response comprising the output data within the browser application or modifying, based on the output data comprising a command for causing the browser application to perform an operation, a state of the browser application.

14. The computing system of claim 13, wherein:

the conditioned input data comprises an interaction trajectory that characterizes one or more prior user interactions with the browser application.

15. The computing system of claim 14, wherein:

the interaction trajectory is generated by a machine-learned interaction trajectory generation system;

the interaction trajectory comprises data characterizing recorded user interactions; and the machine-learned interaction trajectory generation system is configured to generate updated interaction trajectories responsive to state changes in the session data.

16. The computing system of claim 13, wherein retrieving the session data object comprises:

classifying the input data to determine a corresponding retrieval precision; and querying, using a query embedding, a subset of a data store of embedded session data, the subset characterized by the corresponding retrieval precision.

17. The computing system of claim 13, wherein the vector database comprises, for a respective item of session data:

a first embedding describing a portion of the respective item, the first embedding characterized by a first precision; and a second embedding describing the portion of the respective item, the second embedding characterized by a second precision lower than the first precision.

18. One or more non-transitory computer-readable media that store instructions that are executable by one or more processors to cause a computing system to perform operations comprising:

receiving input data describing a user interaction associated with a browser application operating on a user computing device;

retrieving a session data object associated with the input data based on searching a vector database representing session data associated with the browser application, session data descriptive of a web browsing history;

constructing, using the session data, conditioned input data for input to a machine-learned sequence processing model to perform a task associated with the input data, wherein the conditioned input data comprises the session data object and the input data, wherein the machine-learned sequence processing model attends over a plurality of input elements representing the conditioned input data to generate one or more output elements of an output sequence; and generating, based on the output sequence, output data for rendering a response comprising the output data within the browser application or modifying, based on the output data comprising a command for causing the browser application to perform an operation, a state of the browser application.

19. The one or more non-transitory computer-readable media of claim 18, wherein:

the conditioned input data comprises an interaction trajectory that characterizes one or more prior user interactions with the browser application.

20. The one or more non-transitory computer-readable media of claim 19, wherein:

the interaction trajectory is generated by a machine-learned interaction trajectory generation system;

the interaction trajectory comprises data characterizing recorded user interactions; and the machine-learned interaction trajectory generation system is configured to generate updated interaction trajectories responsive to state changes in the session data.

* * * * *